(12) United States Patent
Siman-Tov

(10) Patent No.: US 7,955,203 B2
(45) Date of Patent: Jun. 7, 2011

(54) NON-SLIP TRANSMISSIONS PARTICULARLY USEFUL AS CONTINUOUSLY-VARIABLE TRANSMISSIONS AND TRANSMISSION MEMBERS THEREOF

(75) Inventor: Ran Siman-Tov, Tel Aviv (IL)

(73) Assignee: Cvtron Ltd., Tel-Aviv (IL)

( * ) Notice: Subject to any disclaimer, the term of this patent is extended or adjusted under 35 U.S.C. 154(b) by 9 days.

(21) Appl. No.: 10/466,112

(22) PCT Filed: Jan. 24, 2002

(86) PCT No.: PCT/IL02/00075
§ 371 (c)(1),
(2), (4) Date: Nov. 19, 2003

(87) PCT Pub. No.: WO02/061306
PCT Pub. Date: Aug. 8, 2002

(65) Prior Publication Data
US 2004/0220012 A1    Nov. 4, 2004

(30) Foreign Application Priority Data

Jan. 25, 2001 (IL) .......................................... 141094
Jul. 10, 2001 (IL) .......................................... 144222
Nov. 25, 2001 (IL) .......................................... 146720

(51) Int. Cl.
F16H 55/00    (2006.01)
F16H 7/00     (2006.01)
F16H 7/06     (2006.01)

(52) U.S. Cl. .......................... 474/47; 474/148; 474/155

(58) Field of Classification Search .................. 475/207; 474/49, 47, 52, 53, 148, 153, 154, 155, 203, 474/206, 56; 74/63

See application file for complete search history.

(56) References Cited

U.S. PATENT DOCUMENTS
672,962 A * 4/1901 Seymour .......................... 474/53
(Continued)

FOREIGN PATENT DOCUMENTS
BE          364729       11/1929
(Continued)

OTHER PUBLICATIONS

Bolz et al. "Mutation of CDH23, Encoding a New Member of the Cadherin Gene Family, Causes Usher Syndrome Type 1D", Nature Genetics, 27(1): 108-112, 2001.

(Continued)

Primary Examiner — James Pilkington

(57) ABSTRACT

A continuously-variable transmission includes two transmission members each having coupling elements engageable to couple the transmission members for movement together. At least one of the transmission members is a rotary member rotatable about a rotary axis; and at least one of the groups of coupling elements is radially displaceable towards and away from the rotary axis to change the conversion ratio of the transmission. The coupling elements of one group on one transmission member are of a fixed configuration defining projections alternating with depressions each of a fixed configuration formed on a surface of the transmission member between opposite side faces and having the same pitch for every cross section of the surface perpendicular to the mentioned rotary axis. The coupling elements of the other group are of a self-adaptive configuration, each movable in opposite directions to adapt itself to the configuration of the fixed-configuration coupling elements in all displacement positions of the radially-displaceable coupling elements and to effect a non-slip coupling therewith.

58 Claims, 27 Drawing Sheets

U.S. PATENT DOCUMENTS

| | | | |
|---|---|---|---|
| 895,855 A | 8/1908 | Hartmann | |
| 1,428,999 A | 9/1922 | Tygard et al. | |
| 1,601,662 A | 9/1926 | Abbott | |
| 1,650,449 A | 11/1927 | Jaeger | |
| 1,966,831 A | 7/1934 | Oakes et al. | |
| 2,201,600 A | 5/1940 | Waltz | |
| 2,714,825 A * | 8/1955 | Ferrari | 475/204 |
| 3,175,410 A | 3/1965 | Dittrich et al. | |
| 3,456,517 A | 7/1969 | Fumoto | |
| 3,688,595 A | 9/1972 | Bauer | |
| 4,005,618 A * | 2/1977 | Cohen | 74/640 |
| 4,367,067 A | 1/1983 | Chao | |
| 4,569,254 A | 2/1986 | Itoh et al. | |
| 4,591,351 A * | 5/1986 | Kumm | 474/49 |
| 4,682,518 A | 7/1987 | Takada et al. | |
| 4,810,234 A * | 3/1989 | Kumm | 474/49 |
| 4,836,049 A | 6/1989 | Moan | |
| 4,854,925 A * | 8/1989 | Chandrupatla | 474/212 |
| 4,867,287 A | 9/1989 | Hayashi | |
| 4,869,705 A | 9/1989 | Fenton | |
| 4,875,894 A | 10/1989 | Clark | |
| 4,922,047 A | 5/1990 | Chen et al. | |
| 4,950,414 A | 8/1990 | Wildersohn et al. | |
| 4,952,196 A * | 8/1990 | Chilcote et al. | 474/70 |
| 4,969,545 A | 11/1990 | Hayashi | |
| 4,973,288 A | 11/1990 | Sakakibara et al. | |
| 4,976,170 A | 12/1990 | Hayashi et al. | |
| 4,990,127 A | 2/1991 | Roberts et al. | |
| 4,993,999 A | 2/1991 | Mott | |
| 4,997,074 A | 3/1991 | Larson et al. | |
| 5,004,082 A | 4/1991 | Sakakibara et al. | |
| 5,006,093 A | 4/1991 | Itoh et al. | |
| 5,006,096 A * | 4/1991 | Breher | 474/153 |
| 5,011,458 A * | 4/1991 | Kumm | 474/49 |
| 5,050,715 A | 9/1991 | Itoh et al. | |
| 5,052,247 A | 10/1991 | Kato et al. | |
| 5,052,980 A | 10/1991 | Itoh et al. | |
| 5,052,990 A | 10/1991 | Sakakibara et al. | |
| 5,057,061 A | 10/1991 | Sakakibara et al. | |
| 5,062,049 A | 10/1991 | Taylor | |
| 5,063,816 A | 11/1991 | Soga et al. | |
| 5,067,603 A | 11/1991 | Kato et al. | |
| 5,079,704 A | 1/1992 | Sakai et al. | |
| 5,085,104 A | 2/1992 | Kouno et al. | |
| 5,086,672 A | 2/1992 | Kato et al. | |
| 5,088,355 A | 2/1992 | Sugaya et al. | |
| 5,092,434 A | 3/1992 | Smith | |
| 5,094,129 A | 3/1992 | Sugaya et al. | |
| 5,114,386 A | 5/1992 | Csotonyi | |
| 5,119,698 A | 6/1992 | Sugaya et al. | |
| 5,121,936 A | 6/1992 | Cowan | |
| 5,131,892 A | 7/1992 | Mott | |
| 5,144,386 A | 9/1992 | Matsuo et al. | |
| 5,157,992 A | 10/1992 | Hayashi et al. | |
| 5,168,778 A | 12/1992 | Todd et al. | |
| 5,180,339 A | 1/1993 | Haley et al. | |
| 5,188,007 A | 2/1993 | Hattori et al. | |
| 5,203,233 A | 4/1993 | Hattori et al. | |
| 5,211,083 A | 5/1993 | Hattori et al. | |
| 5,217,418 A | 6/1993 | Fellows et al. | |
| 5,243,881 A | 9/1993 | Hayashi | |
| 5,244,437 A | 9/1993 | Haley et al. | |
| 5,269,726 A | 12/1993 | Swanson et al. | |
| 5,285,389 A | 2/1994 | Taylor | |
| 5,310,384 A | 5/1994 | Siemon | |
| 5,318,484 A | 6/1994 | Forster | |
| 5,342,258 A | 8/1994 | Egyed | |
| 5,417,621 A | 5/1995 | Tibbles | |
| 5,421,789 A * | 6/1995 | Gregg | 474/153 |
| 5,458,540 A | 10/1995 | Moan et al. | |
| 5,492,506 A * | 2/1996 | Lorance | 474/49 |
| 5,514,047 A | 5/1996 | Tibbles et al. | |
| 5,586,953 A | 12/1996 | Abo | |
| 5,607,373 A | 3/1997 | Ochiai et al. | |
| 5,658,216 A | 8/1997 | Ochiai | |
| 5,667,456 A | 9/1997 | Fellows | |
| 5,669,846 A | 9/1997 | Moroto et al. | |
| 5,690,576 A | 11/1997 | Moroto et al. | |
| 5,697,866 A | 12/1997 | Okahara | |
| 5,750,477 A | 5/1998 | Sumiejski et al. | |
| 5,766,105 A | 6/1998 | Fellows et al. | |
| 5,871,411 A | 2/1999 | Senger et al. | |
| 5,906,649 A | 5/1999 | Genzel et al. | |
| 5,938,557 A | 8/1999 | Greenwood | |
| 5,961,418 A | 10/1999 | Taniguchi et al. | |
| 5,972,851 A | 10/1999 | Srinivasan et al. | |
| 5,983,152 A | 11/1999 | Genzel et al. | |
| 5,984,814 A | 11/1999 | Davenport | |
| 6,024,664 A | 2/2000 | Shaffner | |
| 6,024,667 A | 2/2000 | Krohm et al. | |
| 6,026,941 A | 2/2000 | Maienschein et al. | |
| 6,029,107 A | 2/2000 | Sato | |
| 6,030,312 A | 2/2000 | Nesbitt et al. | |
| 6,050,912 A | 4/2000 | Kobayashi | |
| 6,055,880 A | 5/2000 | Gogovitza | |
| 6,056,078 A | 5/2000 | Pham | |
| 6,058,348 A | 5/2000 | Ohyama et al. | |
| 6,074,317 A | 6/2000 | Kobayashi | |
| 6,074,326 A | 6/2000 | Sakakibara et al. | |
| 6,080,080 A | 6/2000 | Bolz et al. | |
| 6,086,507 A | 7/2000 | Lutz | |
| 6,086,513 A | 7/2000 | Tominaga | |
| 6,099,435 A | 8/2000 | Halene et al. | |
| 6,129,188 A | 10/2000 | Friedmann et al. | |
| 6,146,294 A | 11/2000 | Bolz | |
| 6,151,542 A | 11/2000 | Yoshino et al. | |
| 6,167,339 A | 12/2000 | Pels | |
| 6,170,847 B1 | 1/2001 | Pham | |
| 6,171,212 B1 | 1/2001 | Reuschel | |
| 6,216,837 B1 | 4/2001 | Maienschein et al. | |
| 6,223,872 B1 | 5/2001 | Heller et al. | |
| 6,225,266 B1 | 5/2001 | Watts et al. | |
| 6,267,701 B1 * | 7/2001 | Mott | 474/164 |
| 2002/0042314 A1 * | 4/2002 | Mimura | 474/56 |

FOREIGN PATENT DOCUMENTS

| | | | |
|---|---|---|---|
| CH | 680941 | | 12/1992 |
| JP | 63-067463 | | 3/1988 |
| JP | 11-230286 | | 8/1999 |
| JP | 2000046133 | * | 2/2000 |
| WO | WO 99/11515 | | 3/1999 |
| WO | WO 99/13242 | | 3/1999 |
| WO | WO 00/50785 | | 8/2000 |
| WO | WO 02/061306 | | 8/2002 |

OTHER PUBLICATIONS

Communication Pursuant to Article 94(3) EPC Dated Jan. 30, 2009 From the European Patent Office Re.: Application No. 02711175.6.
Daniel "Ist ein stufenloses echt formschlüssiges Getriebe möglich?", Antriebstechnik, XP001160734, 23(5): 49-50, 1984.
Jahr "Es ist kein foi formschlüssiges stufenloses Getriebe möglich", Antriebstechnik, XP001160727, 28(1): 45-46, 1989.
OA Oct. 19, 2006.
OA of Jun. 4, 2008.
OA of Oct. 7, 2007.
Office Action Dated Feb. 14, 2006 From the Israeli Patent Office Re.: Application No. 141094.
Office Action Dated Feb. 14, 2006 From the Israeli Patent Office Re.: Application No. 144222.
Office Action Dated Feb. 14, 2006 From the Israeli Patent Office Re.: Application No. 146720.
Res to OA of Jun. 4, 2008.
Supplementary search report of Feb. 22, 2008.
Invitation Pursuant to Article 94(3) and Rule 71(1) EPC Dated Jul. 17, 2009 From the European Patent Office Re.: Application No. 02711175.6.
Response Dated Nov. 17, 2009 to Invitation Pursuant to Article 94(3) and Rule 71(1) EPC of Jul. 17, 2009 From the European Patent Office Re.: Application No. 02711175.6.
Communication Pursuant to Article 94(3) EPC Dated May 14, 2008 From the European Patent Office Re.: Application No. 02711175.6.
Invitation Pursuant to Article 94(3) and Rule 71(1) EPC Dated Jul. 17, 2009 From the European Patent Office Re.: Application No. 02711175.6.

Official Action Dated Dec. 15, 2009 From the US Patent and Trademark Office Re.: U.S. Appl. No. 10/466,112.
Official Action Dated Aug. 27, 2009 From the US Patent and Trademark Office Re.: U.S. Appl. No. 10/466,112.
Response Dated Nov. 23, 2009 to Official Action of Aug. 27, 2009 From the US Patent and Trademark Office Re.: U.S. Appl. No. 10/466,112.
Response Dated May 26, 2009 to Communication Pursuant to Article 94(3) EPC of Jan. 30, 2009 From the European Patent Office Re.: Application No. 02711175.6.
Summons to Attend Oral Proceedings Pursuant to Rule 115(1) EPC Dated Dec. 15, 2009 From the European Patent Office Re.: Application No. 02711175.6.
Translation of Outline of the Office Action Dated Oct. 19, 2007 From the Japanese Patent Office Re.: Application No. 2002-561220.
Supplementary European Search Report Dated Feb. 22, 2008 From the European Patent Office Re.: Application No. 02711175.6.
Response Dated Dec. 2, 2008 to Office Action of Jun. 4, 2008 From the Israeli Patent Office Re.: Application No. 157036.

* cited by examiner

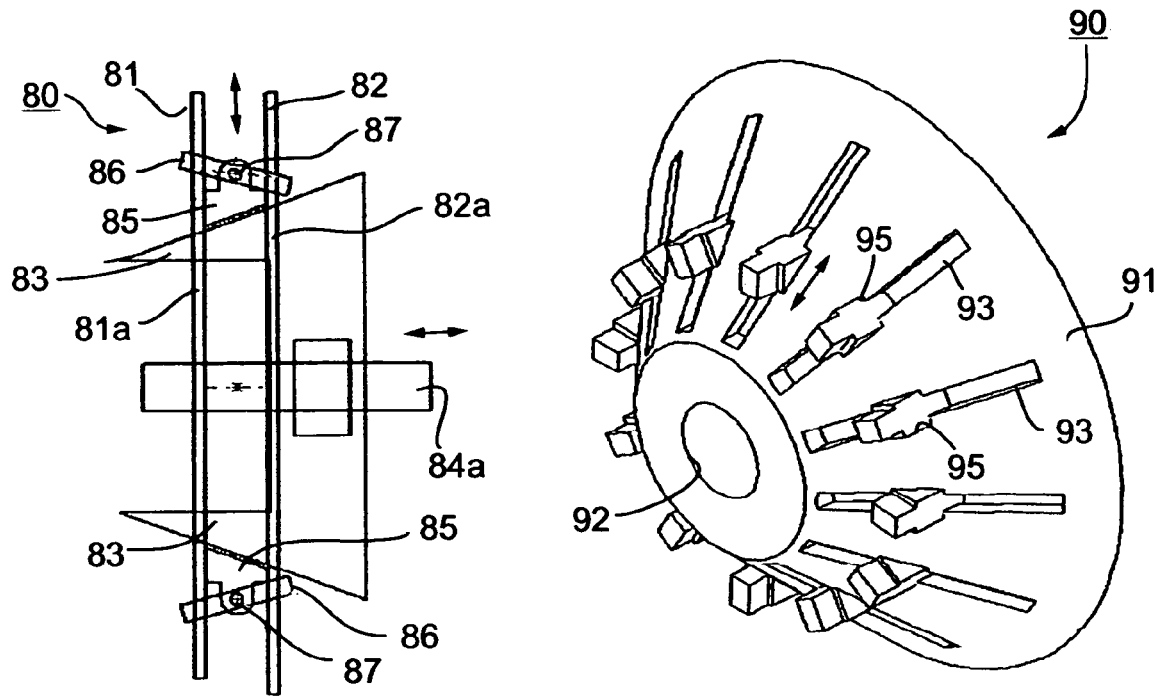
Fig. 31
Fig. 32
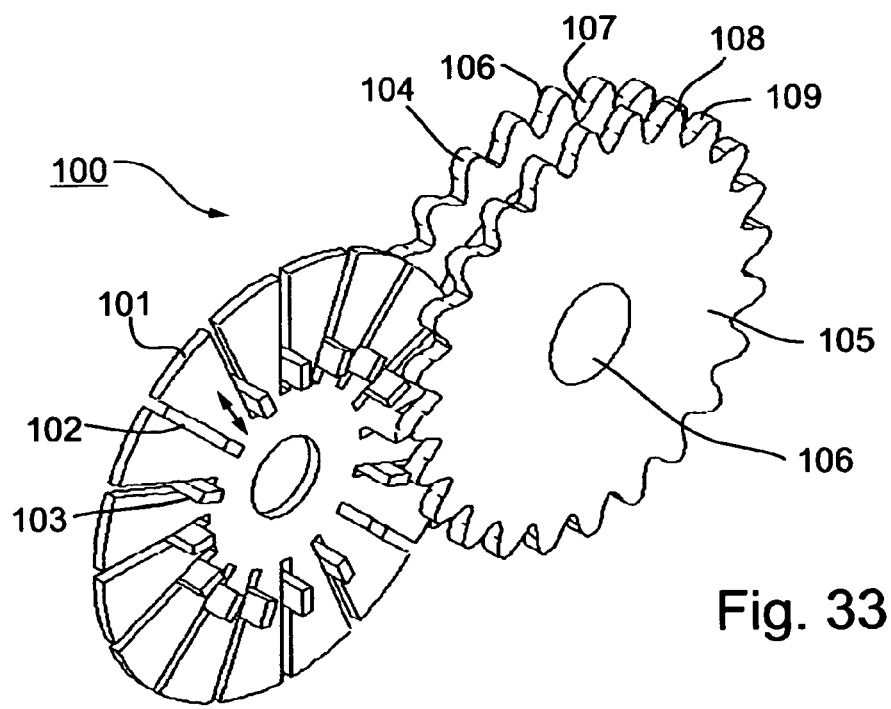
Fig. 33

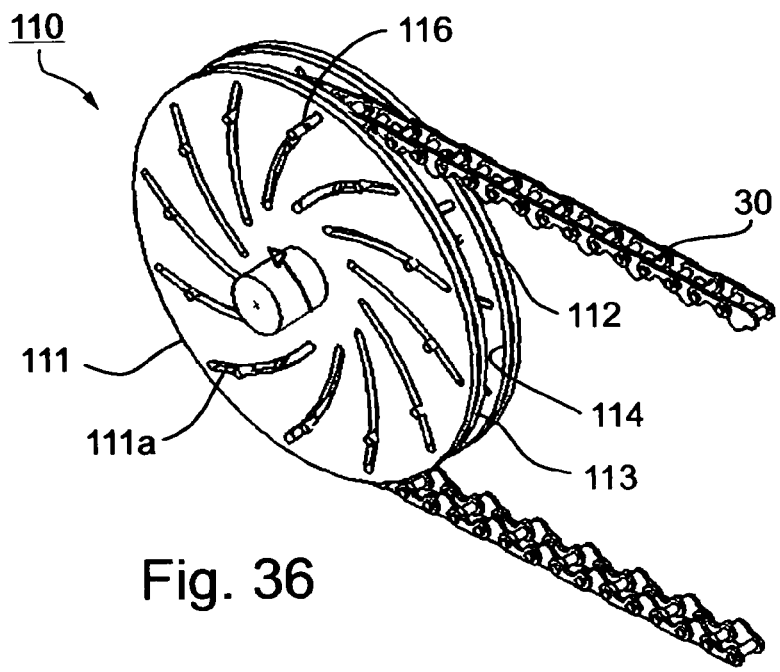
Fig. 36
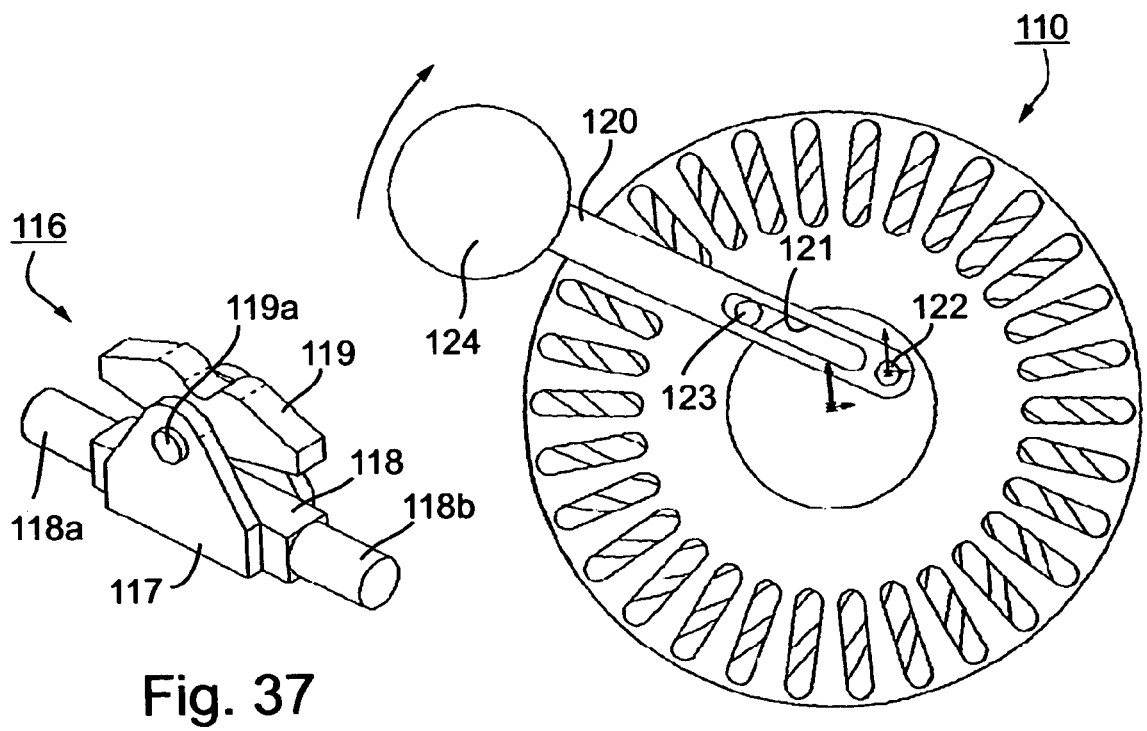
Fig. 37
Fig. 38

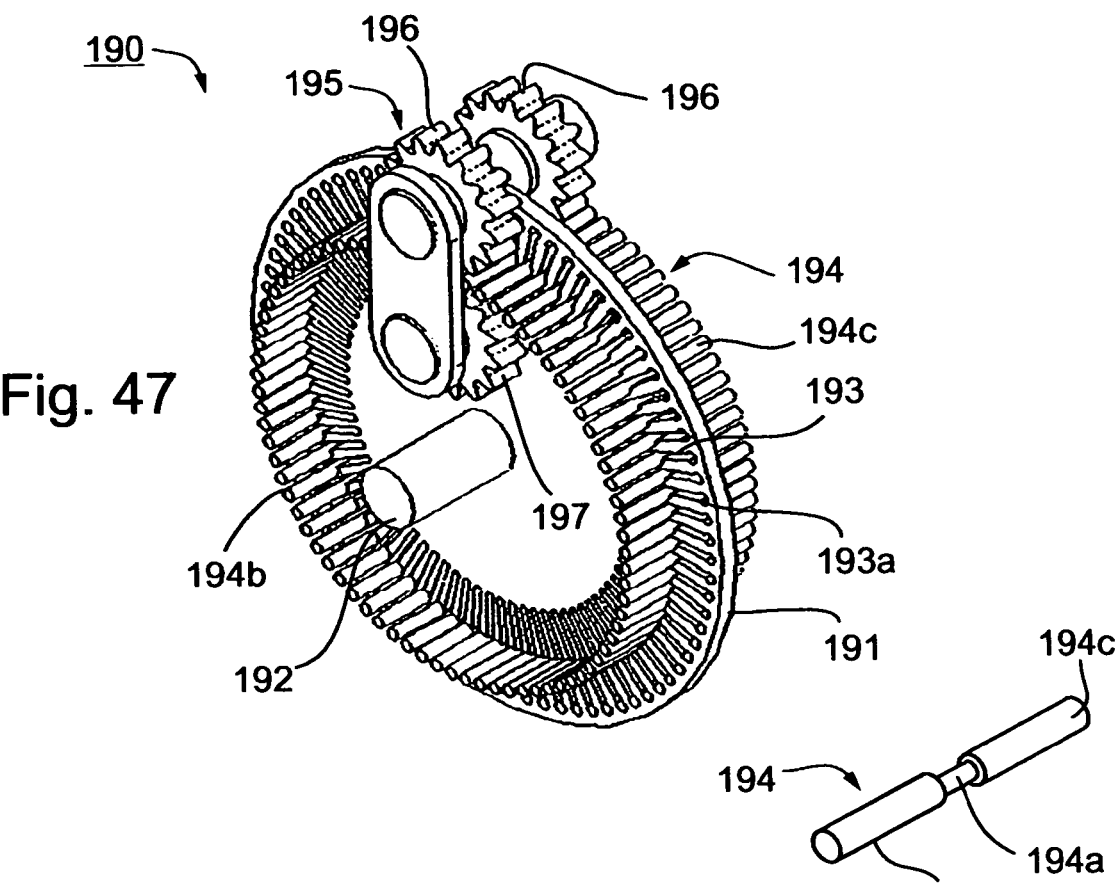
Fig. 47
Fig. 48
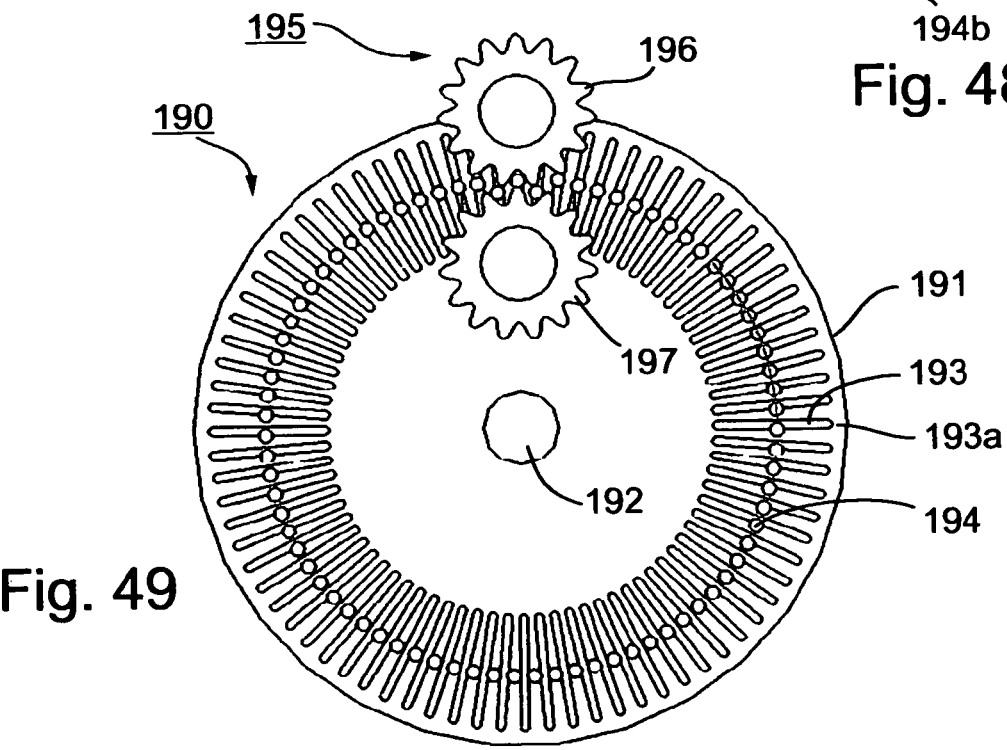
Fig. 49

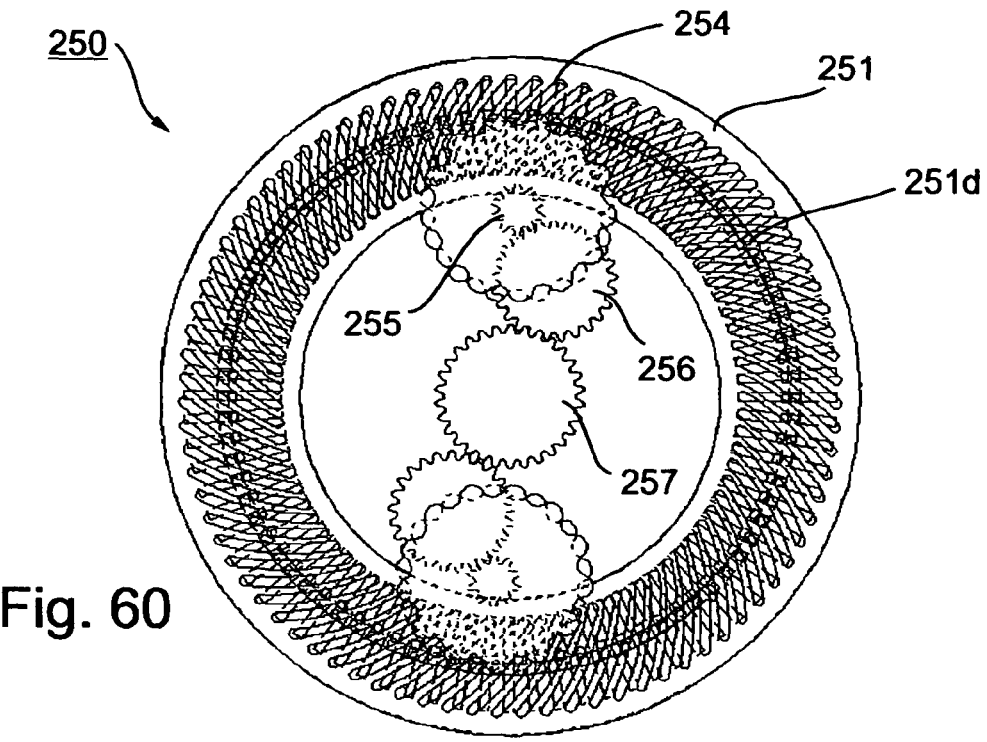
Fig. 60
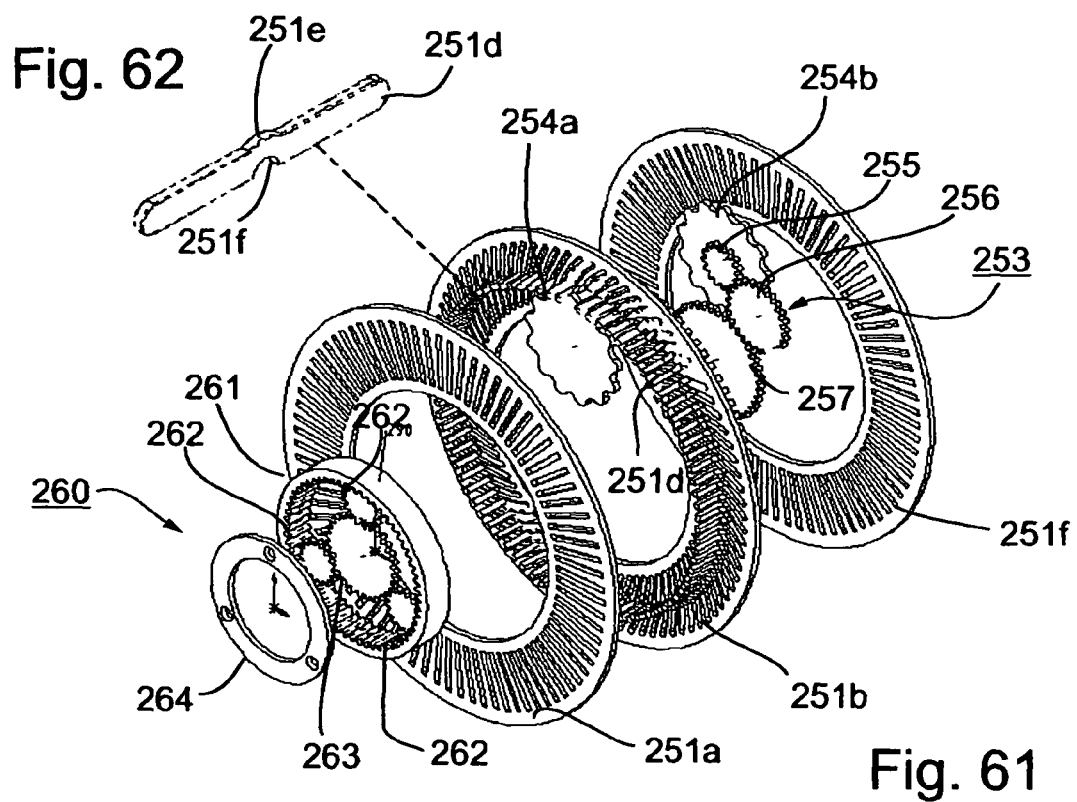
Fig. 62
Fig. 61

NON-SLIP TRANSMISSIONS PARTICULARLY USEFUL AS CONTINUOUSLY-VARIABLE TRANSMISSIONS AND TRANSMISSION MEMBERS THEREOF

FIELD AND BACKGROUND OF THE INVENTION

The present invention relates to non-slip transmissions particularly useful as continuously-variable transmissions, and also to transmission members included therein.

The term "continuously variable transmission" (CVT) is used herein in its normal and accepted sense, namely as a transmission in which the ratio of the rotational speeds of two shafts can be varied continuously, without break or interruption, within a given range, to provide an infinite number of possible ratios". A "continuously variable transmission" (typically using rubber belts and pulleys) is to be sharply distinguished from a "step-variable transmission" (typically including gears), which provides a finite number of possible ratios according to the steps (e.g. gear teeth), rather than an infinite number of possible ratios without break or interruption.

A main problem in many types of existing continuously-variable transmissions (CVTs) is slippage between the contacted surfaces. Slippage causes rapid wear of the contact surfaces, together with energy losses and low efficiency. These problems become more serious as the transmitted torque increases. For this reason, continuously-variable transmissions currently find little use in machines requiring high torque transmission, such as medium and heavy vehicles and industrial machinery.

The continuously-variable transmissions used at present are generally based on high-pressure contact between two smooth surfaces having a high coefficient of friction, rather than on contact between metallic bodies such as gear wheels which cannot slip and which have a low coefficient of friction. The commonest examples of the presently-used systems are those based on a V-belt made of rubber. The high coefficient of friction and the high pressure between the surfaces are intended to prevent slippage, but even this is insufficient in certain cases. Such systems may be adequate for the transmission of small torques, but are generally considered to be uneconomical and inefficient when applied to the transmission of high torques.

Transmission systems based on gears include a driving member and a driven member, engaging each other by matching sets of projections and depressions (gear teeth) that force one member to move along with the other member without slippage. The transmission ratio between the driving member and the driven member in these gears is constant.

As the transmission ratio of such gears is determined by the ratio between the number of cogs or teeth (projections) on each member, they cannot be used for producing a variable transmission ratio: If the diameter of one member is changed without changing the number of teeth, then the pitch between the teeth will not match the other member; and if the diameter is changed while preserving the pitch, then the number of teeth around the member will, at times, be fractional—making it impossible to continuously engage with the other member.

Several patents have issued on methods to create a non-slip continuously variable transmission (CVT), including the following:

U.S. Pat. No. 1,650,449 (Jaeger) and U.S. Pat. No. 4,952, 196 (Chilcote) disclose a CVT in which two wheels change their overall diameters so that a fixed length chain is suspended around both. For many wheel diameters in this method, the circumference of the wheel is not an integer number of teeth; therefore, a link of the chain will meet the circumference of the wheel out of phase. Special cumbersome means are therefore necessary to overcome this problem, if possible at all.

U.S. Pat. No. 1,601,662 (Abbott) discloses a CVT that addresses the above problems by a conical structure in which coupling elements in one member adjust their position to match the topography of the other member in each and every diameter. This method requires the coupling elements to converge to their operational position through a cumbersome back and forth trajectory in which they slide on and collide with other parts of the topography in a non-matching angles of contact, creating increasing friction and bending moments.

U.S. Pat. No. 6,055,880 (Gogovitza) discloses another conical approach of a CVT that ensures positive engagement at any transmission ratio, and addresses the problem of U.S. Pat. No. 1,601,662 by bringing each coupling element directly to its operational position. However, the conical structure of the system of this patent creates a non-uniform pitch and a non-uniform speed along the line of contact between the coupling element and the topography, resulting in the creation of undue differential stresses, bending moments, and slippage between the coupled elements. In practice, this system implies a small number of small lines of contact—thus a limited transmission of moments.

OBJECTS AND BRIEF SUMMARY OF THE INVENTION

An object of the present invention is to provide a transmission, and particularly a continuously-variable transmission (CVT), having advantages in some or all of the above respects. More particularly, an object of the invention is to provide a continuously-variable transmission which is capable of driving large loads, which substantially eliminates slippage, which provides a sufficient area of contact between the engaged surfaces, and/or which is characterized by low friction losses and high durability. Another object the invention is to provide a CVT having the capability of an infinitely-variable transmission (IVT). A further object is to provide a novel transmission members particularly useful in such transmission systems.

According to one broad aspect of the present invention, there is provided a continuously-variable transmission, comprising: first and second transmission members each having a group of coupling elements successively engageable to couple the transmission members for movement together; at least one of said transmission members being a rotary member rotatable about a rotary axis; at least one of said groups of coupling elements being radially displaceable towards and away from the rotary axis to change the conversion ratio of said transmission; the coupling elements of one of said groups on one of said transmission members being of a fixed configuration defining an array of projections each of a fixed configuration alternating with depressions each of a fixed configuration; said array of projections and depressions being on a surface of said one transmission member between opposite side faces of said one transmission member, and having the same pitch for every cross-section of said surface perpendicular to the rotary axis; the coupling elements of the other of said groups on the other of said transmission members being of a self-adaptive configuration, each individually movable in opposite directions to adapt itself to the configuration of said fixed configuration coupling elements in all displacement positions of the radially displaceable coupling elements and to effect a non-slip coupling therewith in all said radial displacement positions.

A "pitch" of an array of projections and depressions is the distance between common points on the array. In the CVT of the present application, the pitch of the surface formed with the projections and depressions is the same for every cross-section of the surface perpendicular to the rotary axis; this distinguishes from the conical surfaces of many of the prior-art CVT systems, and thereby, avoids many of the drawbacks of the prior art systems as briefly described above.

According to further features in the preferred embodiments of the invention described below, the projections and depressions of the fixed-configuration coupling elements at one side face of the one transmission member are in a staggered relationship with respect to the projections and depressions at the opposite side face of the one transmission member, such that each projection in one side face is aligned with a depression in the opposite side face, along a line parallel to the rotary axis.

In some preferred embodiments described below, each of the fixed-configuration coupling elements includes a gradual transition from a projection at one side face to a depression at the opposite side and in other described preferred embodiments, each of the fixed-configuration coupling elements includes a stepped transition from a projection ate one side face to a depression at the opposite side face.

As will be described more particularly below, the foregoing features enable continuously-variable transmissions to be provided having no significant slippage or friction despite the variations in spacing of the coupling elements produced with the variations in diameters of the respective transmission member. The foregoing features further provide a large area of contact between the coupling elements, minimal energy losses, and a capability of high torque transfer. In addition, such systems avoid the creation of undue differential stresses in the coupling elements along the contact lines, characteristic of continuously-variable transmission (CVT) systems having projections and depressions on conical surfaces. Such a transmission is also capable of being designed as an infinitely-variable transmission (IVT) having a large range of possible transmission ratios, even down to a zero velocity on the output shaft without the need for a clutch.

More particularly, and as will be described more particularly below, the present invention overcomes the drawbacks of the above described prior art CVT systems by providing self adaptable elements that:

1. adjust themselves without friction to the topography at any transmission ratio,
2. adjust themselves without friction to the topography at any incidental point of contact,
3. adjust themselves by moving in the direction of engagement between the members—as ordinary cog wheels are engaging into each other,
4. maintain a uniform pitch across the contact line with the topography, thus ensuring equal speed of motion and equal pressure between the members,
5. are capable of being designed with any desirable length of the line of contact, to enable high forces and high transmission moment.

In addition, the CVT mechanism of this invention can be designed in a large variety of configurations, including parallel input and output axii, concentric input and output members, indirect (e.g., chain, belt), and direct transmission.

A large number of embodiments of the invention are described below for purposes of example. In some described embodiments, the rotary member is a variable-diameter toothed wheel carrying the self-adaptive coupling elements in a radially-displaceable manner thereon; and the other transmission member is a fixed-diameter toothed wheel, or a toothed rack, or a flexible chain or belt, which carries the fixed-configuration coupling elements. Other embodiments are described wherein the other transmission member carries the self-adaptive coupling elements in a radially-displaceable manner; and the rotary member carries the fixed-configuration coupling elements. In some of the latter described embodiments, the other transmission member includes a disc formed with an annular array of radial slots around a central axis; and the self-adaptive coupling elements include an annular array of pins displaceable within the slots towards and away from the central axis.

Still further embodiments are described wherein the rotary member carries the fixed-configuration coupling elements in a radially-displaceable manner; and the other transmission member carries the self-adaptive coupling elements in an individually displaceable manner to adapt themselves to the configuration of the fixed-configuration coupling elements in all displacement positions thereof.

According to another aspect of the present invention, there is provided continuously-variable transmission, comprising: first and second transmission members each having a group of coupling elements successively engageable to couple the transmission members for movement together; at least one of said transmission members being a rotary member rotatable about a rotary axis; at least one of said groups of coupling elements being radially displaceable towards and away from the rotary axis to change the conversion ratio of said transmission; the coupling elements of one of said groups being of a fixed configuration defining projections alternating with depressions each of a fixed configuration; the coupling elements of the other of said groups being of a self-adaptive configuration, each individually movable in opposite directions to adapt itself to the configuration of said fixed configuration coupling elemenrs, in all displacement positions of the radially displaceable coupling elements; said other transmission member including a disc formed with an annular array of radial slots; said self-adaptive coupling elements including an annular array of pins displaceable within said slots; and said rotary member including a gear assembly having a gear meshing with said annular array of pins for producing a non-slip coupling therewith while effecting relative rotation between said disc and said gear assembly about the center of said annular array.

The term "toothed wheel" is used herein in its broadest sense to include any type of rotary transmission member having projections and depressions coupled to projections and depressions of another transmission member to transfer torque from one to the other. Thus, the toothed wheel may be of relatively small axial dimension, such as in a toothed gear or toothed disc, or of relatively large axial dimension, such as in a toothed cylinder or drum.

According to another aspect of the invention, there is provided a transmission system including a continuously-variable transmission having one or more of the foregoing combination of features, a condition sensor for sensing a predetermined condition, and an automatic control system for automatically displacing the first group of projections and depressions to change the effective diameter of the rotary member, and thereby the transmission ratio of the continuously-variable transmission, in response to the sensed condition.

In one described preferred embodiment, the condition sensor senses velocity of the transmission or the drive thereof (e.g., velocity of the foot pedals in a bicycle) and automatically controls the transmission ratio in response thereto; and in another described embodiment, the condition sensor senses load on the transmission or the drive thereof (e.g., load on the engine in a motorized vehicle) and automatically controls the transmission ratio in response thereto. The automatic control system may further include a response selector for selecting one of at least two predetermined responses, (e.g., slow or fast) of the automatic control of the transmission ratio to the predetermined sensed condition.

According to yet another aspect of the present invention, there is provided a variable-diameter rotary wheel particularly useful in such a continuously-variable transmission, comprising: an inner pair of spaced discs joined together by a first ring, and an outer pair of spaced discs joined together by a second ring coaxial with the first ring; one pair of discs being formed with a plurality of radially-extending straight slots, and the other pair of discs being formed with a plurality of radially-extending curved slots; and a plurality of pins having their opposite ends received in both a straight slot and in a curved slot of the respective discs, such that rotation of one of the discs in each pair with respect to the other disc in the pair causes the pins to move radially with respect to the discs, according to the direction of rotation, thereby changing the effective diameter of the rotary member.

According to a still further aspect of the invention, there is provided a continuously-variable transmission, comprising: first and second transmission members each having a group of coupling elements successively engageable to couple the transmission members for movement together; at least one of said transmission members being a rotary member rotatable about a rotary axis; at least one of said groups of coupling elements being radially displaceable towards and away from the rotary axis to change the conversion ratio of said transmission; the coupling elements of one of said groups being of a fixed configuration defining projections alternating with depressions each of a fixed configuration; the coupling elements of the other of said groups being of a self-adaptive configuration, each individually movable in opposite directions to adapt itself to the configuration of said fixed configuration coupling elements in all displacement positions of the radially-displaceable coupling elements; said rotary member including an inner pair of spaced discs joined together by a first ring, and an outer pair of spaced discs joined together by a second ring coaxial with said first ring; one pair of discs being formed with a plurality of radially-extending straight slots, and the other pair of discs being formed with a plurality of radially-extending curved slots; the opposite ends of each of said of coupling elements of said rotary member being received in both a straight slot and in a curved slot of the respective discs such that rotation of one of said discs in each pair with respect to the other disc in the pair causes said coupling elements to move radially with respect to said discs, according to the direction of rotation, thereby changing the effective diameter of the rotary member.

According to further aspects of the invention, there are provided other variable-diameter rotary wheel constructions particularly useful in the continuously-variable transmission of the present invention.

According to another aspect of the present invention there is provided a transmission for transmitting mechanical motion in a predetermined direction between a first member and a second member; the first member including a coupling element; the second member having an engagement surface formed with a topography of projections and depressions in a periodic pattern of the same pitch in every cross-section parallel to the direction of motion; the coupling element of the first member being placeable on the engagement surface of the second member at any point along the direction of motion and resting on the surface along at least one line of contact defined by points of rest; the coupling element of the first member having at least one point that does not change its elevation above the second member for any of the points of rest; the line of contact resting at least partially on a positive slope and partially on a negative slope of the engagement surface.

According to further features in this aspect of the invention, the first member is a variable diameter rotary member including an annular array of the coupling elements radially displaceable to change its effective diameter, and thereby to enable the transmission to continuously-vary the transmission ratio between the first and second members.

According to yet another aspect, the invention provides a transmission for transmitting mechanical motion between a rotary driving member and a rotary driven member having parallel axes of rotation, comprising: a pin parallel to the axes of rotation of said driving and driven members; one of said members being engageable with said pin allowing it a relative movement only in a direction that is essentially perpendicular to said axes of rotation and perpendicular to the pin; the other of said members being engageable with said pin such that when said other member is rotated, it forces the pin to move in both the tangential and the radial directions, wherein the tangential movement is in the direction of said motion, and the radial movement is periodic around a median radius.

According to yet another aspect of the invention, there is provided a transmission member for coupling to a rotary member rotatable about a rotary axis; the transmission member having opposite side faces and a surface between the side faces formed with an array of projections and depressions for coupling to another transmission member; the array of projections and depressions being of the same pitch from one side face to the opposite side face; the projections and depressions in one side face being in a staggered relation to the projections and depressions in the opposite side face, such that each projection in one side face is aligned with a depression in the opposite side face along a line parallel to the rotary axis. Various embodiments are described wherein the transmission member is a toothed wheel, a closed-loop flexible chain, a closed-loop flexible belt, and a rack.

Further features and advantages of the invention will be apparent from the description below.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 31, 32 and 33 illustrate three further variable-diameter toothed wheel constructions in accordance with the present invention;

FIG. 36 is a perspective view of a CVT including a chain and the variable-diameter toothed wheel of FIGS. 34 and 35;

FIG. 37 illustrates an example of one of the radially-displaceable coupling elements in the variable-diameter toothed wheel of FIGS. 34-36;

FIGS. 38 and 39 illustrate two CVT systems, each according to FIGS. 34-37 and each having an automatic control for controlling the transmission ratio in response to velocity or other predetermined condition, such as load;

FIG. 47 illustrates an implementation of the invention in a CVT system in which one of the transmission member includes a variable-diameter toothed wheel having an annular array of pin coupling elements serving as a rotating or non-rotating ring gear, and the other transmission member is a gear assembly having gears located on opposite sides of the pins and meshing with them;

FIG. 48 illustrates one of the pin coupling elements in the transmission of FIG. 47;

FIG. 49 is an end view of the CVT system of FIG. 47;

FIG. 60 is an end view of the CVT system of FIGS. 59a and 59b;

FIG. 61 is an exploded view of the CVT system of FIG. 60 including a planetary gear assembly for multiplying the range of transmission ratios permissible by the transmission;

FIG. 62 illustrates one of the pins in the annular pin array in FIG. 61;

MECHANISM OF ACTION

Figure 1:
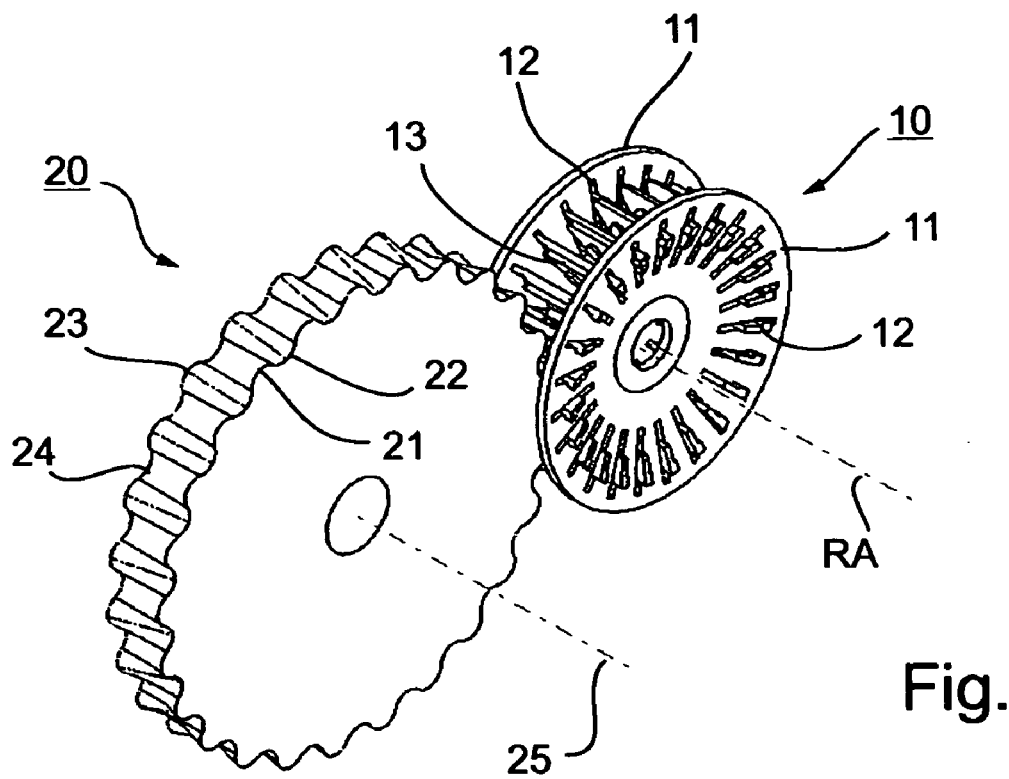
FIG. 1 illustrates one form of continuously-variable transmission (CVT) constructed in accordance with the present invention.

The present invention discloses a mechanism for continuous variable transmission which serves for continuously varying the transmission ratio between an input (driving) transmission member and an output (driven) transmission member, using mechanical engagement between the two transmission members. The engagement between the transmission members is mediated by coupling elements that are forced to move in the driving direction by the driving member, and in turn force the driven member to move in the same direction.

An important feature of the present invention is in the way by which the coupling elements are connected to one of transmission members, and in the way that they are coupled to the surface of their member. This innovative way enables the transmission of the present invention to change the transmission ratio between the members with substantially no slippage and minimal friction.

In all embodiments of the invention described below, at least one of the two members is rotary, rotating around an axis. This member is equipped with an annular arrangement of coupling elements, having projections and depressions designed to match depressions and projections in the other transmission member, and with a mechanism of changing the effective radius of the annular arrangement. Changing the radius of the annular arrangement changes the effective radius of the transmission member and therefore changes the transmission ratio of the transmission, but at the same time it also changes the tangential density of the coupling elements, and therefore makes it impossible to engage the coupling elements into an ordinary transmission member such as a cog wheel or a transmission chain or belt. These ordinary transmission elements have a constant pitch, thus cannot be engaged without slippage or friction with an annular arrangement of elements having a varying pitch.

In the embodiments of the invention described below, the coupling elements on the rotational transmission member change their pitch, as a result of changing the annular arrangement radius. These coupling elements, or the coupling elements that define the topography of the other transmission member, have a degree of freedom for local movement (rocking, rotation or small displacement) that enables these coupling elements, upon approaching contact with the topography of the other transmission member, to adapt themselves to the topography of the other member, so that, upon tight contact, they will contact each other along at list one line of contact (rest points), without extracting a moment on each other in the direction of transmission. This feature can be achieved in any one of several ways some of which are described in further detail hereinbelow. In some described embodiments (e.g., FIGS. 1-4, as well as some of the others) this is achieved by allowing the coupling elements of one of the members to move about, e.g., around a pivot point, and self-adapt into contact with the topography of the other member, so that at least portions of the contact line contact the topography of the other member against a positive slope, hence forcing the other member to move in the transmission direction. The transmission takes place where the pivot point of the coupling element is driven by one of the members, and the driven member is moved through the motion of the line of contact with the other member is due to the positive slope of the topography. The geometry of the coupling member is such that the positive contact with the other member takes place while the pivot point does not change its radius.

The line of contact between the coupling elements and the other member is oriented so that the pitch of the topography is essentially constant across the line of contact, so that when motion takes place, there is negligible slippage or friction between the coupling elements and the other member. Moreover, the geometry can be designed using evolving shape, making the transmission mechanism similar to an ordinary cogwheel.

In order to explain the mechanism that maintains the contact between the coupling element and the surface of the other member without slippage, the transmission member that is connected to the coupling element will be referred to in the following paragraphs as "the driving member" and the transmission element that is brought in contact with the coupling element "the driven member". It will however be appreciated that the roles ("driving" and "driven") of the members can be reversed.

Thus, in the FIGS. 1-4 embodiment, the driving member holds the coupling elements so that, for a given transmission ratio, the distance of the pivot of the coupling elements from the rotation axis of the transmission member is constant. The pivot of the coupling element can either be a physical axis that is connected to the driving member, or a virtual pivot that is defined by a circular guide in which the coupling member can rotate. The driving member is holding all the coupling elements at their pivot, rotating them as it moves, and pushing them towards the surface (topography) of the driven member. As the coupling element is approaching the surface of the driven member, one of its projected edges will touch the surface, and as the coupling element is free to move about its pivot, the coupling element will adapt it position to give way to the approaching surface. The movement will continue until another point of the coupling element will contact the surface of the driven member, and at that moment the coupling element will be supported by at least three points, and will be constrained from any further movement relative to its pivot. Further force of the driving member towards the driven member will increase the pressure between the two members (through the mediation of the coupling element).

This situation could now cause the coupling member to slip or slide on the surface of the driven member in an attempt to give way to the driving member to come even closer to the driven member. However, the specific topography of the surface of the driven member and the geometry of the coupling element do not allow this slippage: The topography of the driven member is such that for any relative position of the coupling element relative to the surface of the driven element, the sum of displacements of both ends of the contact line between them is constant. This means that if one edge of the coupling element has to be recessed by 2 mm in order to touch the surface of the driven member, then the other edge of the same coupling element has do be projected by 2 mm in order to touch the surface of the driven member. Such topography can easily be created by designing the driven member as a pair of two parallel disks with a varying radii. The first disk can have, for example, 36 sinusoidal periods along its perimeter following the equation $R(\phi°)=12$ cm$+\sin(10*\phi°)$, while the other disk can have 36 sinusoidal projections and depressions following the equation $R(\phi°)=12$ cm$-\sin(10*\phi°)$. It is clear that for any angle $\phi$, a segment that connects the respective point of angle $\phi$ on the two disk perimeters, will have its center on an imaginary circle between the two disks, with a fixed radius of 12 cm. Thus, if this imaginary circle contains the pivot points of the annular arrangement of coupling elements, and if the straight segment represents the contact line of the coupling elements with the topography of the driven member, and further if the two disks represent the topography of the driven member, then for any contacting position, (and after due consideration of the size and shape of the coupling elements), the projection of one edge of the coupling element is identical to the recession of the other end, and the pivot point preserves its distance from the rotation axis.

It is clear that there are many other topographies that satisfy this requirement, other than that of FIGS. 1-4, and that the topography can be continuous and touch the coupling element along a line or a plurality of lines while maintaining a similar condition as in FIGS. 1-4.

As the topography of the driven member has positive and negative slopes, it is clear that when the coupling member is pressed onto it along the line of contact, and is also pushed in the driving direction, one of the edges of the coupling element will be engaged with the slope of the driven member so as to force it to move along in the direction of transmission. If the coupling element is contacting the driven member along a line, than part of the contact line will meet the topography of the driven member in a positive slope and the mechanical engagement will take place along that half line.

The slopes of the topography should, at least at some places, be sufficiently steep to prevent the coupling element from sliding along the curves of the topography.

It is to be noted that the small movement that the coupling element has to move while approaching the driven member towards its settled position, takes place at the direction of coupling, so that the force needed to be applied on the coupling element to bring it to its settled position is negligible and is easily provided by the driving member.

It is also to be noted that the movement that the coupling element has to move while approaching the driven member towards its settled position is small and unidirectional.

The length of the line of contact can be designed to be long enough to support high driving forces. Such a length can be provided by enlarging the width of the driven member. It will be appreciated that it does not imply an increase of the diameter of the transmission.

The continuous transmission described herein can be implemented in a wide variety of mechanisms in addition to that of FIGS. 1-4. It can be designed so that the effective diameter of the driving member will be changed by changing the distance between two disks, and the two disks can partially overlap each other along the axis of rotation, thus saving space and enabling relatively small mechanisms.

The driven member can be a chain, rather then a wheel. The two parallel faces of the link of the chain will be cut to have the desired topography, and the coupling element that will, in this case, by connected to the driving wheel, will adapt themselves to meet the link along lines that are parallel to the joint connecting the links to each other. By using the faces of the link to perform the contact with the coupling element, the axii of the links are free to be engaged with an ordinary cogwheel, enabling the chain to be driven by the CVT of this invention, and in turn drive an ordinary cogwheel.

The CVT described herein can be applied to an infinite variable transmission (IVT) mechanism, that can change the transmission ratio between the driving and driven members from any negative ratio to any positive ratio through the zero value (in which the driven member will not be rotating at all while the driving member is rotating). This can be done by holding a differential cogwheel between two parallel cog disks with their annular arrangement of cogs facing each other and engaged to the differential cogwheel. By engaging one of the parallel cog disks to the driving member so that its rotation speed is determined by some fixed transmission ratio, and engaging the other cog disk to a CVT mechanism as described herein, giving it a range of speeds that changes from slower than the first cog disk to higher than the cog disk, the differential cog wheel will rotate around itself at a rate that is proportional to the difference between the speeds of the two cog disks, and will revolve around the axis of the cog disks at a rate that is proportional to the sum of the speeds of the two cog disks. As this sum can be negative, zero or positive, the differential will revolve at an infinite transmission ratio.

There are several ways to control the effective radius of the ring of coupling elements, thus changing the transmission ratio of the transmission. Examples of these methods are described in detail herein.

One method is to hold the coupling elements on sliding members that can change its radial position, apply to it a permanent force (typically using a spring) towards one direction (either inwards or outwards), and apply a positive controllable force in the opposite direction to overcome the permanent force and bring the pivot of the coupling member to the desired radius.

A second method is to hold the coupling elements in guides that allow the elements to move radially towards and away from the axis of rotation of the driving member, to capture the coupling element between the driven member and a support wheel on the driven member that keeps it engaged to the driven member, and changing the distance between the axii of the two members so that the coupling element will be forced to change its position along the guides of the driving member and hence change the effective radius of the transmission.

A third method is to hold the coupling elements between two pairs of parallel disks, one pair having facing parallel slots through which the coupling member is threaded, and the other pair having the same number of facing spiral slots through which the same coupling element is also threaded. Each radial slot has an overlap with one spiral slot so that there is one straight through passage through the four disks, and the coupling element is forced to be positioned at this point of overlap. By changing the angular position of the radial slots in relationship to the spiral slots, the point of overlap changes its radius, forcing the coupling elements to change their radius and hence the ratio of transmission.

An important feature of this invention, therefore, is the use of a coupling element that has a limited freedom to move about its holding transmission member around a line, that will be defined and referred to below as "the coupline".

The coupling elements in the embodiments of this invention are self-adaptive, in the sense that when they come into proximity with the topography of the other transmission member in the course of the transmission process, they change their spatial orientation.

Before the self-adaptation begins, the orientation of the coupling element is determined by the way it is connected to the first transmission member. This way of connecting may allow the coupling member some limited free motion, and forces, such as gravitation, centrifugal force, and spring action, may effect its orientation within that limited free motion.

After the self-adaptation terminates, the orientation of the coupling element is firmly constrained between the transmission elements and is essentially stationary in relation to both members, until it ends its "duty" to deliver the moment from the first transmission member to the second transmission member, whereupon it is released from between the members to resume its limited freedom position, until it will be called to "duty" again.

For each of the coupling members, there is a line, parallel to the axis of rotation of the rotary transmission member, that crosses the transmission member to which the coupling element is connected at a fixed point, that has the same distance from the second transmission member at the end of the adaptation process, for any possible position of contact between the coupling element and the transmission member. In some embodiments of the invention described below, this line is the center of an axis that holds the coupling member on the transmission member. In other described embodiments, this line is the center of a circular groove in the transmission member, inside which the disk-shaped coupling member can rotate. In yet other embodiments this line is the median of a plurality of possible locations of a pin that moves within the coupling elements.

The fact that this line, hereinafter called "the coupline", is fixed regarding the holding transmission member, ensures that the coupling element will be firmly engaged with the second transmission member for any transmission ratio and for any point of contact along the topography.

The existence of the coupline is an important feature of this invention and clearly distinguishes it from prior CVT systems. It enables the two transmission members to be in a positive mechanical engagement with each other, as in an ordinary spur gear transmission, while the phase of engagement between them is completely continuous and can take place at any phase they meet—like in a friction belt gear. Another advantage of the CVT of the present invention is that it permits the axes of the drive and driven shafts to be parallel to each other, as in a spur gearing system.

GENERAL CONSTRUCTION AND ADVANTAGES OF DESCRIBED EMBODIMENTS

The continuously-variable transmission of the present invention is described below with respect to a large number of preferred embodiments all of which include a combination of features producing a number of important advantages, as will also be described more particularly below.

One feature common to the described embodiments is that at least one of the two transmission members is a rotary member rotatable about a rotary axis. In most of the preferred embodiments described below, the rotary member is a toothed wheel (as broadly defined above); and the other transmission member is also a rotary member, e.g., another toothed wheel, a flexible closed-loop chain or belt, etc. However, other embodiments are described wherein the other transmission member is non-rotary, e.g., a linearly-movable rack, or a ring gear which may be fixed or rotatable.

According to further features common to the preferred embodiments of the invention described below, at least one of the groups of coupling elements is radially displaceable, preferably as a group, towards and away from the rotary axis to change the conversion ratio of the transmission. According to still further common features, the coupling elements of one of the groups on one of the transmission members is of a fixed configuration defining projections alternating with depressions each of a fixed configuration. As described below, the array of projections and depressions formed on a surface of the one transmission member extending between opposite faces of that transmission member, and have the same pitch from one side face to the opposite side face. In addition, the coupling elements of the other group on the other transmission member is of a self-adaptive configuration; that is, each is individually displaceable to engage oppositely sloped surfaces of the array of projections and depressions, and thereby adapting themselves to the configuration of the fixed-configuration coupling elements in all displacement positions of the radially-displaceable coupling elements to effect a non-slip coupling therewith in all the radial displacement positions.

The radially-displaceable coupling elements may be on either transmission member. In addition, the fixed-configuration coupling elements may be on either transmission member, and the self-adaptive coupling elements may be on the other transmission member. Hence, it will be appreciated in this respect that either the fixed configuration projections and depressions or the self adaptive projections and depressions can be those coupling elements that are radially displaceable so as to control the transmission ratio.

Since the pitch of the projections and depressions, i.e., the distance between common points thereon, is the same on both side faces of the transmission member, the creation of differential stresses along the contact lines between the transmission members, characteristic of prior art CVT systems utilizing conical contacting faces, is clearly avoided or reduced to a high degree in the CVT constructed according to the present invention.

An additional advantage in the preferred embodiments of the invention described below is that the force required to radially displace the contact elements is relatively small. Thus the contact plates move perpendicularly to the axis of rotation exactly as the teeth of ordinary meshing gears. Such an arrangement effects a more efficient torque transfer, reduces friction, wear, and the possibility of breakage, and also permits transmission changes by the application of relatively small forces.

The foregoing mechanism of action and advantages, as well as additional advantages, attainable thereby will be more readily apparent from the description below of a number of preferred embodiments of the invention.

DESCRIPTION OF PREFERRED EMBODIMENTS

FIGS. 1-4 illustrate a continuously-variable transmission CVT constructed in accordance with the invention and including two rotary members, namely a variable-diameter toothed wheel 10 rotatable about rotary axis RA, and a fixed-diameter toothed wheel 20 rotatable about its rotary axis 25, parallel to rotary axis RA.

The variable-diameter toothed wheel 10 includes a pair of axially-spaced discs 11, 11, formed with a plurality of radially-extending slots 12, 12, receiving the opposite ends of an annular array of coupling elements 13.

Figure 3:
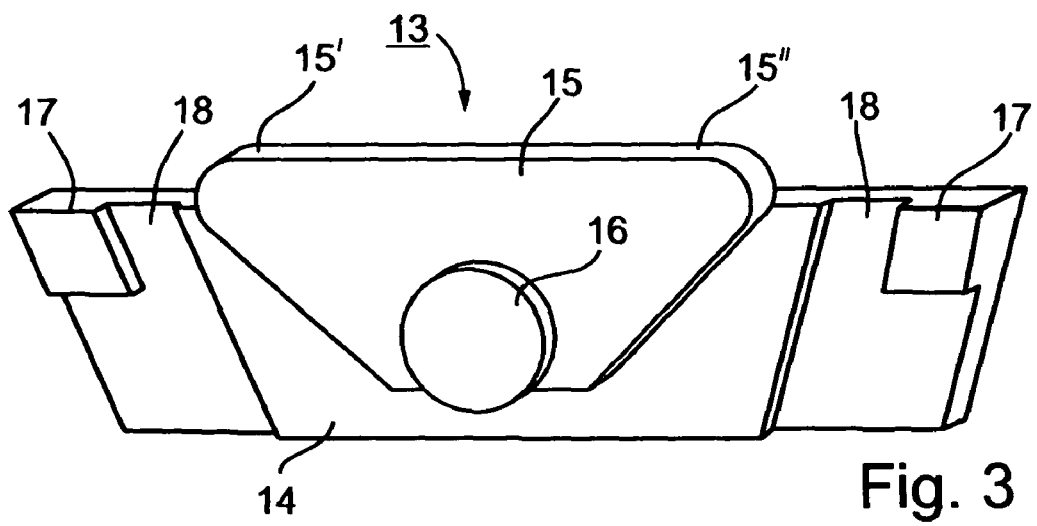
FIG. 3 illustrates one of the self-adaptive coupling elements in the transmission of FIG. 1.

The construction of each of the coupling elements 13 is more particularly illustrated in FIG. 3. It includes a mounting plate 14 having its opposite ends slidably received within slots 12, 12 of the wheel discs 11, 11. It also includes a contact plate 15 pivotally mounted at 16 to the mounting plate. The opposite ends of the mounting plate 14 are thickened, as shown at 17, to define tracks 18 to be slidably received within the slots 12, 12 of the wheel discs 11, 11. One end of each slot 12, 12 may be widened (not shown) to facilitate the application and removal of the mounting plates 14 from the slots 12 of the discs 11.

It will be seen that mounting plates 14, being slidably received within the slots 12, 12, permit the coupling elements 13 to be displaced radially with respect to the toothed wheel 10 to change the effective diameter of the toothed wheel. It will also be seen that the pivotal mountings 16 of the contact plates 15 permit one end (e.g., 15') of each contact plate to be moved upwardly to define a projection to engage a depression in wheel 20, and causes the opposite end (e.g., 15") to be pressed downwardly to define a depression to be engaged by a projection in wheel 20. Coupling elements 13 are thus of a self-adaptive configuration enabling them to adapt themselves to the configuration of the projections and depressions in the fixed-diameter toothed wheel 20 in all effective diameters of the variable-diameter toothed wheel 10.

Figure 4:
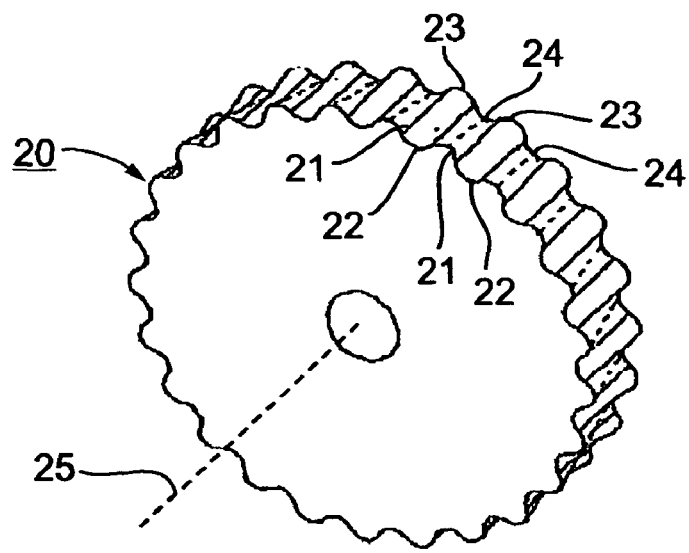
FIG. 4 illustrates the fixed-diameter toothed wheel in the continuously-variable transmission of FIG. 1.

The construction of the fixed diameter toothed wheel 20 is more particularly illustrated in FIG. 4. It is formed on its outer circumference with a first series of projections and depressions 21, 22 on one side, and a second series of projections and depressions 23, 24 on the opposite side, in staggered relationship to the first series; that is, a projection, (e.g., 21) formed on one face is axially aligned with a depression (e.g., 24) formed on the opposite face along a line parallel to the rotary axis RA of wheel 10, as well as its own axis 25. It will also be seen that, since toothed wheel 20 of a cylindrical construction (rather than of a conical construction), the pitch of the projections 21, 22 on one side face of the wheel is exactly the same as the pitch of projections 23 and depressions 24 on the opposite side, even though the two series of projections and depressions are in the above-described staggered relationship.

In the construction of the toothed wheel 20 illustrated in FIGS. 1 and 4, this staggered relationship between the two series of projections and depressions 21-24 is produced by forming the projections and depressions obliquely to the rotary axis 25 of the toothed wheel 20. Such an arrangement thus produces a gradual transition between the series of projections and depressions 21, 22 on one side, and the series of projections and depressions 23, 24 on the opposite side.

It will thus be seen that the transmission illustrated in FIGS. 1-4 is continuously-variable by moving the two discs 11, 11 of the variable-diameter toothed wheel 10 towards or away from each other. Moving the discs towards each other forces the coupling elements 13 of the toothed wheel 10 radially outwardly, to thereby effectively increase the diameter of the toothed wheel; whereas moving the discs away from each other causes the coupling elements 13 to move inwardly, thereby decreasing the effective diameter of the toothed wheel.

It will also be seen that, irrespective of the effective diameter of the toothed wheel 10, its contact plates 15 of the coupling elements 13, when engaged by the projections and depressions 21-24 of the fixed-diameter toothed wheel 20, will automatically pivot on the pivot 16 to engage, at the opposite ends of the contact plates 15, oppositely sloped surfaces of the projections and depressions 21-24, and thus self-adapt themselves to the configuration of those projections and depressions. The opposite ends of each contact plate 15 move the same distance, but in opposite directions, such that the mean distance between the two ends should be the same for each pivotal position of the contact plate.

It will further be seen that the engagement of the contact plates 15 with the projections and depressions 21-24 of the toothed wheel 20 will be along single line contacts; and further, that the pitch of the projections and depressions 21-24 is the same at both side faces of wheel 20, the pitch of the projections and depressions along each line of contact will be the same for all points on the respective line of contact. Accordingly, the problem of creating undue differential stresses in the coupling elements along the lines of contact, characteristic of CVTs having projections and depressions on conical surfaces, is avoided or greatly reduced.

Several ways of moving the two discs 11, 11 towards or away from each other in order to change the effective diameter of the toothed wheel are described below particularly with respect to FIGS. 29-37.

While in FIGS. 1-4, the coupling between the variable diameter toothed wheel 10 with the fixed diameter toothed wheel 20 is effected on the outer periphery of the coupling elements 13, it will be appreciated that the coupling can also be effected on the inner periphery of the coupling elements, whereupon the fixed diameter toothed wheel 20 will be located within the variable diameter toothed wheel 10. Similarly, the fixed diameter toothed wheel 20 could be in the form of a ring in which the projections and depressions are on the inner periphery of the ring and are coupled to the outer periphery of the variable diameter toothed wheel located within the ring.

It will also be seen that the CVT illustrated in FIGS. 1-4 transmits mechanical motion in a predetermined direction between the two rotary members (10, 12), namely about their rotary axes; that one member (wheel 10), includes a coupling element (13), and the other member (wheel 20) has an engagement surface formed with a topography of projections and depressions 21-24 in a periodic pattern of the same pitch in every cross-section parallel to the direction of motion; that the coupling element 13 of wheel 10 is placeable on the engagement surface of wheel 20 at any point along the direction of motion and rest on that surface along at least one line of contact; that coupling element 13 has at least one point, namely the median point in all inclined positions of contact plate 15, that does not change its elevation above wheel 20 for any of the points of rest of coupling element 13 and that the line of contact of contact plate 15 of coupling element 13 rests at least partially on a positive slope and partially on a negative slope of the surface formed with the projections and depressions 21-24.

It is to be noted in FIG. 3 that pivot axis 16 of the contact plate 15, carried by each of the coupling elements 13, lies under the contact surface of the contact plate. A situation is therefore created in which the mean height of the two points of contact is lower when the plate is level than when the plate is inclined. This may be suitably compensated for by appropriately configuring the projections and depressions 21-24 in the fixed-diameter toothed wheel 20.

Figure 5:
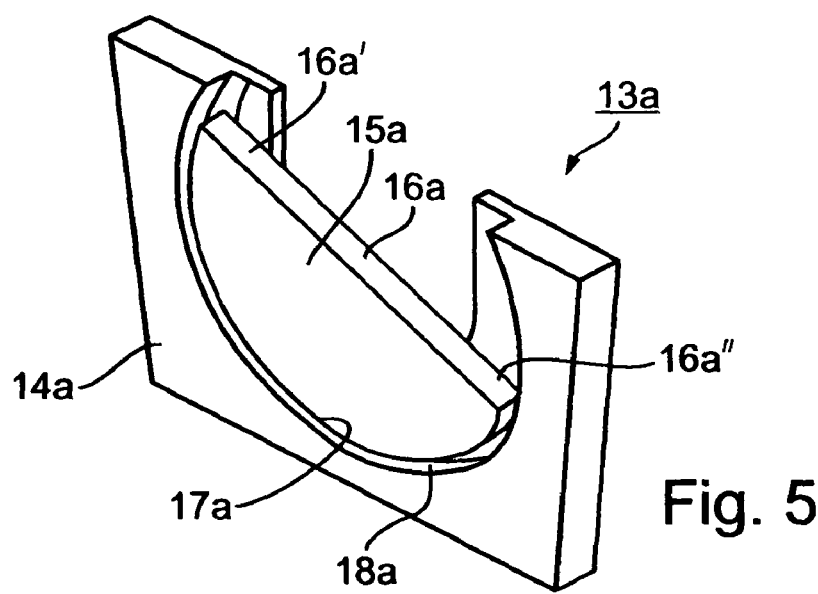
FIG. 5 illustrates a modification in the construction of the self-adaptive coupling element of FIG. 3.

FIG. 5 illustrates another construction of coupling element, therein designated 13a, to define the self-adaptable projections and depressions in the variable-diameter toothed wheel 10 for use with the toothed wheel 20 of FIGS. 1 and 4. In the construction illustrated in FIG. 5, the coupling element 13a includes a mounting plate or holder 14a rotatably mounting a contact plate 15a in the form a disc having a flat contact edge 16a and a semi-circular lower edge 17a rotatable within a semi-circular groove 18a formed in the mounting plate 14a. Thus, when disc 15a is rotated in one direction, one end 16a" of its contact edge 16a is moved in one direction to define a projection engageable with a depression on wheel 20, and the opposite end 16a" of its contact edge is moved in the opposite direction the same amount to define a depression to be engaged by a projection on wheel 20.

An advantage in the rotatable disc configuration of FIG. 5 is that the center of rotation of the disc 15a can be located centrally of the top edge 16a of the disc, such that the mean height of the points of contact will remain the same in all rotational positions of the disc. Additional accessories may be added, such as ball bearings, in order to reduce friction during the rotation of the contact disc 15a.

Figure 6:
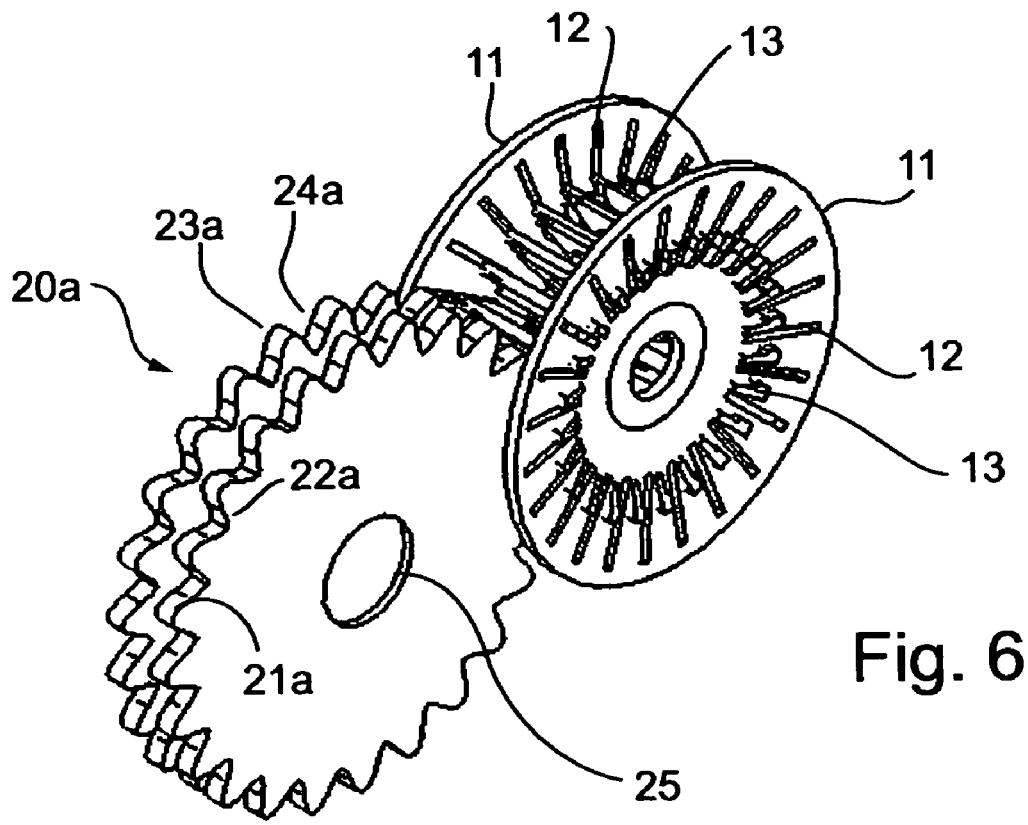
FIG. 6 illustrates a CVT including another type of fixed-diameter toothed wheel.
Figure 7:
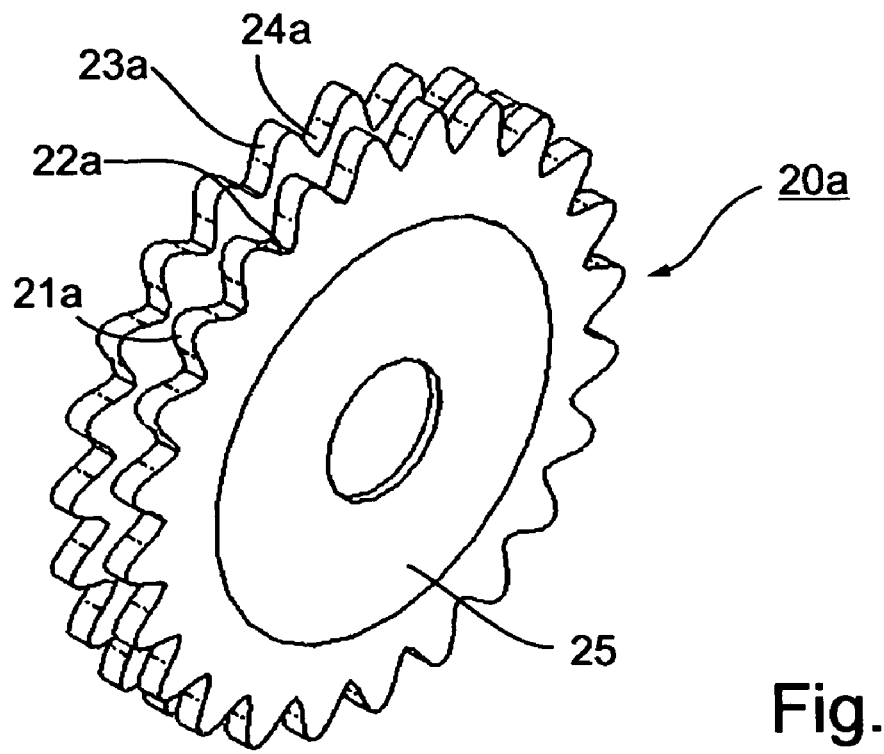
FIG. 7 more particularly illustrates the fixed-diameter toothed wheel of FIG. 6.

FIGS. 6 and 7 illustrate a variation in the construction of the fixed-diameter toothed wheel 20, therein designated 20a. Thus, as shown in FIGS. 6 and 7, toothed wheel 20a also includes a first series of projections and depressions, 21a, 22a on one side, and a second series of projections and depressions 23a, 24a on the opposite side, in staggered relationship to the first series, such that a projection in one series is axially aligned with a depression in the other series. In this case, however, instead of having a gradual transition between the two series of projections as in FIGS. 1 and 4, two discs, each formed with one series of projections and depressions, may be fixed on a central ring 25, so that the transition between the two series is stepped, rather than gradual. However, the operation is basically the same as described above with respect to toothed wheel 20 illustrated in FIGS. 1 and 4, in that the fixed projections and depressions 21a-24a on the toothed wheel 20a are of the same pitch from one side face to the opposite side face, and cause the self adaptable coupling elements 13 in the variable-diameter toothed wheel 10 to automatically adapt themselves to the configuration of the projections and depressions on the toothed wheel 20a. They thus provide line contacts with the projections 21a-24a of the toothed wheel 20a in all effective diameters of the wheel 10. The construction of FIGS. 10 and 11 thus also effects a non-slip coupling, without producing excessive differential stresses along the contacted surfaces, in all conversion ratios of the transmission in the same manner as described above with respect to FIGS. 1-4.

Figure 8:
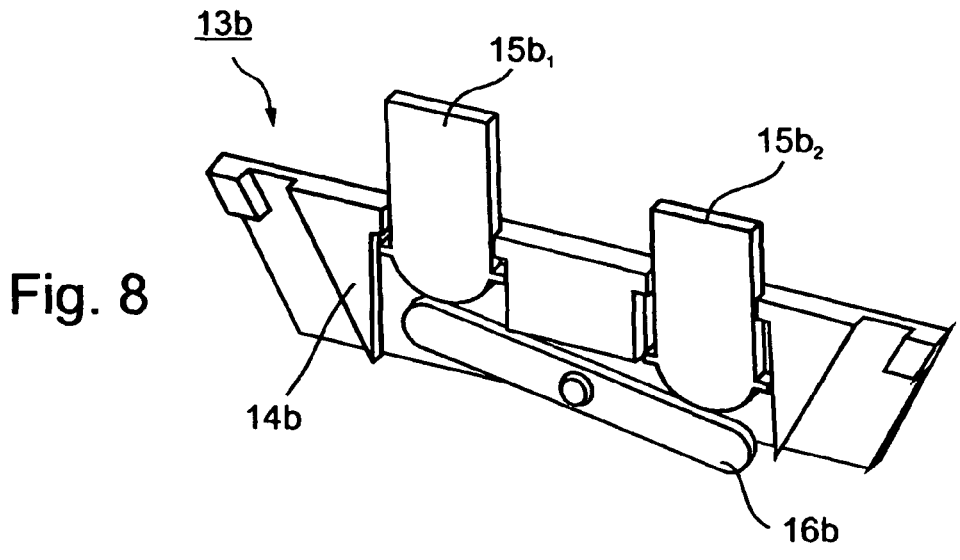
FIGS. 8 and 9 illustrate self-adaptive coupling elements that may be used with the toothed wheel of FIGS. 6 and 7.
Figure 9:
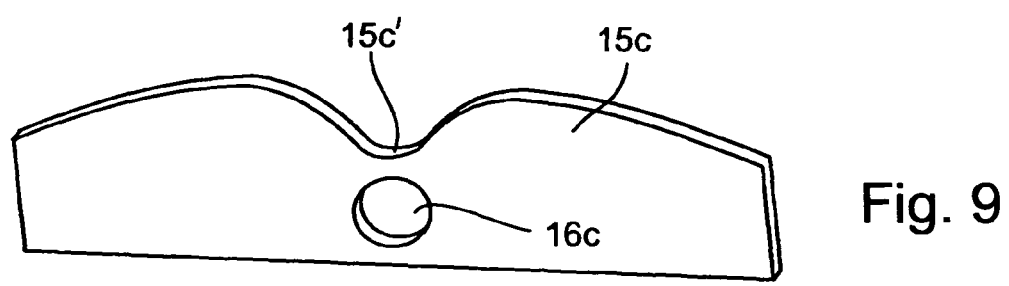

FIG. 8 illustrates a self-adaptive coupling element 13b which may be used in the variable-diameter toothed wheel 10 shown in FIGS. 8 and 9. Such a coupling element also includes a mounting plate 14b for mounting the coupling element 13b in a radially-displaceable manner within the radial slots 12, 12 in the two discs 11, 11 of the variable-diameter toothed wheel 10 (FIGS. 1, 3). In this case, however, instead of including a pivotal contact plate (corresponding to contact plate 15 in FIG. 3), the coupling element 13b illustrated in FIG. 8 includes a pair of contact elements in the form of teeth 15b$_1$, 15b$_2$, on the opposite sides of the mounting plate 14b and actuated together by a pivotal rocking bar 16b. The arrangement is such that when the tooth 15b at one end is moved in one direction to define a projection, the tooth 15b at the opposite end is moved in the opposite direction to define a depression.

It will thus be seen that the self-adaptive coupling elements 13b (FIG. 8) cooperate with the toothed wheel 20a of FIGS. 6 and 7 in substantially the same manner as described above with respect to coupling elements 13 and toothed wheel 20 of FIGS. 1-5. Thus, the coupling elements 13d (FIG. 8), when engaged by the double toothed wheel 20a of FIGS. 6 and 7, are also individually displaced to engage, at their opposite ends 15b$_1$, 15b$_2$, oppositely sloped surfaces of the projections and depressions 21a-24a, thereby adapting themselves to the configuration of the latter projections and depressions to effect a coupling therewith along lines of contact, in this case two lines of contact, in all the radial displacement positions of the contact elements 13b, except in this case, each contact element produces two lines of contact, by teeth 15b$_1$ and 15b$_2$, respectively interrupted by the space between the two sections of the toothed wheel 20a.

FIG. 9 illustrates a manner of compensating for the difference in the mean height of contact plate 15 in its level and inclined positions when using the fixed-diameter toothed wheel 20a of FIGS. 6 and 7. Thus, as shown in FIG. 9, the contact plate, therein designated 15c, is slightly curved and is formed with a central recess 15c' in alignment with the pivotal axis 16c, such as to assure that for any two points of contact, and for any given inclination of the contact plate, the mean height will be the same.

Figure 10:
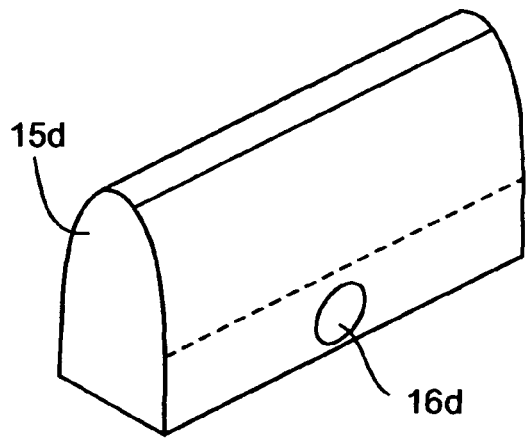
FIGS. 10 and 11 illustrate further examples of construction of the self-adaptive coupling elements and the fixed-configuration coupling elements, respectively.

FIG. 10 illustrates contact plate 15d, corresponding to contact plate 15 in FIG. 3, but of a cross-section which is the same as the cross-section of a tooth in a standard gear wheel. Contact plate 15d shown in FIG. 10 is also pivotal on a pivotal mounting, shown at 16d, to enable the contact plate to self-adapt itself to the configuration of the fixed projections and depressions, in the same manner as described above with respect to FIG. 3. Among the variety of possibilities for designing the curves of the projections and depressions, it is possible to choose a shape, such as the involute curve common in standard gear wheels. Such a curved shape increases the range of contact between the fixed projections and the self-adapting projections beyond the topmost engagement points.

Figure 11:
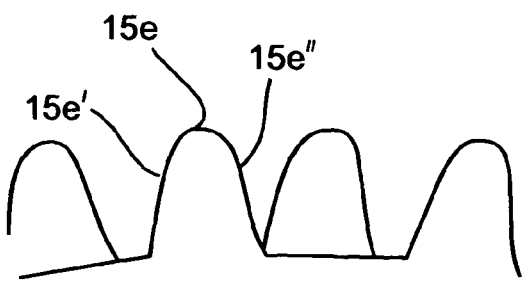

FIG. 11 illustrates such a construction wherein a projection shown at 15e has one side 15e' shaped in the form of an involute curve, and the other side 15e" shaped as its inversion, so that the mean height of the contact plate 15c will remain the same.

While the technique illustrated in FIG. 11 produces a tooth form which is asymmetric, this does not significantly affect the operation since the pressure is always exerted in the direction of rotation. This means that, for the most part, one side only of the contact plate is engaged. In this case, the transmission can be designed so that the pressure will be exerted on the side which is of the involute shape. The curved sides are to be such that the projection carries out the task of pushing the contact plate 15e towards the opposing depression when taking into consideration the thickness of the contact plate.

Other possible constructions may be used for the self-adaptive coupling elements 13 in the toothed wheel of FIGS. 6 and 7. For example, the teeth pair arrangement illustrated in FIG. 8 could be used, but wherein the two teeth are actuated by fluid pressure rather than by a rocking bar 16b, such that when one tooth is moved downwardly to define a depression, the other tooth is moved upwardly to define a projection.

Figure 12:
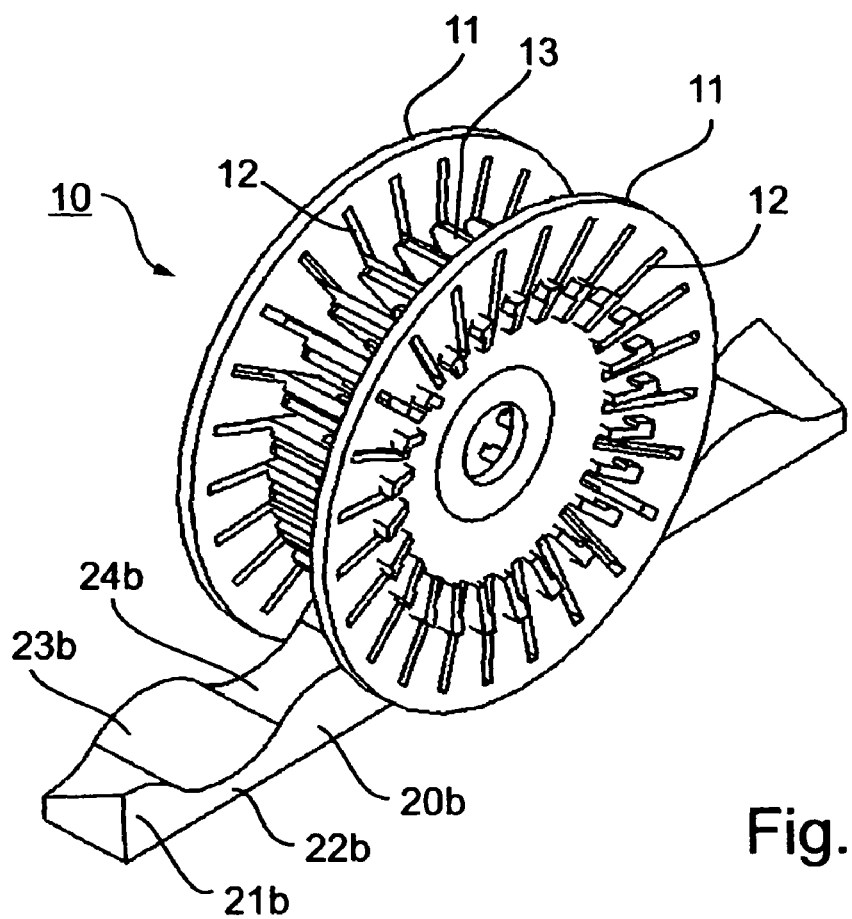
FIG. 12 illustrates a CVT constructed in accordance with the present invention, similar to that of FIG. 1, but including a toothed rack rather than a toothed wheel.

FIG. 12 illustrates a continuously-variable transmission similar to that described above with respect to FIGS. 1-4, except that the transmission member meshing with the variable-diameter, rotary wheel 10 is not a rotary member (e.g., 20, FIG. 1), but rather is a toothed rack 20b mounted for linear movement rather than for rotary movement. In all other respects, rack 20b may be the same as toothed wheel 20 in FIGS. 1-4, or toothed wheel 20a in FIGS. 6 and 7.

Thus, rack 20b also includes two series of fixed projections and depressions on its opposite side faces, shown at 21b-24b, both of the same pitch and engageable with the projections and depressions defined by the coupling elements 13 of the variable-diameter toothed wheel 10. Coupling elements 13 thus also automatically also adapt themselves to be complimentary to the configuration of the projections and depressions in the rack 20b in all effective diameters of the variable-diameter rotary wheel 10 such that the opposite ends of the contact plate (15) of each coupling element (13) along contact lines with the oppositely-sloped surfaces of the projections and depressions of the rack in all displacements positions of the coupling elements thereby effecting a non-slip coupling between the toothed wheel and the rack in all transmission ratios. In addition, since the pitch of the projections and depressions in the rack 13 the same at both side faces of the rack, this arrangement also avoids the creation of undue differential stresses in the coupling elements along the lines of contact at each effective diameter of wheel 10.

While FIG. 12 illustrates a rotary member of a particular construction coupled to a rack of a particular construction, it will be appreciated that the transmission could include various constructions of rotary members and/or racks, as described herein, for example.

Figure 13:
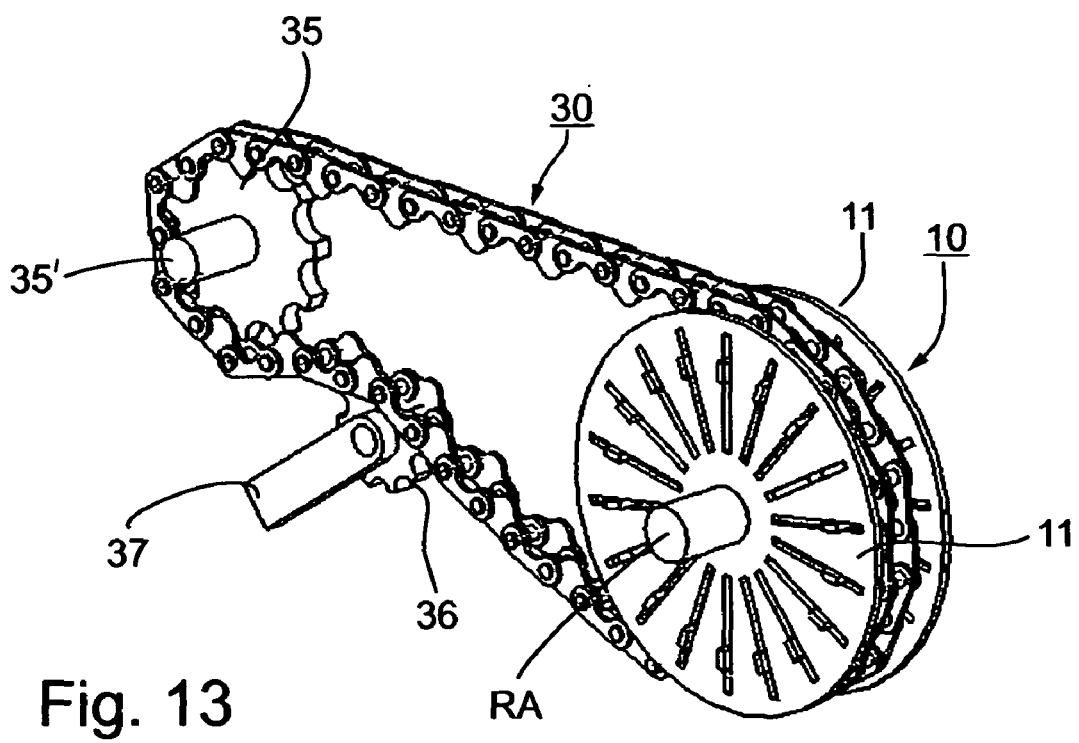
FIG. 13 illustrates a CVT constructed in accordance with the present invention utilizing a closed-loop chain.

FIG. 13 illustrates a continuously-variable transmission also including a variable-diameter toothed wheel 10 as in FIG. 1, but with a closed-loop chain 30 as the other transmission member, instead of a toothed wheel (20, FIG. 1). In the transmission illustrated in FIG. 12, an end of the closed-loop chain 30 is applied around the coupling elements 13 of the variable-diameter toothed wheel 10 rotatable about rotary axis 10', and the opposite end of the chain is applied around a sprocket wheel 35 rotatable about rotary axis 35'.

A chain tautening pinion 36 mounted at one end of a pivotal arm 37 maintains chain 30 taut under all effective diameters of the toothed wheel 10.

Figure 14:
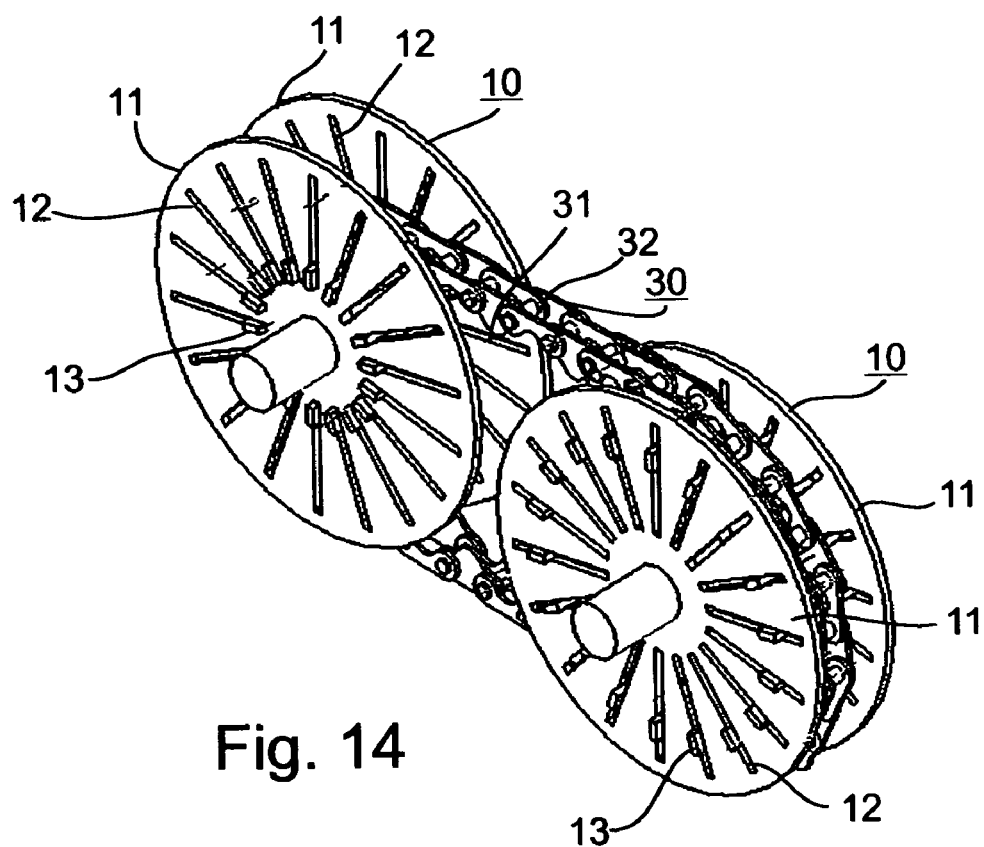
FIG. 14 illustrates a transmission similar to that of FIG. 13 but including two variable-diameter toothed wheels coupled by the closed loop chain.

FIG. 14 illustrates a similar arrangement except, instead of applying the end of the chain 30 around a sprocket wheel (35, FIG. 13) it is wrapped around another variable-diameter toothed wheel 10 of like construction as toothed wheel 10, such that when the effective diameter of one toothed wheel decreases, that of the other increases a corresponding amount, thereby maintaining the chain 30 taut under all transmission ratios.

Chain 30, in both FIG. 13 and FIG. 14, is similarly constructed as toothed wheel 20 (FIG. 1), or toothed wheel 20a (FIG. 10), to include the projections and depressions of fixed configuration. The projections and depressions on the chain are also of the same structure on the opposite side faces of the chain, and are also cooperable with the projections and depressions of self-adaptive configuration defined by the coupling elements 13 in the variable-diameter toothed wheel 10 to produce the same type of non-slip line contacts between the coupling elements, during all effective diameters of wheel 10, as described above with respect to FIGS. 1-12.

FIGS. 15-19 illustrate various constructions of chains that may be used for this purpose.

Figure 15:
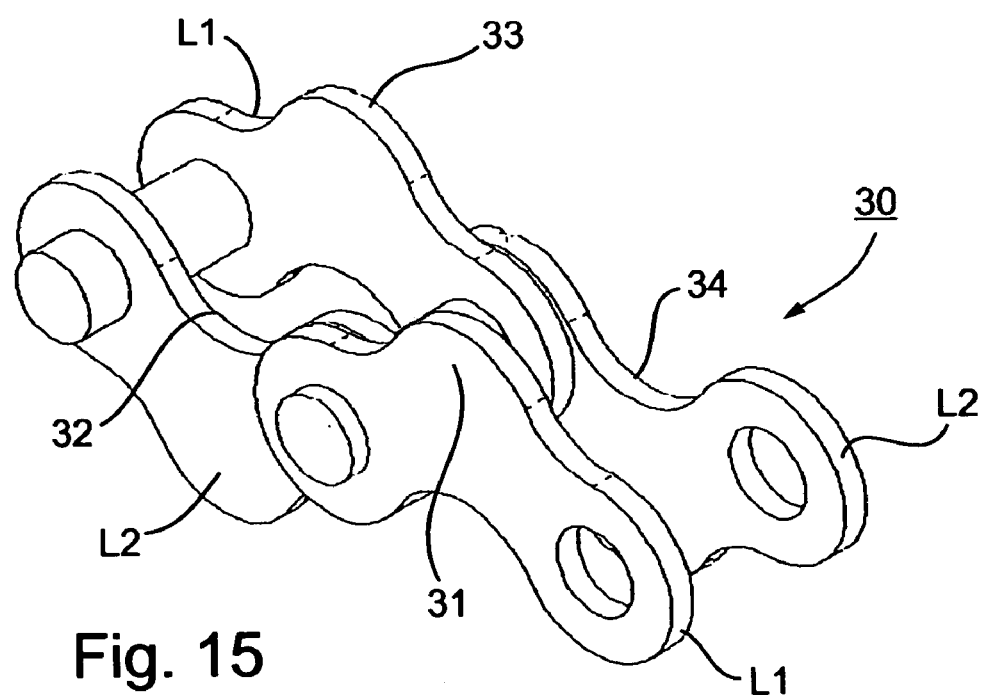
FIGS. 15-18 illustrate a construction of chains which may be used in the transmission of FIG. 13 or FIG. 14 with variable-diameter toothed wheels including self-adaptive coupling elements of the type illustrated in FIG. 8.

Thus, as shown in FIG. 15 (and also in FIG. 13), the chain 30 has two series of projections and depressions on its opposite sides both of the same pitch. One series includes projections 31 and depressions 32; and the other series includes projections 33 and depressions 34 in a staggered relation thereto, such that each projection (e.g., 31) in one series is axially aligned with a depression (e.g., 34) in the other series along the rotary axis 10'. This may be done, as shown in FIG. 15, by using links of the same configuration but inverting them alternatively in each series.

Figure 16:
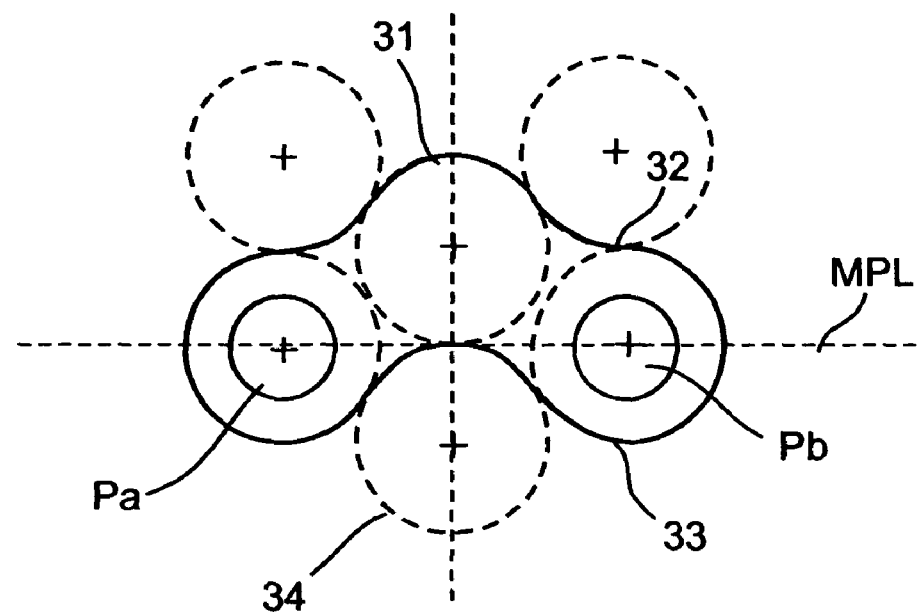

As shown in FIG. 16, the mean distance between each axially-aligned projection 31 and depression 34, and each axially-aligned projection 32 and depression 33, is at a common medial pivot line MPL which passes through the pivot axis PA, PB of the chain links.

Figure 17:
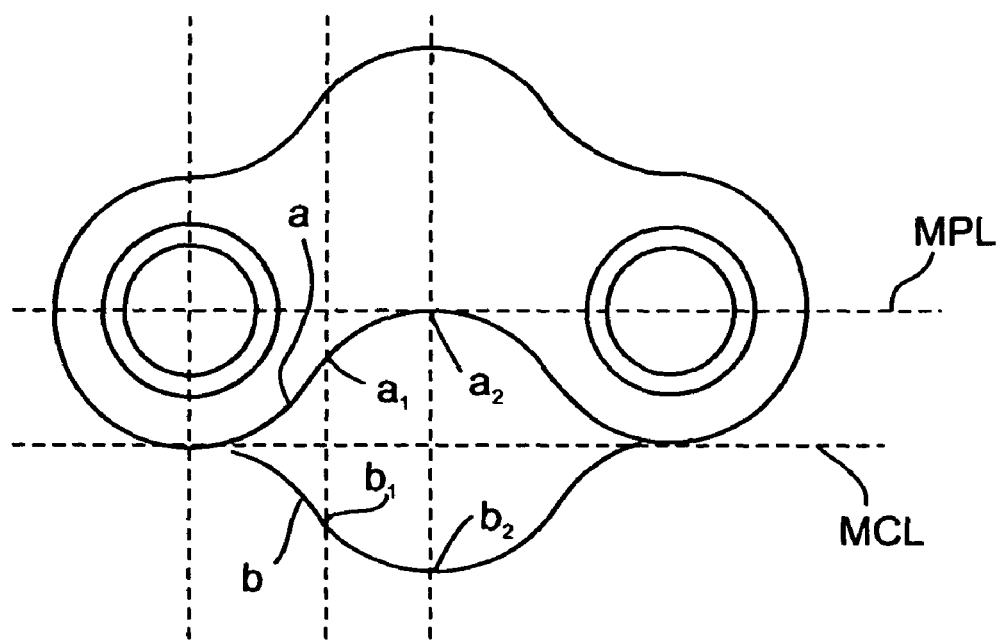

FIG. 17 schematically illustrates the points of contact of the chain links with the contact plates of the coupling elements (e.g., contact teeth $15b_1$, $15b_2$ of coupling element $13b$, FIG. 8). In FIG. 17, the contact of the contact plate with a projection is shown by curva "a", and with a depression is shown by curve "b". It will be seen that the mean distance between the two curves is the median contact line MCL; i.e., the median distance between any two points along curves "a" and "b" always falls on line MCL. Thus line MCL, which is the effective diameter of the rotary member, remains the same for all contact points between the contact plates and the chain links, and is a constant distance below the median pivotal line MPL.

It will therefore be seen that the contact plates will adjust themselves automatically to the configuration of the chain. Thus they also provide full contact, along the two colinear contact lines of engagement of teeth $15b_1$, $15b_2$ (FIG. 8), with oppositely sloped surfaces of the projections and depressions 31-34 in the chain 30, which does not allow any slippage, in all radial positions of the contact elements 13, that is, in all effective diameters of the toothed wheel 10. In addition, since the pitch of the projections and depressions 31-34 in the chain 30 are of the same width, all the points on each line of contact with the projections and depressions are of the same pitch, thereby also avoiding the creation of stresses in the coupling elements along the lines of contact.

The two series of projections and depressions 31, 32 and 33, 34, respectively, in the chain 30 illustrated in FIG. 15 include two-elements links $L_1$, $L_2$, both defining a projection (e.g., 31, 33) and a depression (e.g., 32, 34), but alternatingly reversed in the chain. The transitions between succeeding projections and depressions are stepped transitions, analogous to the stepped transitions in the toothed wheel 20a of FIG. 10.

Figure 18:
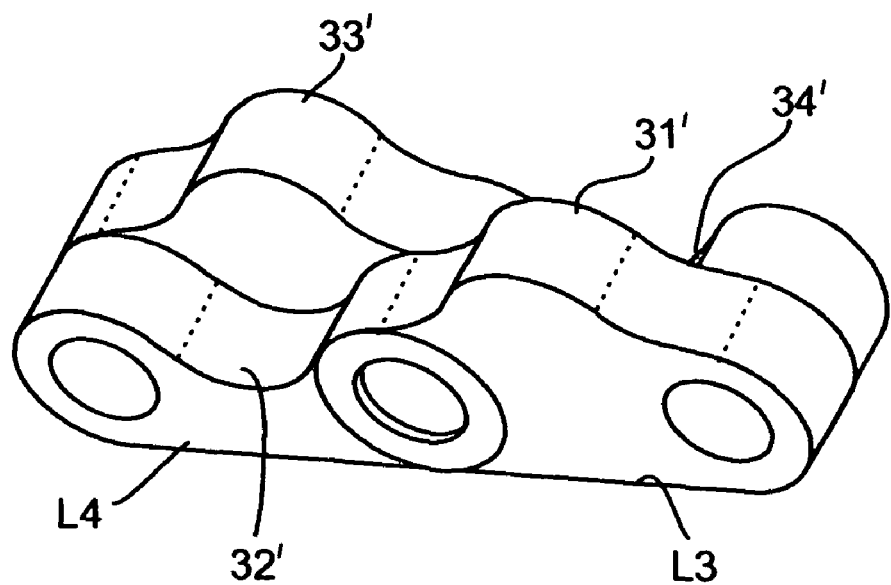

FIG. 18 illustrates another chain construction including single-element links which may also be alternatingly reversed. Thus, as shown in FIG. 18, the links $L_3$, $L_4$ are assembled in an alternatingly reversed manner such that two series of projections and depressions 31', 32' and 33', 34', respectively, would be defined on each side of the chain, as described above with respect to FIG. 15.

Figure 19:
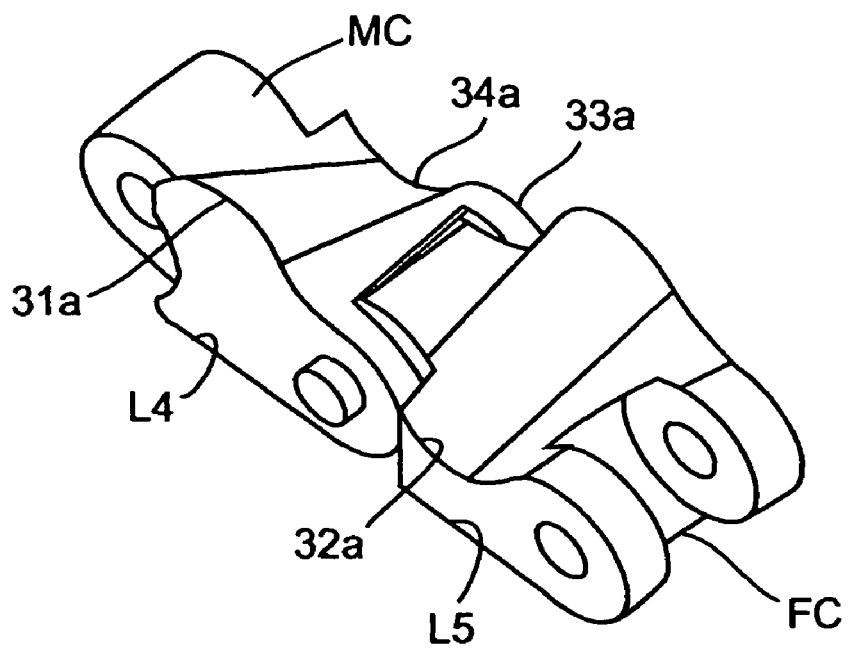
FIG. 19 illustrates an alternative chain construction that may be used with variable-diameter toothed wheels including self-adaptive coupling elements of the type illustrated in FIGS. 1-5.

FIG. 19 illustrates a single-element chain link alternatingly reversed, as shown by links $L_5$, $L_6$, wherein the transitions between the two series of projections and depressions, therein designated 31a, 32a and 33a, 34a, respectively, include gradual transitions, analogous to the structure of the toothed wheel 20 shown in FIGS. 1 and 4. In each single element links $L_5$, $L_6$, shown in FIG. 19, one end of the link is provided with a male connector MC, and the opposite end is provided with a female connector FC, for assembling a chain of such links.

Figure 20:
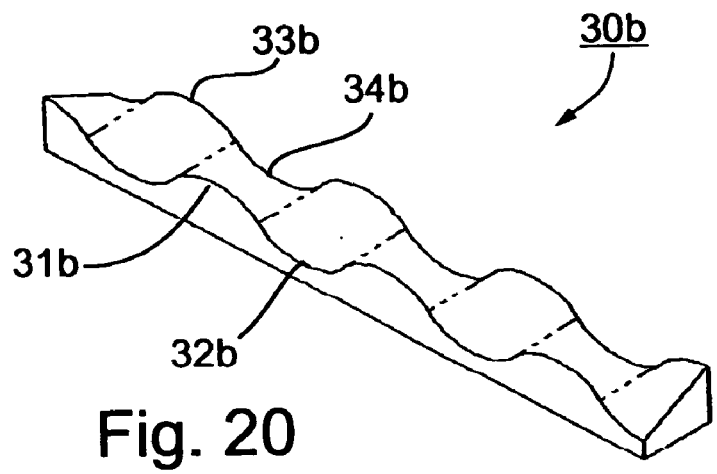
FIGS. 20 and 21 illustrate two constructions of a closed loop belt which may be used in a transmission similar to that of FIGS. 13 or 14 having self-adaptive coupling elements of the type of FIGS. 3 and 8, respectively.

As described above with respect to the chain construction of FIG. 15-17, the projections and depressions in the chain constructions of FIGS. 18 and 19 will also cause the radially-displaceable coupling elements 13 in the variable-diameter toothed wheel 10 to automatically adjust themselves to the projections and depressions in the chain in all radial positions of the coupling elements 30 to produce line contacts with the chain which do not slip and which do not create stresses along the contact lines FIG. 20 illustrates a belt, therein generally designated 30b, which may be used in the continuously-variable transmission of FIGS. 13 or 14 in lieu of the chain 30 or 30a. Thus, belt 30b is also constructed of two series of projections and depressions 31b, 32b, and 33b, 34b, respectively, having the same pitch between the opposite sides of the belt, and cooperable with the coupling elements 13 in the variable-diameter toothed wheel 10 of FIG. 1 to cause the latter coupling elements automatically to adapt themselves to the configuration of the projections and depressions 31b-34b in all radial positions of the coupling elements 13, in the same manner, and to produce the same results, as described above. Belt 30b illustrated in FIG. 20 includes gradual transitions between the two series of projections 31b, 32b and 33b, 34b, respectively, analogous to the projections and depressions in the chain links of FIG. 19, and in the toothed wheel 20 of FIGS. 1 and 3.

Figure 21:
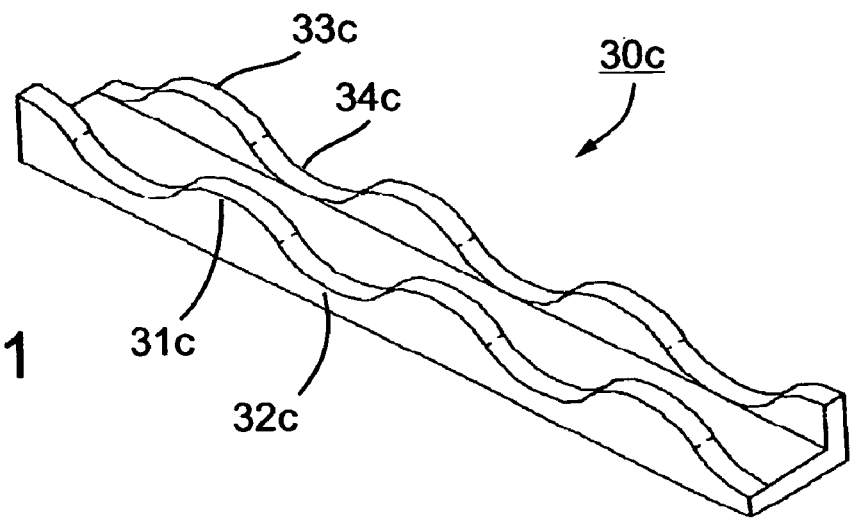

FIG. 21 illustrates a variation in the belt, therein designated 30c, in which the transitions between the two series of projections and depressions 31c, 32c and 33c, 34c, respectively, are stepped transitions, analogous to the chain links of FIGS. 15-18, and the double toothed wheel 20a of FIGS. 6 and 7.

Figure 22:
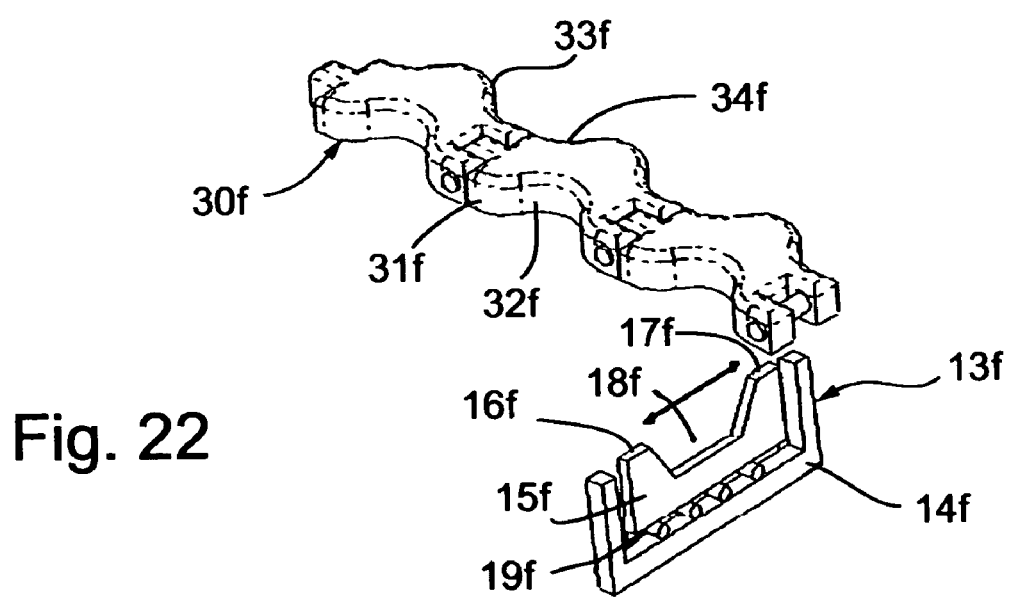
FIG. 22 illustrates another construction of chain, together with another construction of self-adaptive coupling element, which may be used in such a transmission.

FIG. 22 illustrates another arrangement that may be used, including a closed loop chain 30f cooperable with self-adaptive coupling elements 13f carried by the variable-diameter toothed wheel (e.g. 10, FIG. 1). In this case, the chain 30f also includes a series of projections and depressions 31f, 32f on one side, and another series of projections and depressions 33f, 34f on the opposite side in staggered relationship with, and of the same pitch as, the first series of projections. Each of the coupling elements 13f carried by the variable-diameter toothed wheel (e.g., 10, FIG. 1) includes a holder 14f carrying a shifting plate 15f formed with a pair of teeth 16f, 17f, at its opposite ends, separated by a recess 18f. Plate 15f is shifted on rollers 19f. The recess 18f is formed with sloping walls defining the teeth 16f, 17f at its opposite ends, and is dimensioned according to the width of the chain 30f. Thus, the chain may slide into the recess 18f, causing the plate 15f to shift appropriately in order to receive the chain.

It will thus be seen that in the FIG. 22 construction, as in the previously-described constructions, the projections and depressions 31f-34f of the chain 30f cause the coupling elements 13f in the toothed wheel 10 to self-adapt themselves to the configuration of the projections and depressions 31f-34f in all radial positions of the coupling elements 13e. It will also be seen that in each of the two colinear lines of contact (by teeth 16f, 17f, respectively) the two teeth at the opposite ends of the contact plate (15f) will engage oppositely-sloped surfaces of the projections and depressions in the chain 30f, to thereby effect a non-slip coupling therewith, and the pitch of the projections and depressions will be the same along all points on each contact line, thereby avoiding the creation of stresses along the contact lines.

Figure 23:
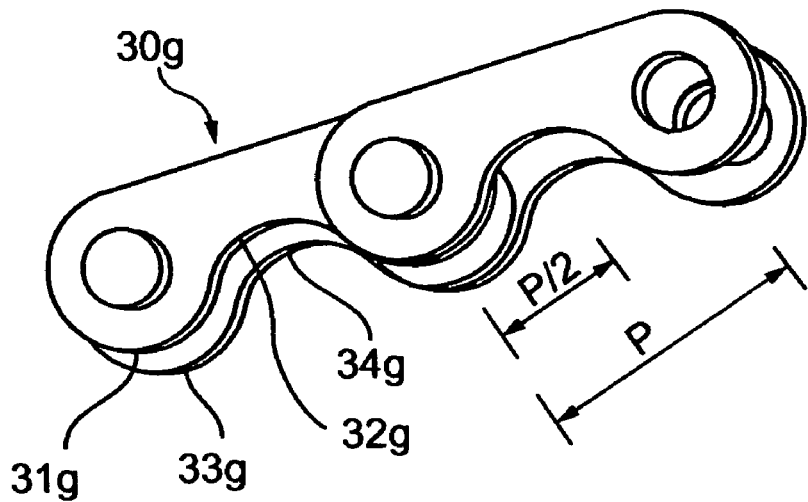
FIGS. 23 and 24 illustrate another construction of chain and a self-adaptive coupling element, respectively, which may be used in the transmission of FIGS. 13 or 14.
Figure 24:
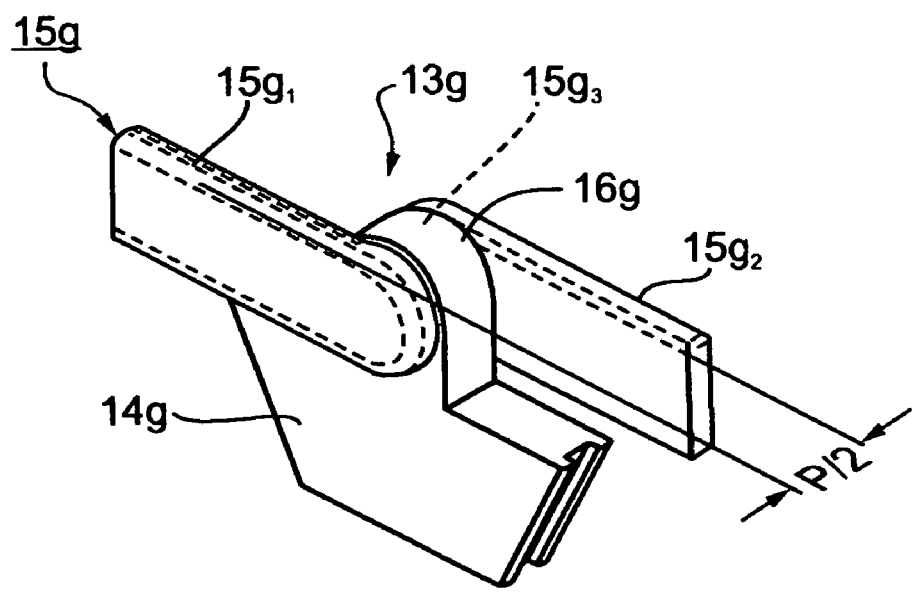

FIG. 23 illustrates a further construction of chain link, therein designated 30g, which may be used with a particular construction of coupling element shown in FIG. 24, therein designated 13g, in the toothed wheel (10, 10a) which will produce the same basic operation as described above. Chain 30g illustrated in FIG. 23 also includes two series of projections and depressions, namely one series consisting of projections and depressions 31g, 32g along one side of the chain, and a second series of projections and depressions 33g, 34g, on the opposite side, and of the same itch as the one series.

As distinguished from the previous constructions, however, the two series of projections and depressions are in axial alignment with each other, and are not in a staggered relationship as in the previously described embodiments. In this case, the respective coupling element 13g on the variable-diameter toothed wheel (e.g., 10, FIG. 1) is modified to enable it to self-adapt to the configuration of the chain 30g having the two series of projections and depressions in an aligned, rather than staggered, arrangement. This is done as follows:

In FIG. 23, the pitch of the series of projections and depressions 31g, 32g and 33g, 34g, respectively, is shown as "P"; thus the distance between corresponding points of a projection and of a depression is one-half the pitch, or P/2.

In order to have the coupling elements on the toothed wheel produce the above-described self-adapting function with the chain 30g illustrated in FIG. 23, each coupling element 13g is of the construction shown in FIG. 24. In such a construction, the coupling element 13g includes a mounting plate 14g which is slideable within the radial slots of the toothed wheel as described above, and a contact plate pivotally mounted to the mounting plate, analogous to contact plate 15 in FIG. 3. However, in this case the contact plate, generally designated 15g in FIG. 24, is not constituted of a single section as in FIG. 3, but rather is constituted of two sections $15g_1$, $15g_2$, interconnected by a juncture section $15g_3$, which is pivotally mounted at 16g to the mounting plate 14g.

The two sections $15g_1$ and $15g_2$ are parallel to each other but are offset a distance exactly equal to one-half the pitch (P/2) between the projections and depressions in the chain 30g. Thus, when the coupling element 13g illustrated in FIG. 24 is used with the chain illustrated in FIG. 23, one section $15g_1$ of the contact element will be aligned with a projection in the chain, whereas the other section $15g_2$ will be aligned with a depression in the chain. Accordingly, the contact elements 13g also self-adapt their configurations to the configurations of the projections and depressions 31g-34g in the chain 30g in the same manner as described above, to produce non-slip, unstressed contact lines for all radial positions of the contact elements 13g in the toothed wheel.

The arrangement illustrated in FIGS. 23 and 24 thus enables the novel transmission to be used with almost any conventional chain structure. It will be appreciated that the same technique described with respect to FIGS. 23 and 24 for chains could also be applied for belts, as described with respect to FIGS. 20 and 21, and for toothed wheels, as described with respect to FIGS. 1 and 6.

Figure 25:
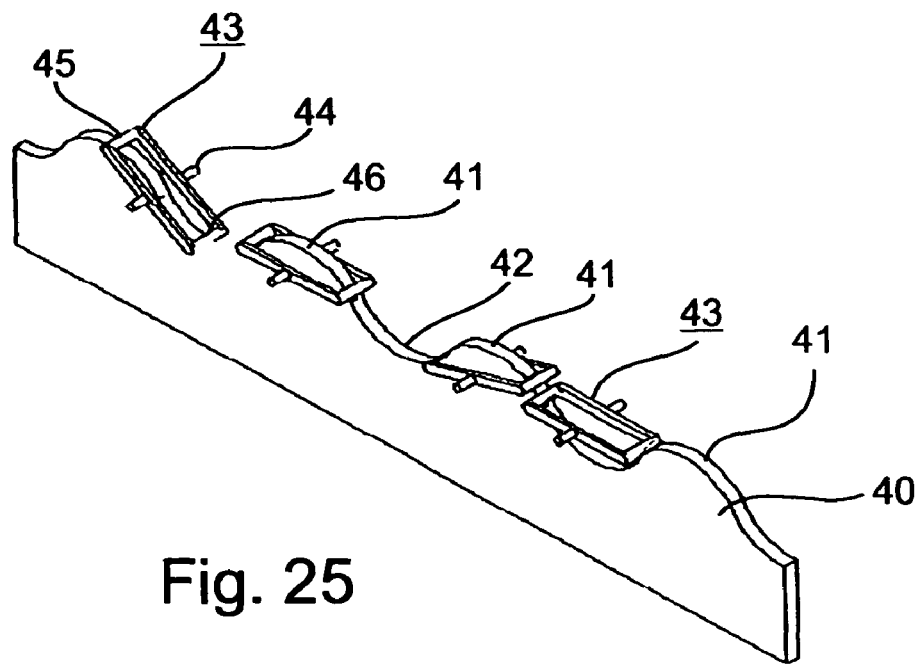
FIGS. 25 and 26 schematically illustrate two further constructions of self-adaptive coupling elements which may be used.
Figure 26:
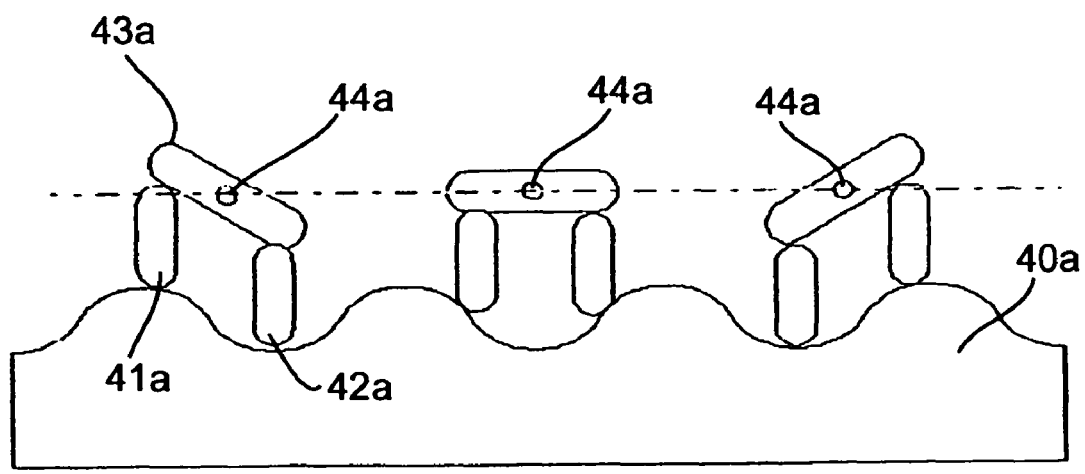

FIGS. 25 and 26 schematically illustrate other manners of providing coupling elements on one transmission member (e.g., coupling elements 13 on the variable-diameter toothed wheel 10, FIG. 1) of a self-adaptive configuration which enables adapting themselves to the fixed-configuration projections and depressions on the other transmission member, (e.g., toothed wheel 20, but using a single series of projections and depressions) in all radial positions of the one transmission member.

In FIG. 25, the transmission member having the fixed-configuration projections and depressions is schematically shown at 40, and the projections and depressions are indicated at 41 and 42, respectively; whereas, each of the coupling elements of self-adaptive configuration is schematically shown at 43. As seen in FIG. 25, each of the self-adaptive configuration coupling elements is in the form of an assembly pivotal on an axis 44 perpendicular to the direction of movement of transmission member 40 and having a pair of arms 45, 46 parallel to the pivotal axis 44 of pivotal assembly 43 and engaging spaced points on the projections and depressions of member 40 in all pivotal positions of the pivotal assembly.

FIG. 25 schematically shows four positions of a pivotal assembly 43. In all such positions, both of the arms 45, 46 of each pivotal assembly engage two spaced points on the opposite sides of a projection or of adjacent projections, in the transmission member 40, and thereby effect a non-slip coupling therewith in all effective diameters of the variable-diameter toothed wheel.

FIG. 26 schematically illustrates a similar arrangement, wherein one transmission member 40a is provided with the fixed projections and depressions 41a, 42a; and the other transmission member is provided with the self-adaptive coupling elements shown as pivotal assemblies 43a pivotal about an axis 44a perpendicular to the direction of movement of transmission member 40a. In the arrangement illustrated in FIG. 26, however, the pivotal assembly 43a includes a pair of spaced teeth 45a, 46a, which are adapted to engage spaced points on the projections and depressions 41a, 42a of transmission member 40a such as to effect the non-slip coupling therewith in all effective diameters of the rotary member carrying the coupling elements 43a.

FIGS. 25 and 26 also clearly show how each of the self-adaptive coupling elements engage, at its opposite ends, oppositely sloped surfaces of the projections and depressions in the other transmission member (40, 40a, e.g., a toothed wheel, a chain, a belt, or a toothed rack as described above) to effect a non-slip coupling with the projections and depressions along lines of contact therewith.

Since, in these embodiments, the other transmission member (40, 40a) is of uniform thickness, the pitch of their projections and depressions would be the same at all the points on each line of contact, thereby avoiding the creation of undue differential stresses in the coupling elements along the lines of contact in the same manner as described above.

Figure 27:
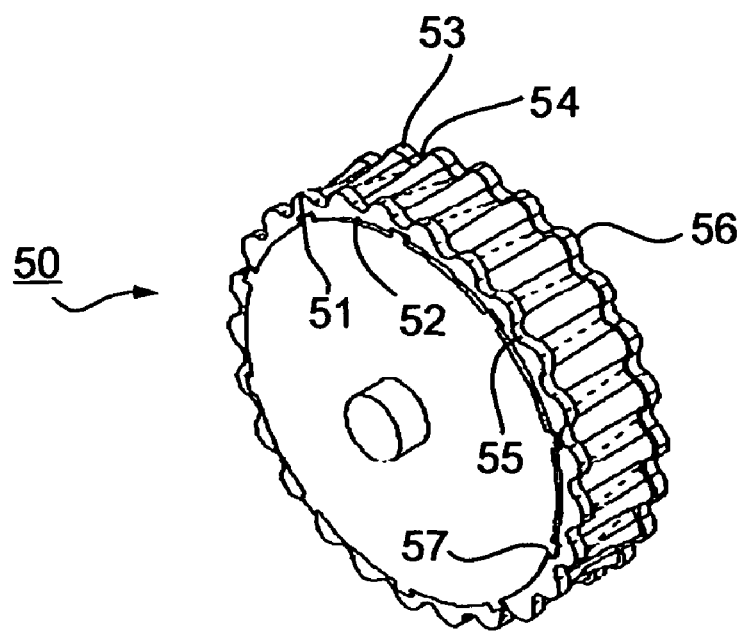
FIGS. 27 and 28 illustrate a toothed wheel and a self-adaptive coupling element, respectively, for use in a transmission such as illustrated in FIG. 1 but each provided with resilient pads to cushion the contact with their respective coupling elements.
Figure 28:
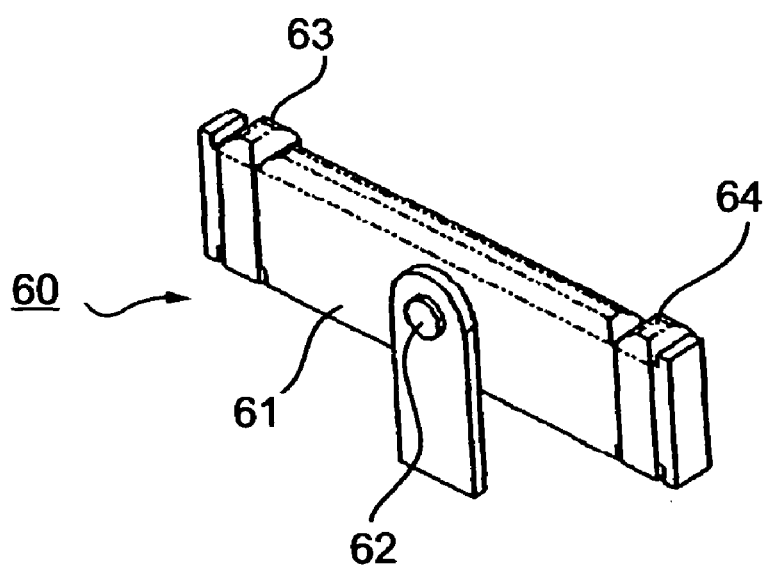

Various techniques may be used to reduce noise and vibrations which may arise as a result of the movements of the self-adapting coupling elements and their high speed engagement of the fixed-configuration projections and depressions of the other coupling elements. FIGS. 27 and 28 illustrate two possible solutions to the noise and vibration problem.

FIG. 27 illustrates the toothed wheel 50 with one series of projections and depressions 51, 52 along one side, and a second series of projections and depressions 53, 54 along the opposite side. In order to reduce noise and vibration, the outer edges of the two series of projections and depressions are covered by, or defined by, rings 55, 56, respectively, of rubber or other cushioning material fixed in place by pins 57.

The coupling elements on the other transmission member, which are of a self-adaptive configuration, could similarly be provided with a rubber or other cushioning material, as shown in FIG. 28. The coupling elements shown in FIG. 28, and therein designated 60, are of the pivotal type, as for example in FIG. 3. Each coupling element includes a contact plate 61 pivotally mounted at its center 62 such that when one end is moved upwardly, the opposite end is moved downwardly. In this case, the opposite ends of the contact plate 61 are provided with pads of rubber or other cushioning material, as shown at 63 and 64, to reduce noise and/or vibration.

Another possible technique is to replace the rubber pads with spring elements, such as elastic steel tabs, which would be struck by the pivotal contact plates before contact with the toothed wheel (e.g., of metal), and thus cushion the strikes. A still further possibility would be to install oil channels on the toothed wheel, so that the oil is pumped under pressure from the direction of the wheel of complimentary symmetry in the direction opposite to the motion of the pivotal contact plates, and thus cushion their strikes.

Figure 2:
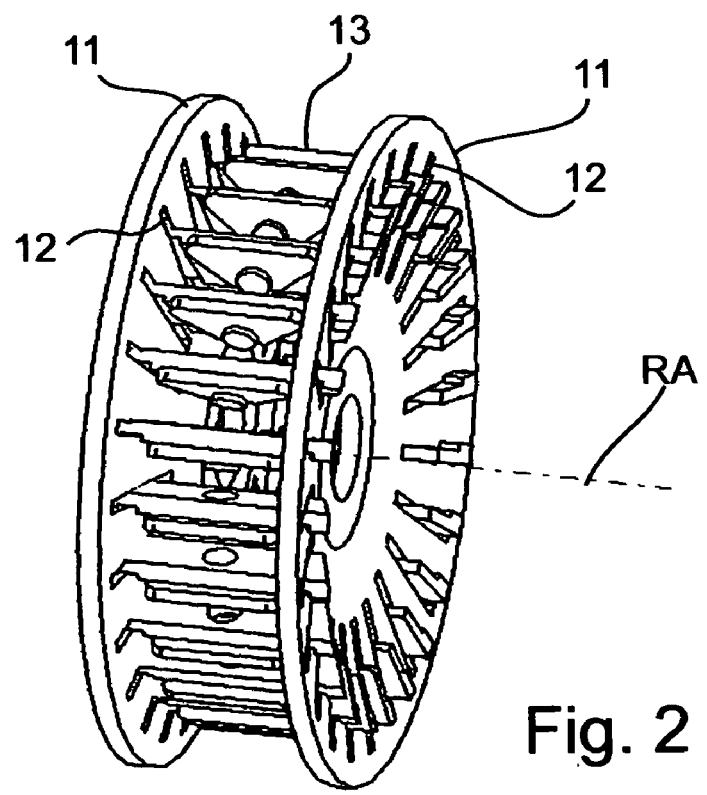
FIG. 2 more particularly illustrates the variable-diameter toothed wheel in the transmission of FIG. 1.

Many other constructions of variable-diameter toothed wheels could be used, other than the one illustrated in FIGS. 1 and 2 including two conical discs each formed with an annular array of radial slots for receiving the radially-displaceable coupling elements (13).

Figure 29:
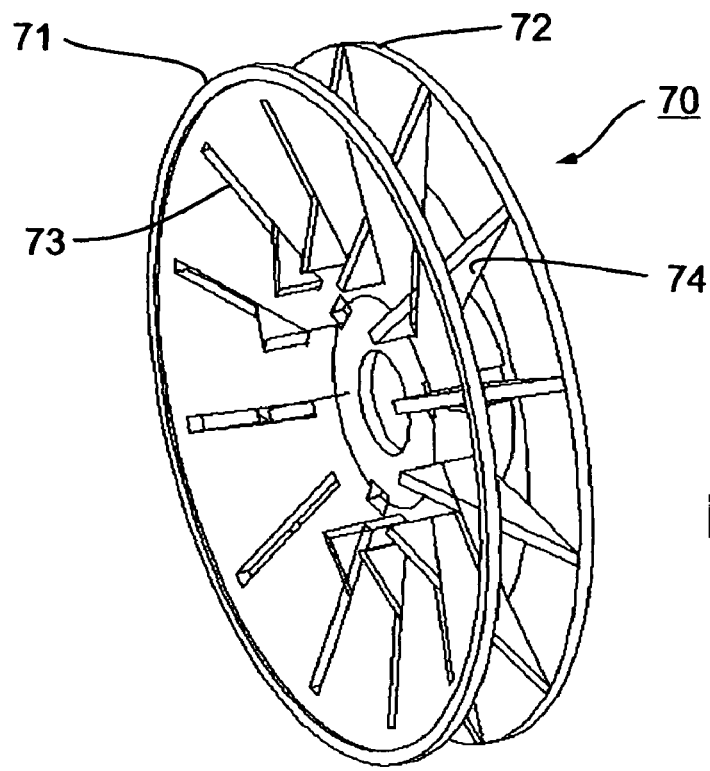
FIG. 29 illustrates another construction of variable-diameter toothed wheel (without the coupling elements) in accordance with the invention.
Figure 30:
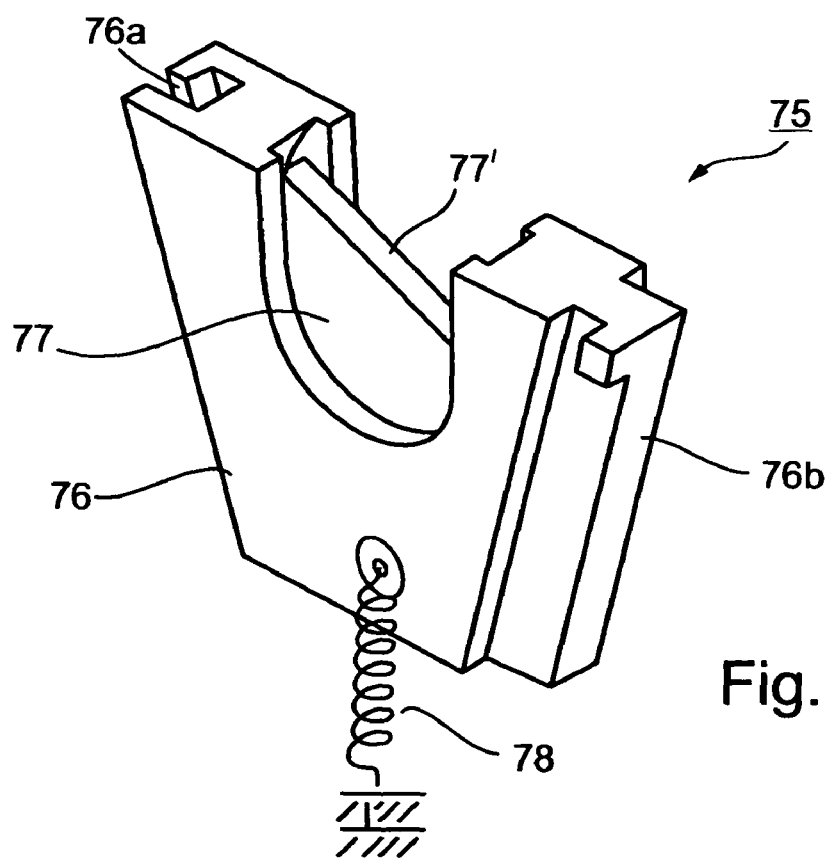
FIG. 30 illustrates a self-adaptive coupling element for use with the toothed wheel of FIG. 29.

FIG. 29 illustrates one such construction toothed-wheel (without the coupling elements), and FIG. 30 illustrates a coupling element for use with the toothed wheel of FIG. 29.

The toothed-wheel illustrated in FIG. 29, and therein designated 70, includes two discs 71, 72. Disc 71 is preferably conical and is formed with an annular array of radially-extending slots 73, whereas disc 72 carries an annular array of radially-extending triangular-shaped ribs 74 receivable within slots 73.

Each of the coupling elements 75 illustrated in FIG. 30 is of the rotary disc construction shown in FIG. 5, but adapted for use with the toothed-wheel 70 of FIG. 29. Thus, each coupling element 75 includes a mounting plate 76 rotatably mounting a disc 77 having an upper flat edge 77' which serves as the contact surface for the coupling elements of the other transmission member, (e.g., wheel 20, FIG. 1). Mounting plate 76 is formed along one edge with a slot 76a slideably receiving the diagonal edge of a triangular rib 74 on disc 72; and the opposite end of mounting plate 76 is formed with a rib 76b to be slideably received within a slot 73 of disc 71. A spring 78 may be provided urging mounting plate inwardly of toothed wheel 70, FIG. 29.

It will thus be seen that moving the two discs 71, 72 away from each other will move the coupling elements 75 radially inwardly to thereby decrease the effective diameter of the toothed wheel; whereas moving the two discs 71, 72 towards each other will move the coupling elements 75 radially outwardly to thereby increase the effective diameter of the toothed wheel. It will also be seen that contact plate 77 will be rotated within the mounting plate 76 in the same manner as described above with respect to FIG. 9 to adapt itself to the configuration of an engaged fixed-configuration coupling element: i.e., when one end of the contact plate is moved upwardly, the opposite end is simultaneously moved downwardly.

The effective diameter of the toothed wheel 70 illustrated in FIG. 29 can thus be changed by moving the two discs 71, 72 towards or away from each from other. For each diameter of the toothed wheel, contact plates 77 of the coupling elements 75 will be able to rotate within their respective mounting plates 76 to self-adapt the configuration of the coupling elements to the fixed-configuration projections and depressions of the other transmission member (e.g., the fixed-diameter wheel 20, FIG. 1), to thereby effect a non-slip coupling with that transmission member, in the same manner as described above with respect to FIG. 5, for example.

It will be appreciated that, instead of having a spring bias for the coupling elements, suitable ribs and grooves could be provided on the discs and coupling elements for moving tje coupling elements inwardly as well as outwardly.

FIG. 31 illustrates another construction of variable-diameter toothed wheel which may be used. The toothed wheel illustrated in FIG. 31, therein generally designated 80, also includes a pair of discs 81, 82. In this case, however, both discs are flat and are formed with an annular array of radially-extending slots indicated at 81a, 82a, respectively.

The illustrated toothed wheel further includes an annular array of triangular plates 83 carried by a common mounting member 84 linearly and rotatable movable on a central axle 84a. The triangular plates 83 are received within aligned slots 81a, 82a of the two discs 81, 82, and all the triangular plates rotate with the discs and are movable together by the common mounting member 84 through the slots 81a, 82a in the discs.

The two discs 81, 82 are coupled together by an annular array of coupling elements 85. Each of the coupling elements 85 is slidably received at one end within slot 81a of disc 81, and at its opposite end within slot 82a of disc 82. Each coupling element 85 is further provided with a pivotal contact plate 86, corresponding to contact plate 15, FIG. 3, pivotal at 87, such that its opposite ends engage oppositely-sloped surfaces in the projections and depressions in the other transmission member, as described above. The coupling elements may be spring urged radially inwardly, e.g., as illustrated in FIG. 30, and are radially movable outwardly by the inclined diagonal edges of the triangular plates 83.

Mounting member 84 is rotatable about axle 84a so that all the triangular plates 83 rotate with the two discs 81, 82, and is axially movable with respect to axle 84a to move the coupling elements radially inwardly or outwardly in their respective slots, and thereby to vary the effective diameter defined by the coupling elements 85 between the two discs 81, 82.

FIG. 32 schematically illustrates another variable-diameter toothed wheel, generally designated 90, which includes a conical member 91 rotatably mounted at its inner end on a shaft 92, and formed with a plurality of radially-extending slots 93 from its outer large-diameter end to its inner small-diameter end.

An annular array of coupling elements, each designated 95, are slideably mounted within the slots 93. Each coupling element 95 includes a pivotal contact plate (not shown), similar to contact plate 15 illustrated in FIG. 3, for coupling with the other transmission member, such as a toothed wheel, chain or belt as described earlier. A common actuator member (not shown) moves the coupling elements 95 together inwardly or outwardly of their respective slots 92, to thereby change the effective diameter defined by these coupling elements.

A toothed wheel construction such as illustrated in FIG. 32 would be particularly useful as the rear gear wheel in a bicycle wherein the contact plates of the coupling elements 95 are coupled to the sprocket chain of the bicycle, and the common actuator moving the coupling elements 95 is manually controlled or automatically controlled (e.g., by a centrifugal speed sensor), to change the positions of the coupling elements, and thereby the transmission ratio.

FIG. 33 illustrates another variable-diameter toothed wheel that may be used in the continuously-variable transmission, therein designated 100. The toothed wheel includes a single disc 101 formed with a plurality of radial slots 102 each receiving one of the coupling elements 103 slidable within the slots 102 in order to change the effective diameter of the wheel. Coupling elements 103 project through their respective slots 102 on the opposite sides of the disc 101 so as to be engageable with a pair of toothed wheels 104, 105 straddling disc 101 and mounted on a common axle 106.

Each of the coupling elements 102 may be of a self-adaptive configuration according to any of the above-described constructions so as to cause them to engage, at their opposite ends, oppositely-sloped surfaces of the projections and depressions 106-109 on the outer periphery of the two stepped wheels 104, 105 when engaged by those wheels in the manner described above, and thereby to effect a non-slip coupling with the toothed wheels in all radial positions of the coupling elements 103 within the slots 102 of disc 101.

FIGS. 34-37 illustrate another construction of variable-diameter toothed wheel, therein designated 110. Such a toothed wheel includes two pairs of coaxially-mounted discs, namely an external pair 111, 112, and an internal pair 113, 114. Each of the external pairs 111, 112 includes an annular array of radially-extending slots of a curved configuration 111a, 112a; whereas each of the internal discs 113, 114 includes an annular array of radially-extending slots 113a, 114a, of a straight configuration. The two external discs 111, 112, are mounted for rotation together by an inner ring 115a, and the two inner discs 113, 114 are mounted for rotation together by another ring 115b enclosing the inner ring 115a.

Figure 34:
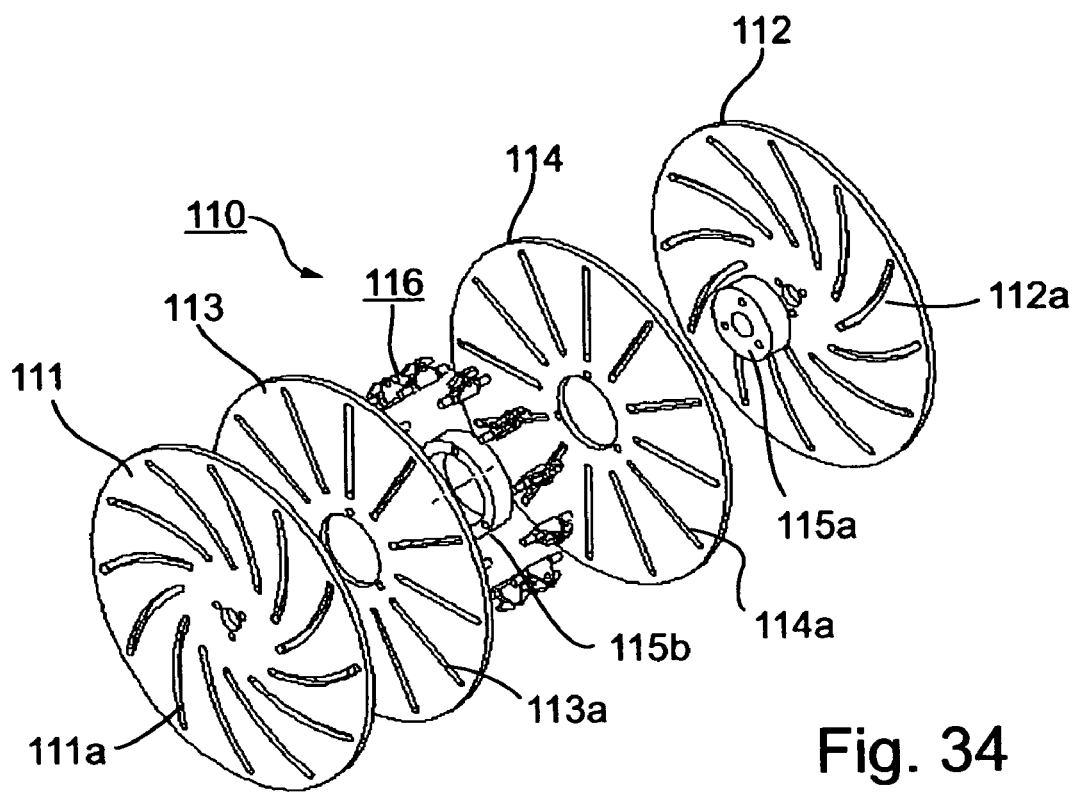
FIG. 34 is an exploded view.

The toothed wheel 110 illustrated in FIG. 34 further includes an annular array of coupling elements 116. As more particularly illustrated in FIG. 37, each of the coupling elements 116 includes a U-shaped mounting plate 117 fixed to a pin 118 of rectangular cross-section having cylindrical tips 118a, 118b at its opposite ends. Coupling element 116 further includes a contact element 119 pivotally mounted at 119a to the upper end of the mounting plate 117. Contact element 119 is shown as being of the construction illustrated in FIG. 5 although it will be appreciated that any other suitable construction could be used.

Each of the coupling elements 116 is mounted between the two pairs of discs 111, 113 and 114, 112. Thus, at one end of the coupling element 116, its rectangular pin 118 is received in its respective straight slot 113a in disc 113, and its cylindrical tip 118a is received in the respective curved slot 111a of the end disc 111. Similarly, at the opposite end of the coupling element 116, its rectangular-section pin 118 is received within a straight slot 114a, and its cylindrical tip 118b is received within the respective curved slot 112a. It will be seen that effecting rotation of one pair of discs 111, 112 with respect to the other pair of discs 113, 114, will displace the coupling elements 116 in the radial direction, according to the direction of rotation.

Figure 35:
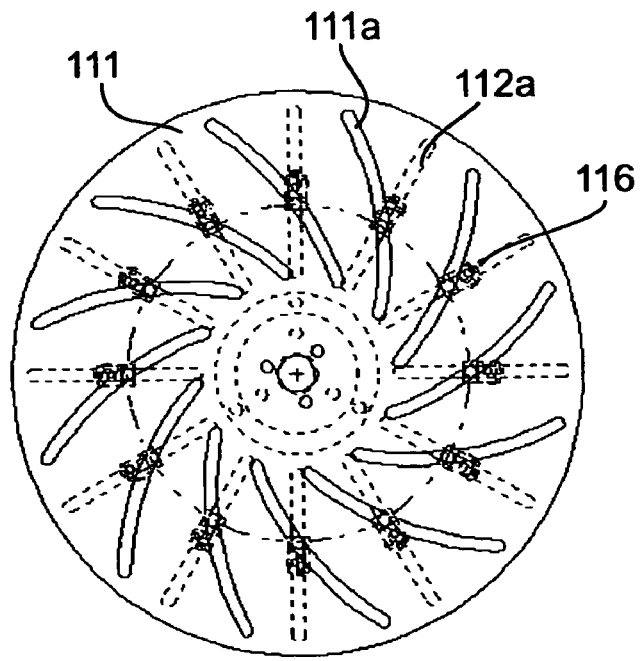
FIG. 35 is an end view, illustrating a further variable-diameter toothed wheel construction in accordance with the present invention.

FIG. 35 is an end view illustrating the toothed wheel in its assembled condition; and FIG. 36 illustrates it received within a chain 30 for coupling the toothed wheel to another toothed wheel of like construction, such as shown in FIG. 14, or to a sprocket wheel of a bicycle, such as shown in FIG. 13.

In the transmission illustrated in FIG. 36, the toothed wheel 110 is driven by the chain 30 to rotate counter-clockwise. The curved slots 111a, 112a, in the toothed wheel are curved in the opposite direction to the direction of rotation of the wheel. This maintains the chain 30 firmly engaged with the coupling elements 116 of the toothed wheel 110 and tends to move outwardly in their respective curved slots, thereby maximizing the effective diameter of the toothed wheel. This also minimizes the effective diameter of the other toothed wheel (not shown) coupled at the opposite end of chain 30. The end result is that the chain 30 is maintained taut and firmly pressed against the coupling elements 116 of the two toothed wheels.

Figure 39:
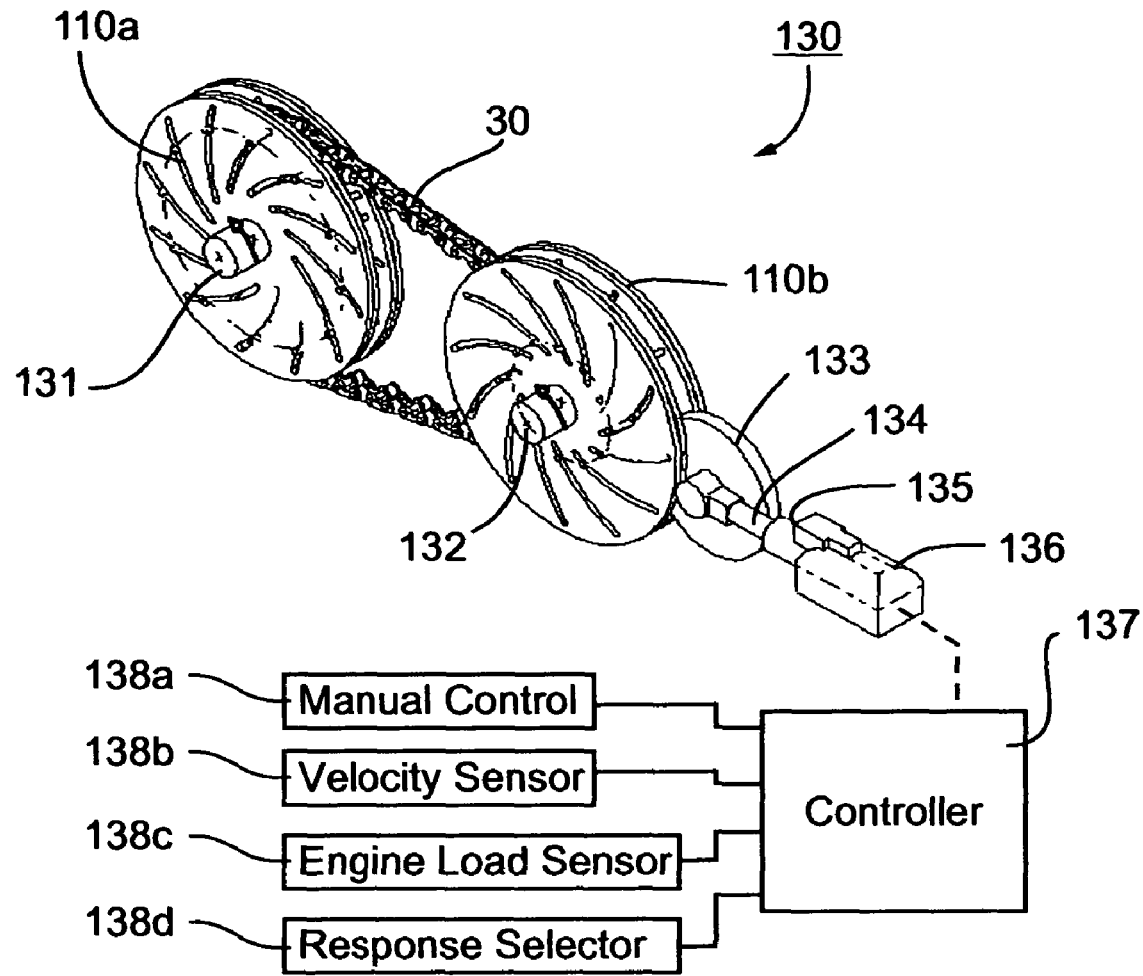

In addition, an equilibrium of forces is obtained between the two toothed wheels, both exerting equal and opposite forces on the chain 30, such that a relatively small force is sufficient to change the effective diameters of the toothed wheels, and thereby to change the transmission ratio defined by them. FIGS. 38 and 39 (as well as FIG. 64 later described below) illustrate various manners of changing the transmission ratio with such a variable-diameter toothed wheel construction.

For illustrative purposes, contact 119 in the coupling element 116 illustrated in FIG. 37 is of the construction illustrated in FIG. 9, but it will be appreciated that other constructions of contact elements could be used. In addition, instead of using the contact plate (e.g., 119) for contacting the surface of the projections and depressions to be coupled, the pins (118) projecting from the slot of one of the discs could be used as the coupling element, as in some of the later described embodiments.

In FIG. 38, the transmission ratio determined by the effective diameter of the toothed wheel 110 is controlled by a control lever 120 formed with an axial slot 121. The inner end of control lever 120 is pivotally coupled to a pin 122 which is fixed to the two outer discs 111, 112, formed with the curved slots 111a, 112a. The outer end of slot 121 in control lever 120 receives another pin 123 fixed to the two inner discs 113, 114, formed with the straight slots 113a, 114a. The outer end of lever arm 120 carries a weight 124.

Weight 124 serves as a velocity sensor to automatically change the transmission ratio in response to velocity. Thus, as the velocity increases, the weight 124 will move the control lever 120 outwardly by centrifugal force, to change the effective diameter of the toothed wheel in the direction to make the appropriate change in the transmission ratio between the toothed wheel and the chain, and vice versa. The so-produced centrifugal force will be amplified by the ratio of the radius of rotation of weight 124 to the radius of rotation of pin 123.

The transmission system such as illustrated in FIG. 38 is particularly useful in bicycles.

FIG. 39 illustrates a CVT system having automatic control useful in a power-driven vehicle or other power-driven apparatus. The transmission system illustrated in FIG. 39, and therein generally designated 130, includes two variable-diameter toothed wheels 110a, 110b, each of the construction described above with respect to FIGS. 34-37, coupled together by a chain 30. For example, shaft 131 of toothed wheel 110a could be the drive shaft, and shaft 132 of toothed wheel 110b could be the driven shaft. In the condition illustrated in FIG. 38, the toothed wheel 110a has a relatively large effective diameter, and the toothed wheel 110b has a correspondingly small effective diameter.

In FIG. 39, the two drive shafts 131, 132 rotate counter-clockwise; whereas the curved tracks in the two toothed wheels 10a, 10b are curved in the opposite direction to the direction of rotation. As described earlier, such an arrangement maintains the chain 30 taut and firmly pressed against the coupling elements in the two toothed wheels 110a, 110b; it also produced an equilibrium of forces between the two toothed wheels such that a relatively small force is sufficient to change the effective diameters of the toothed wheels, and thereby to change the transmission ratio defined by them.

FIG. 39 schematically illustrates a control mechanism for changing the effective diameters of the two toothed wheels 110a, 110b, and thereby the transmission ratio between them. Such a mechanism includes a disc 133 bearing against the end of chain 30 wrapped around toothed wheel 110b to define the effective inner diameter of that toothed wheel, and thereby, indirectly, also the effective diameter of toothed wheel 110a. Disc 133 is carried by a piston 134 movable within a cylinder 135 by a hydraulic motor 136 controlled by a controller 137. Controller 137 could, in turn, be controlled manually or automatically. It therefore includes a manual control input 138a to permit manual control, and a velocity sensor input 138b to permit automatic control in response to velocity, such as the velocity of vehicle wheels, drive shaft, foot pedals, etc. It further includes a load sensor input 138c to permit automatic control in response to load, e.g., load on a vehicle engine, on a drill, or the like. Controller 137 includes a further input 138d which enables the user to select the nature of the response to the preselected condition; for example, in a motorized vehicle, the user may select a fast or a slow change in the transmission ratio in response to velocity.

Controller 137 could be, or include, a hydraulic pump driven by the vehicle engine and driving the hydraulic motor 136, such that the hydraulic pump itself serves an engine load sensor for controlling the transmission in response to engine load.

Figure 40:
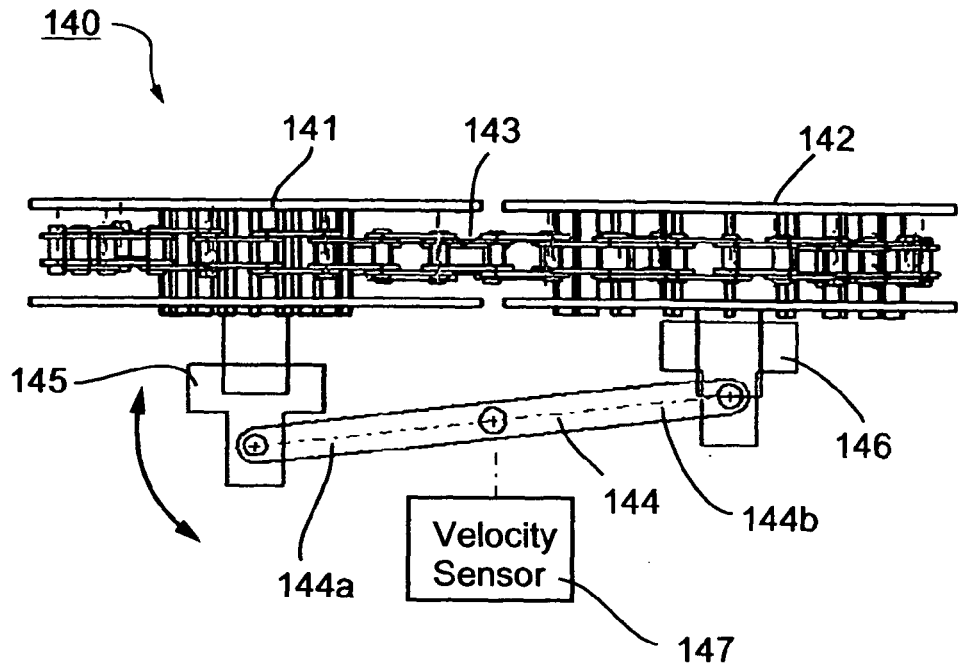
FIGS. 40 and 41 illustrate CVT systems, similar to those of FIGS. 2, 29, 31 or 32, including other arrangements for automatic control of the transmission ratios.

FIG. 40 illustrates a transmission system, generally designated 140, which is similar to that of FIG. 14, in that it includes a pair of variable-diameter toothed wheels 141, 142, coupled together by a chain 143, corresponding to toothed wheels 10 and chain 30 in FIG. 14.

Transmission 140 illustrated in FIG. 40 is controlled by a pivotally mounted control bar 144 acting on a control member 145 for toothed wheel 141, and on another control member 146 for toothed wheel 142. The control members 145, 146 may be bearings slidably on the shafts of their respective toothed wheels 141, 142, and bearing against one of the discs in the respective toothed wheel, such that when the control member moves the disc inwardly, it increases the effective diameter of the toothed wheel, and when it moves the disc outwardly, it decreases the effective diameter of the toothed wheel. Any of the previously-described arrangements can be used for this purpose, for example the variable-diameter toothed wheel constructions of FIGS. 29-31.

Control bar 144 is pivotally mounted at its center, with one end 144a coupled to control member 145 for toothed wheel 141, and the opposite end 144b coupled to control member 146 for toothed wheel 142. It will thus be seen that when control bar 144 is pivoted to move control member 145 outwardly to decrease the effective diameter of toothed wheel 141, the opposite end will move control member 146 inwardly to increase the effective diameter of its toothed wheel 142, and vice versa. Thus, the chain 143 coupling the two toothed wheels 141, 142 will always be maintained under constant tension, as described above with respect to FIG. 14.

The pivoting of the bar 144 may be effected manually and/or automatically in response to a sensed condition. For example, control bar may be coupled at its pivot point 144c to a velocity sensor 147, such as a centrifugal device, to automatically change the transmission ratio between the two toothed wheels 141, 142 in response to velocity. Such a transmission is particularly suitable for automotive vehicles, bicycles, and the like.

Figure 41:
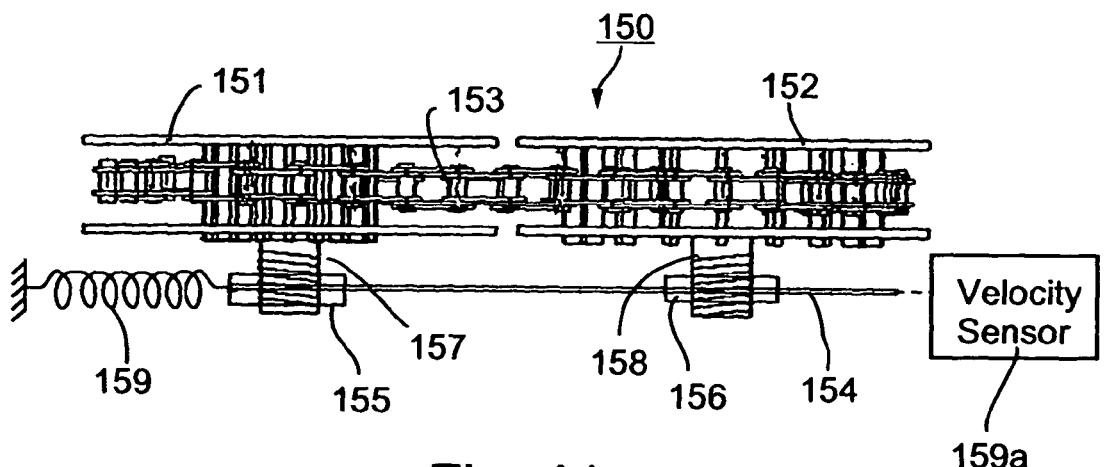

FIG. 41 illustrates a transmission control system similar to that of FIG. 40 but including a different arrangement for maintaining constant tension in the coupling chain. The control system illustrated in FIG. 41, therein generally designated 150, includes a pair of variable-diameter toothed wheels 151, 152, coupled together by a chain 153, as illustrated in FIG. 40. Here, however, the control is effected by a cable 154 which is wrapped around a cylinder 155 for toothed wheel 151, and another cylinder 156 for toothed wheel 152. Cylinder 155 is coupled to a threaded member 157 which in turn, is coupled to one of the discs in toothed wheel 151, such that when the cylinder is rotated in one direction, the disc of the toothed wheel is moved outwardly to decrease the effective diameter of the toothed wheel, and when the cylinder is rotated in the opposite direction, the disc is moved inwardly to increase the effective diameter of the toothed wheel. A similar arrangement is present with respect to cylinder 156 rotated by cable 154 and coupled via threaded member 158 to one of the discs in the variable-toothed wheel 152 to move the disc outwardly to decrease the effective diameter of the toothed wheel, or inwardly to increase its effective diameter.

Cable 154 may be wound on the two cylinders 155, 156, in opposite directions, such that pulling the cable in one direction against a spring 159 will cause one toothed wheel to increase its effective diameter and the other toothed wheel to decrease its effective diameter. The same result may be produced by providing the threaded members 155, 156, with threads of opposite directions.

The arrangement illustrated in FIG. 41 is particularly useful where the variable-diameter toothed wheels 151, 152 are distant from one another, such as in a bicycle transmission. One end of cable 154 may be fixed to spring 159, and the opposite end may be coupled to a velocity sensor 159a, such as a centrifugal device, effective to pull the cable harder 154 in one direction in order to automatically adjust the transmission ratio in response the velocity of the bicycle wheels or of the foot pedals.

Figure 42:
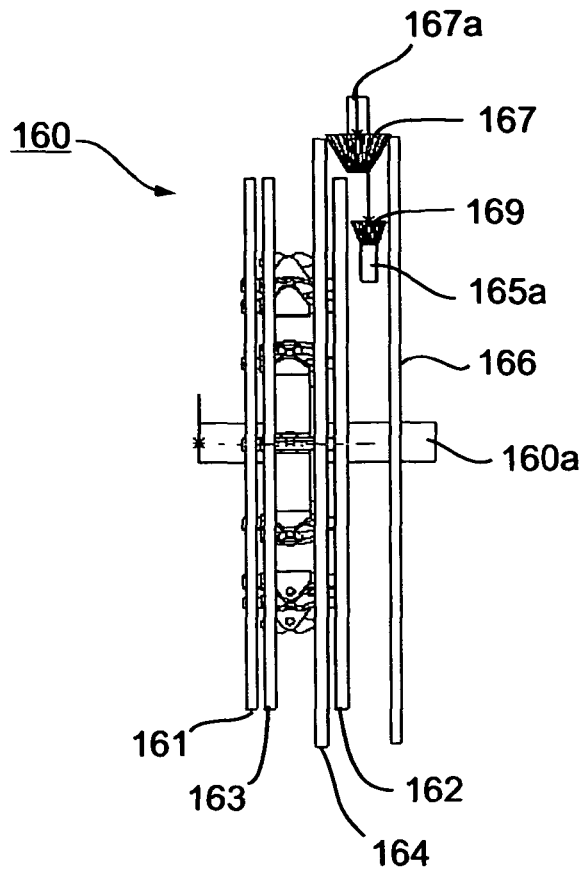
FIG. 42 illustrates a CVT system of the type illustrated in FIGS. 34-37 equipped with a differential mechanism enabling continuous control while the transmission is rotating.

FIG. 42 illustrates a CVT system allowing transmission control while the system is rotating. The CVT system illustrated in FIG. 42 includes a variable-diameter toothed wheel, generally designated 160, of the same construction as described above with respect to FIGS. 34-37, including a pair of outer discs 161, 162 formed with curved slots, and a pair of inner discs 163, 164 formed with straight radial slots. Wheel 160 rotates on axle 160a.

Outer disc 162 formed with the curved slots meshes with a bevel gear 165 rotating on an axle 165a, which gear rotates a transfer disc 166 rotating on axle 160a. Transfer disc 166 in turn rotates another gear 167 on axle 167a, which gear meshes with inner disc 164 forward with the straight radial slots of the variable-diameter wheel 160.

Axle 165a of gear 165 is fixed in place, whereas axle 167a of gear 167 is movable around the central axle 160a of the variable-diameter wheel 160. As long as axle 167a remains in place, the angle between the two wheel discs 162 and 164 will remain constant, and therefore the effective diameter of wheel 160 will also remain constant. However, as soon as axle 167a is moved, the angle between the two discs 162, 164 changes which thereby moves the coupling pins (116, FIG. 34) in the radial direction to change the effective diameter of wheel 160 as described above with respect to FIGS. 34-37.

It will thus be seen that the assembly including gear 165, transfer disc 166, and gear 167, constitutes a differential mechanism which permits the CVT system to be controlled while rotating.

Axle 167*a* may be manually controlled and/or automatically controlled in order to change the transmission ratio of the CVT system. For example, any of the automatic controls described above with respect to FIG. 39 can also be used to control the system in FIG. 42.

Figure 43:
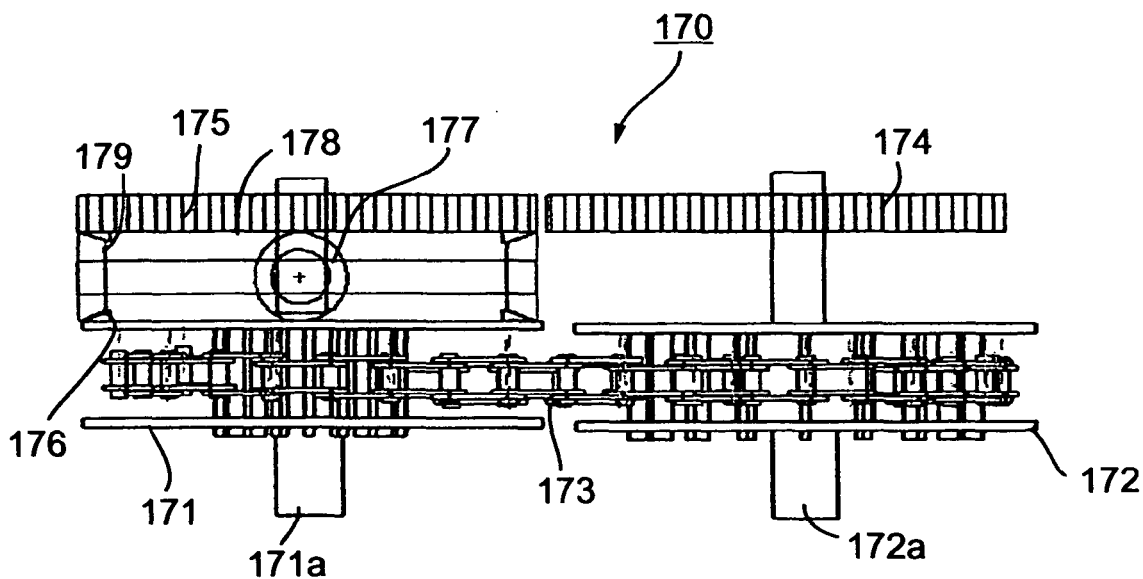
FIG. 43 illustrates a CVT system of the type illustrated in FIGS. 34-37 equipped with a differential mechanism to enable the system to operate as an infinitely-variable transmission (IVT) with zero velocity at the output shaft.

FIG. 43 illustrates a CVT system constructed in accordance with the present invention but including a differential mechanism which converts the CVT system to an IVT (infinitely variable transmission) system which enables reaching a transmission ratio down to complete stoppage and also reversal, without the need of a clutch. Such a system is therefore particularly useful for vehicles.

The system illustrated in FIG. 43, therein generally designated 170, includes two variable-diameter toothed wheels 171, 172, each of the construction as described above with respect to FIGS. 34-37, and coupled together by a chain 173. Axle 172*a* of wheel 172 is coupled to a gear 174 which gear is in turn coupled to another gear 175, so that gear 175 rotates at the same velocity, but in the opposite directions, to axle 172*a* of wheel 172.

Gear 175 is coupled to the outer disc 176 of the variable-diameter wheel 171 via a differential mechanism schematically indicated by gears 177, 178 and 179. This differential mechanism remains static without rotation when the transmission ratio is at a point in which the speed of gear 175 is identical to the speed of disc 176. Any variation in the transmission ratio will cause the central ring gear 179 of the differential mechanism to start rotating. In this manner, it is possible to achieve a transmission capable of converting the engine speed to any desired output speed, from rest up to the highest speed required, without changing the engine speed and without using a clutch.

Figure 44:
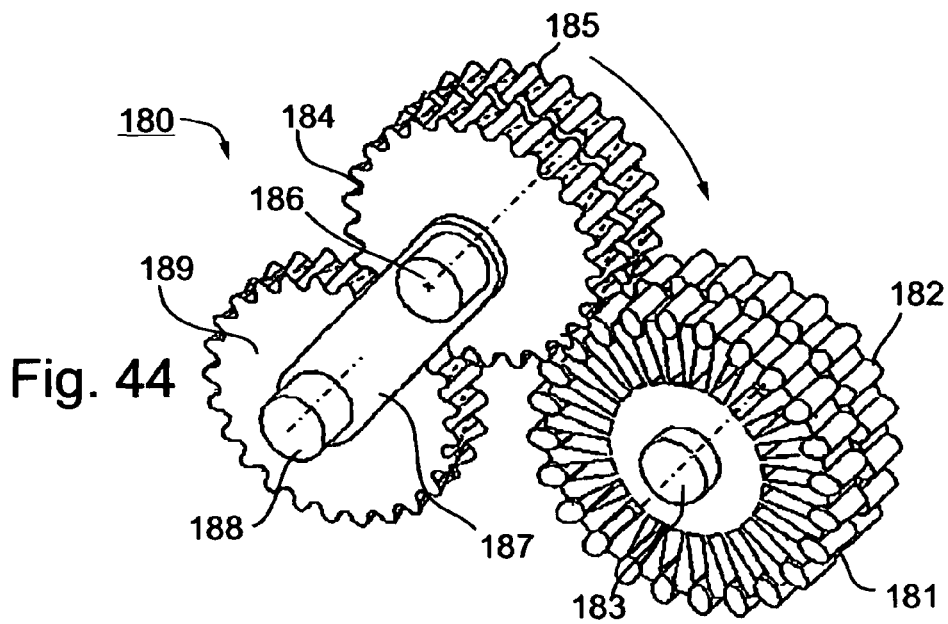
FIGS. 44-46 illustrate a CVT system including one manner of increasing the range of transmission ratios and/or load capabilities.

FIG. 44 schematically illustrates another transmission system, generally designated 180, which may be used to increase the range of transmission ratio changes. Such a system may also be used to increase the load capability of the transmission system, without changing the location of the input and output shafts.

Transmission system 181 includes two (or more) variable-diameter toothed wheels, schematically indicated at 181, 182, fixed together on a common shaft 183, and two (or more) fixed diameter toothed wheels 184, 185, also fixed to rotate together on a common shaft 186. Each of the variable-diameter toothed wheels 181, 182, and each of the fixed-diameter toothed wheels 184, 185 could be of a construction as described above with respect to FIGS. 1-4. However, a staggered arrangement is preferably used between toothed wheels 181 and 184 on one hand, and wheels 182 and 185 on the other hand, to increase the range of transmission ratios permitted by this system without producing undo clearances between the teeth of the toothed wheels 181, 182 which could result in slippage. A non-staggered relationship could also be used where it is desired to have the load divided between each pair of wheels 181, 184 and 182, 185, thereby increasing the load capability of the transmission system.

As further shown in FIG. 44, the two fixed-diameter toothed wheels 184, 185 are mounted on a common shaft 186 which is carried at one end of a pivotal arm 187. The opposite end of pivotal arm 187 is pivoted about axis 188 and rotatably mounts a fixed-diameter toothed wheel 189 meshing with toothed wheel 184.

It will be seen that the CVT system illustrated in FIG. 44 may be used to increase the transmission-ratio ranges of the system (without undue clearances between the teeth which may cause slippage), as well as the load capability of the system, both without changing the location of the input and output shafts (183, 188). It will also be appreciated that more than two variable-diameter toothed wheels 181, 182 and fixed-diameter toothed wheels 184, 185 could be used as well as a corresponding number of transfer wheels 189, to further increase the range of transmission ratios and/or the load capability of the transmission system.

Figure 45:
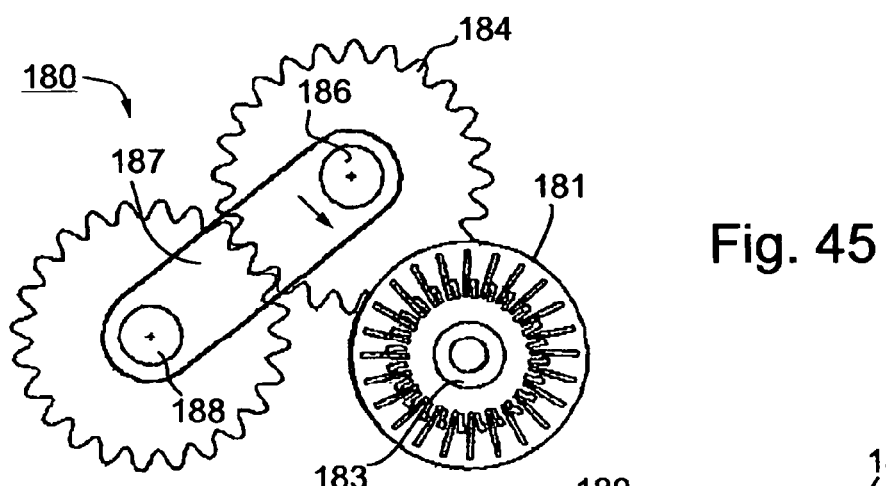
Figure 46:
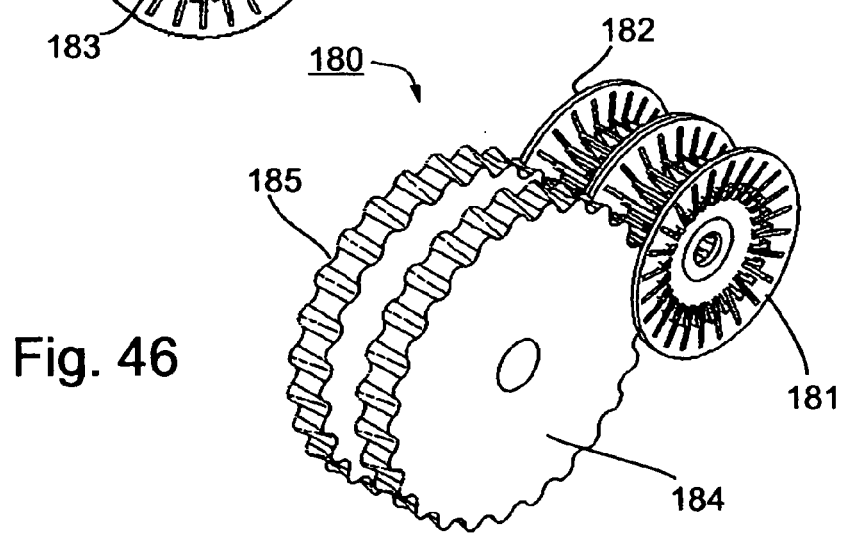

FIG. 45 is a side view of the CVT system 180 of FIG. 44 more particularly illustrating the structure of the variable-diameter toothed wheel 181 (also 182); whereas FIG. 46 is a perspective view more particularly illustrating the structure of both variable-diameter wheels 181, 182, and the fixed-diameter toothed wheels 184, 185 coupled to them.

FIGS. 47-49 illustrate another CVT system, therein generally designated 190, including a disc 191 having a central axle 192. Disc 191 is formed with an annular array of radial-extending slots 193 each receiving a pin 194 slidable within the respective slot towards or away from the central axle 192. The upper end of each slot 193 is enlarged, as shown at 193*a*, to facilitate insertion and removal of the pins. Each pin 194 includes a reduced-diameter section 194*a* (FIG. 48) received within its respective slot 193, a relatively long end section 194*b* projecting outwardly of the disc 191 as shown in FIG. 47, and a shorter end section 194*c* at the opposite end of the pin.

Disc 191, together with the pins 194, thus constitutes a variable-diameter toothed wheel which may or may not rotate about its central axis 192.

The illustrated transmission further includes a gear assembly, generally designated 195, which rotates, with respect to the toothed wheel defined by disc 191 and its annular array of pins 194, around axle 192 of the disc. Gear assembly 195 includes a pair of gears 196, 197, mounted on an arm 198, on both sides (or only one side) of disc 191. As shown particularly in FIG. 49, the two gears 196, 197 have teeth which are dimensioned so as not to engage each other but to provide a clearance between the teeth which clearance is exactly equal to the diameter of the pins 194 it can be rectangular Gear assembly 195 may be moved radially towards or away from the central axis 192 of disc 191 and thus change the effective diameter of the toothed wheel defined by the pins 194 since the pins will move radially with the gear assembly 195. Such a movement of the gear assembly thus changes the transmission ratio of the illustrated transmission. For example, arm 198 of the gear assembly 195 could be coupled to an input shaft, and the central axis 192 of disc 191 could be coupled to an output shaft, so that the transmission ratio between the two shafts can be changed by changing the radial position of the gear assembly 195.

On the other hand disc 191 could be shifted in order to change the transmission ratio between the two shafts. Such an arrangement would provide the advantage of permitting changes in the transmission ratio without moving the input or output shafts.

Disc 191 thus constitutes one transmission member, and the annular array of pins 194 define the group of projections and depressions of that member which are radially displaceable towards and away from axis 192 to change the conversion ratio of the transmission. Gear assembly 195 constitutes a rotary member which is rotatable about the axis 192, and that gears 196, 197 of rotary assembly 195 constitute a series of projections and depressions of fixed configuration engageable with the pins 194 of disc 193 while the gear assembly 195 rotates about the central axis 192. Pins 194 within the slots 193 of disc 191 are individually displaceable to as to automatically adapt themselves to the configuration of the teeth on the gears 196, 197 of gear assembly 195 in all displacement positions of the pins 194 such as to effect a non-slip coupling therewith in all radial positions of the pins.

It will thus be seen that the CVT system illustrated in FIGS. 47-49 transmits mechanical motion between a rotary driving member and a rotary driven member having parallel axes of rotation, namely disc 191 rotatable about its axis of rotation 192, and gear assembly 190 rotatable about its axis of rotation parallel to that of axis 192. It will also be seen that the illustrated CVT system includes a pin (194) parallel to the axes of rotation of the driving and driven members; that one of the rotary members, namely (disc 191) is engageable with each pin 194 and allows it a relative -movement only in a direction that is essentially perpendicular to the axes of rotation of gear assembly 195 and disc 191, and perpendicular to the pin 194; and that the other rotary member (gear assembly 195) is engageable with each pin 194 such that when gear assembly 195 is rotated, it forces the pin to move in both the tangential and radial directions, wherein the tangential movement is in the direction of the motion, and the radial movement is periodic around a median radius.

It will also be seen that the pins 194, constituting the self-adaptive coupling elements, engage oppositely sloped surfaces of the gear teeth 196, 197, to thereby effect a non-slip coupling along lines of contact therewith; and that, since the gears 196, 197, are of uniform thickness, the pitch of the projections and depressions defined by them is the same along each line of contact with the pins 194, thereby avoiding the creation of undue differential stresses in the coupling elements along these lines of contact.

Figure 50:
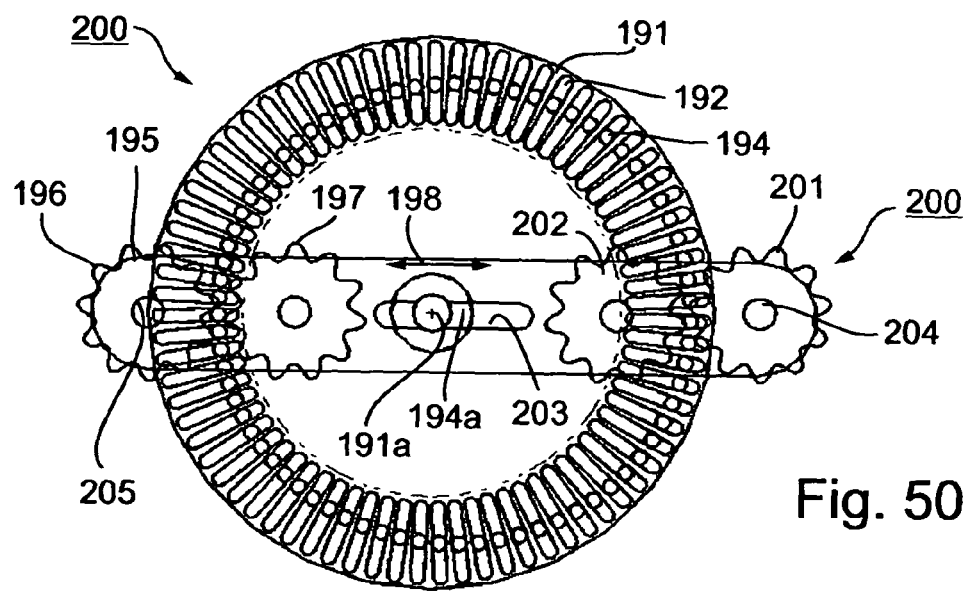
FIGS. 50 and 51 illustrate two further implementations of the invention in CVT systems including toothed wheels having variable-diameter pin arrays.

FIG. 50 illustrates another CVT system, therein generally designated 200, which includes a variable-diameter toothed wheel of the construction illustrated in FIGS. 47-49 acting at one end of the toothed wheel, and another gear assembly acting at the opposite end of the toothed wheel. To facilitate understanding, those elements in the system 200 of FIG. 50 which correspond to the elements described above with respect to FIGS. 47-49 are identified by corresponding reference numerals.

Thus, as shown in FIG. 50, the arm 198 mounting the two gears 196, 197 of gear assembly 195 is extended to the opposite side of the toothed wheel 190 and carries another gear assembly 200 including a pair of gears 201, 202 meshing with the pins 194 at the opposite side of the toothed wheel disc 191. Arm 197 is provided with an elongated slot 203 to accommodate the central axis 191a of disc 191. The central axis of the annular array of pins 194 is shown at 194a. In the arrangement illustrated in FIG. 50, shaft 204 fixed to gear 201 could serve as the input shaft to the CVT system, and shaft 205 coupled to gear 196 could serve as the output shaft, or vice versa.

The transmission ratio between the input and output shafts can thus be changed, as desired, by suitably shifting disc 191 to shift its central axis 191a with respect to the central axis 194a of the annular array of pins 194. Thus, when disc 191 is located such that its axis 191a coincides with the central axis 194a of the array of pins 194, the transmission ratio between the input shaft 204 and output 205 will be 1:1; and by shifting disc 191, in one or the other direction, the transmission ratio between the two shafts is accordingly changed.

It will be appreciated that in the CVT system illustrated in FIG. 50, the diameter of the array of pins 194 in the slotted disc 191 is not changed when changing transmission ratios, but rather the effective radius of the respective part of the annular array defined by the pins is changed. It will also be appreciated that relatively small movements of the disc 191 are needed to change the transmission ratio since the changes in the effective radius of the annular array of pins 194 at its diametrically-opposite sides are cumulative for changing the transmission ratio.

Figure 51:
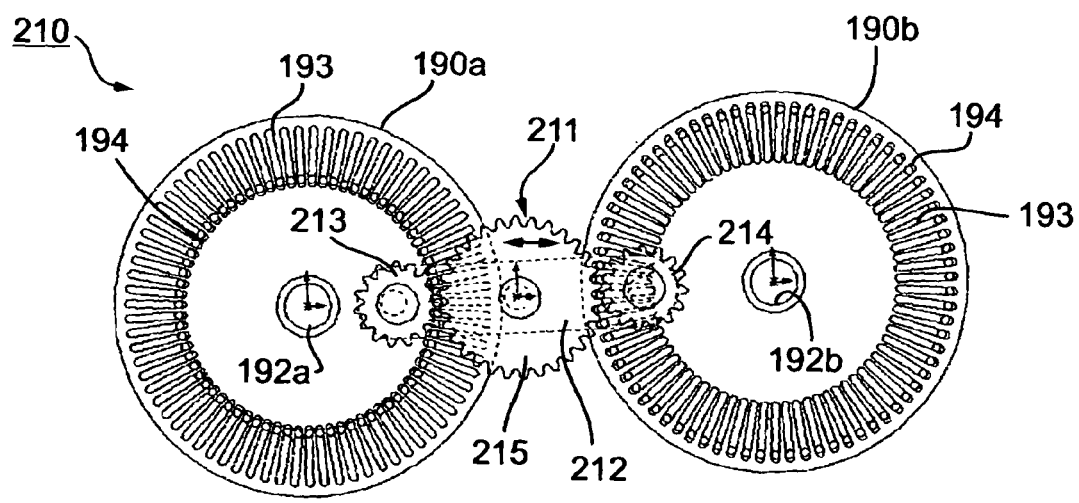

FIG. 51 illustrates a CVT system 210 generally similar to that of FIG. 50 but including two variable-diameter wheels 190a, 190b, each of the construction shown at 190 in FIGS. 49 and 50, but with a single gear assembly, generally designated 211, coupled to the radially-displaceable pins 194 of each toothed wheel. Gear assembly 211 includes a mounting member or arm 212 mounting a gear 213 at one end received within wheel 190a, and another gear 214 at the opposite end received within toothed wheel 190b. Gear assembly 211 further includes an intermediate gear 215 between the two toothed wheels 190a, 190b, and cooperable with the two gears 213, 214 coupling them to their respective pins 194 in the two toothed wheels 190a, 190b in the same manner as described above with respect to FIGS. 47-49.

For example, the input shaft could be coupled to the center axle 192a of toothed wheel 190a, and the output shaft could be coupled to the center axle 192b of toothed wheel 190b. When gear assembly 211 is located precisely at the mid point between the two axles 192a, 192b, the effective diameters of the two toothed wheels 190a, 190b are equal, and therefore the transmission ratio between the input and output shafts will be 1:1. Shifting the gear assembly 211 towards the input shaft 192a, as illustrated in FIG. 51, will decrease the effective diameter of toothed wheel 190a, and increase the effective diameter of toothed wheel 190b, or vice versa, thereby changing the transmission ratios between the input and output shafts accordingly. Such an arrangement thus also enables changing the transmission ratios without changing the locations of the input and output shafts.

FIG. 52-55 illustrate another construction of variable-diameter toothed wheel, generally designated 220, which can be used in the CVT system according to the present invention. Here, the toothed wheel is constructed of two conical discs 221, 222, each formed with a plurality of radially-extending slots 221a, 222a, receiving an annular array of pin assemblies 223.

Figure 53:
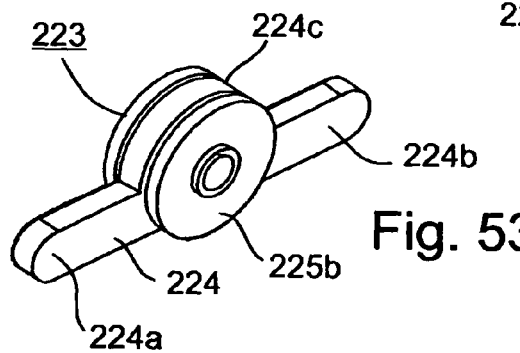

The construction of each pin assembly 223 is more particularly illustrated in FIG. 53. It includes a pin 224 having aligned opposite ends 224a, 224b joined by a circular middle section 224c. Pin assembly 223 further includes a roller 225a carried at one side of the middle circular section 224c, and a second roller 225b carried at the opposite side of that section.

Figure 54:
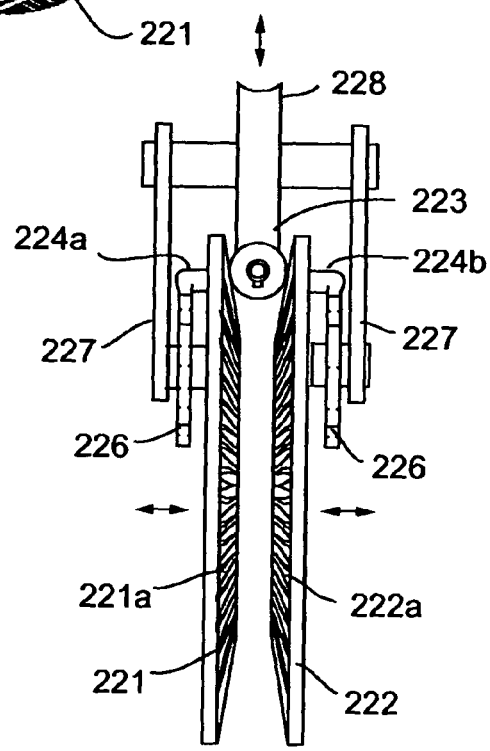

The two conical discs 221, 222 are assembled as shown in FIG. 54, with the two end sections 224a, 224b of the annular array of pin assemblies 223 received within their respective slots 221a, 222a in the conical discs 221, 222.

Figure 52:
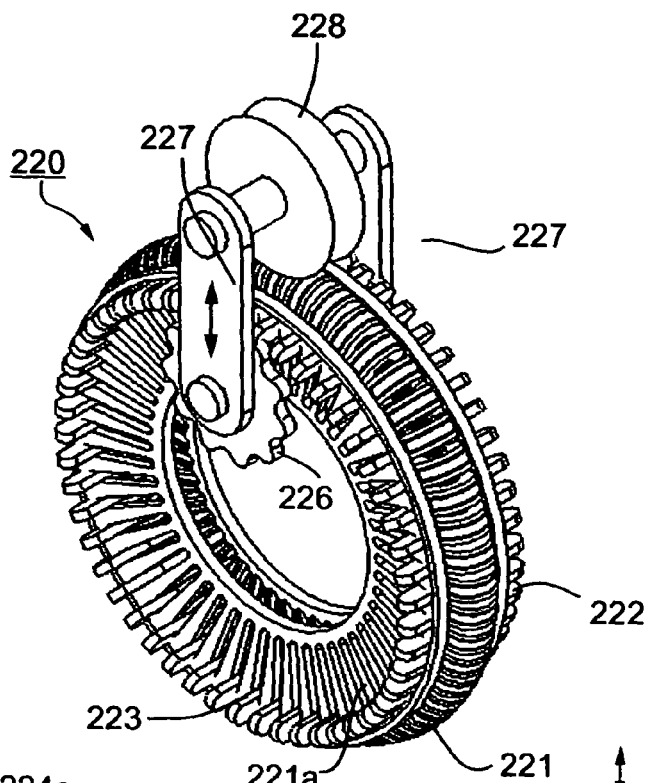
FIGS. 52-55 illustrate a further implementation of the invention in a CVT system including a variable-diameter toothed wheel having an annular array of pins.

A pair of gears, one of which is shown at 226 in FIG. 52 carried within toothed wheel 220, engage the inner surfaces of the end section 224a, 224b of the pin assemblies 223. The two gears 226 are carried at the inner end of a pair of mounting members 227. The outer ends of mounting members 227 carry a roller 228 rollable along the outer surface of the circular middle sections 224c of the array of pin assemblies 223 within the toothed wheel 220.

The two conical discs 221, 222 can be moved towards or away from each other by any suitable means, e.g. as described above with respect to FIGS. 2, 29, 31 or 32, or as described below with respect to FIG. 64, to change the transmission ratio between the toothed wheel 220 and the gear 226. Thus, when the two discs 221, 222 are moved towards each other, the pin assemblies 223 are moved outwardly along the conical surfaces of the discs, to thereby increase the effective diameter of the toothed wheel 220, and vice versa.

Figure 55:
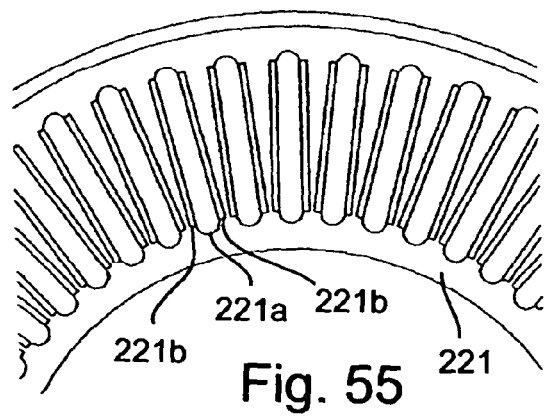

As shown in FIG. 55, each slot (e.g., 221a) in each of the discs (e.g., 221) is recessed along its opposite sides to receive the rollers 225a, 225b, of each pin assembly 223. The recesses, shown at 221b, 221c in FIG. 55, are preferably of different depths and are arranged with respect to the two discs such that one roller is free to roll in one direction on one disc while cleared from the other disc, and the other roller is free to roll in the opposite direction of the other disc while cleared from the one disc.

Roller 228 includes a concave outer surface so as to engage the middle sections 224c of the pin assemblies 223 during the rotation of the gears 226 with respect to the toothed wheel 220.

It will be appreciated that the conical surfaces of the two discs 221, 222 could be inverted, i.e., such that when the two discs come closer together, the effective diameter of the wheel increases, rather than decreases.

Figure 56:
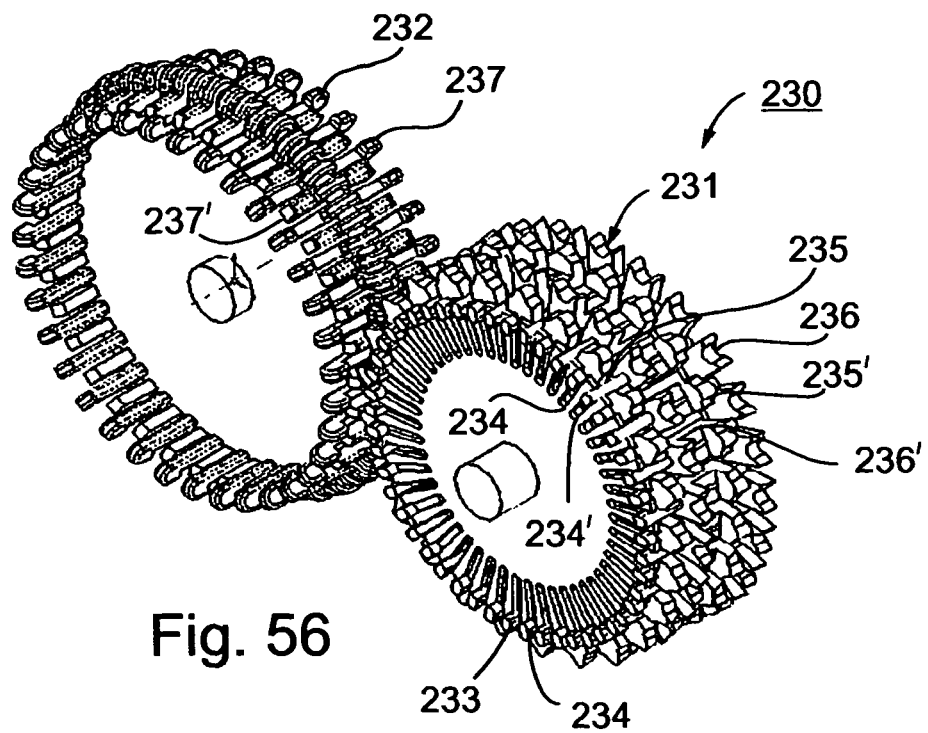
FIG. 56 illustrates another CVT system in accordance with the invention, wherein one of the transmission members is a fixed-diameter toothed wheel having an annular array of the self-adaptive pin coupling elements, and the other transmission member is a variable-diameter toothed wheel having the fixed-configuration coupling elements.

FIG. 56 illustrates another CVT system, generally designated 230, which includes a variable-diameter toothed wheel 231 and a fixed-diameter toothed wheel 232. In this case, the variable-diameter toothed wheel 231 carries the coupling elements defining the projections and depressions of fixed configuration, whereas the fixed-diameter toothed wheel 232 carries the coupling elements of the self-adaptive configuration to conform to the configuration of the coupling elements on the variable-diameter toothed wheel 231 in all radial positions of the latter elements.

Thus, as shown in FIG. 56, the variable-diameter toothed wheel 231 is formed with a plurality of radial slots 233 each receiving a pin 234 carrying an element defining a projection 235, and another element defining a depression 236. In one pin 234, the projection 235 and depression 236 are located at the extreme ends of the pin, whereas in the adjacent pin, shown at 234' in FIG. 56, the projection and depression are located in an intermediate portion of the pin with the projection 235' and depression 236' reversed as compared to pin 234. Such a construction produces a compact arrangement of annular arrays of projections and depressions which are radially displaceable within their respective slots 233 to vary the effective diameter of the toothed wheel 231.

The fixed-diameter toothed wheel 232 includes an annular array of individually pivotal pins 237. Pins 237 are adapted to engage the projections 235 and depressions 236 in toothed wheel 231 and to self-adapt their configuration to those projections 235 and depressions 236 to thereby effect a non-slip coupling with them in all radial positions of those projections and depressions.

Preferably, fixed-diameter toothed wheel 232 also includes two types of pins, shown at 237 and 237'. Pins 237 are longer than pins 237' and are oriented to engage the projections 235 and depressions 236 of the pins 234 carrying them at their opposite ends; whereas pins 237' are of shorter length and are oriented to engage the projections 235' and depressions 236' of the pins 234' located in the intermediate portions of pins 234'. Such an arrangement provides a compact disposition of the pins 237 and 237', and of the projections 235, 235' and depressions 236, 236', with assurance that no excessive clearances will be produced when the effective diameter of toothed wheel 231 is increased.

Figure 57:
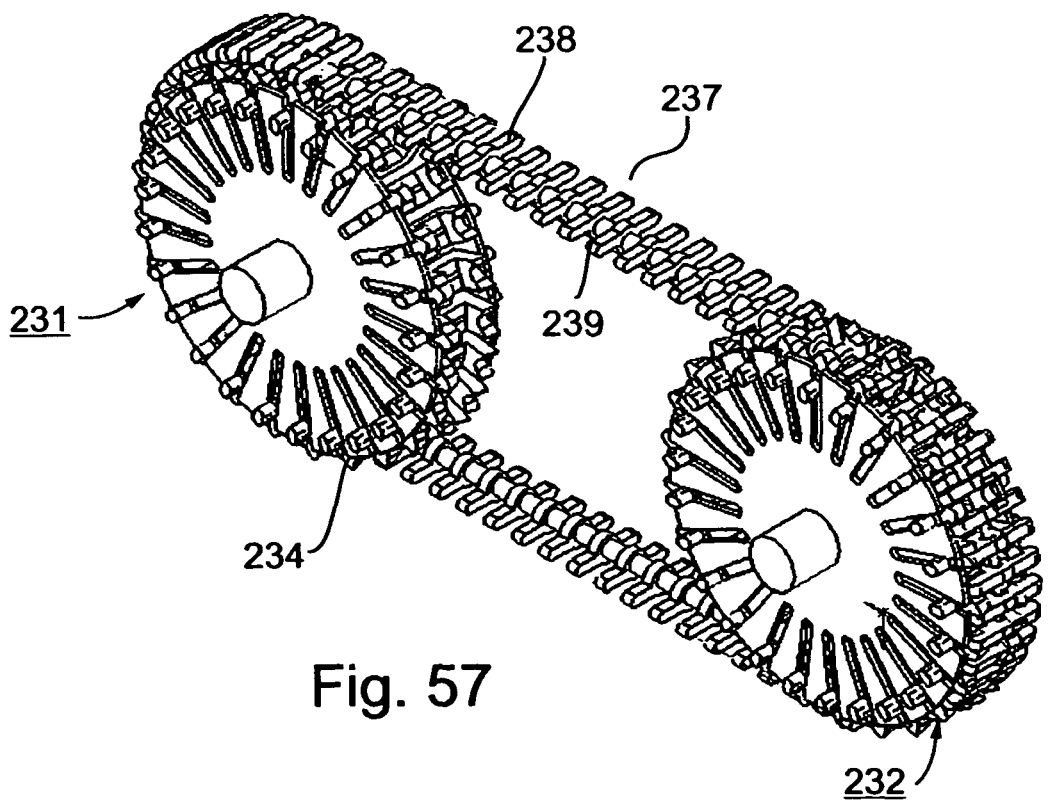
FIG. 57 illustrates a CVT system similar to that of FIG. 56 but including a chain having the self-adaptive coupling elements coupling two variable-diameter toothed wheels having the fixed-configuration coupling elements.

FIG. 57 illustrates a CVT system similar to that of FIG. 6, but including two variable-diameter toothed wheels, each of the same construction as one-half of the toothed wheel 231 in FIG. 56 (and therefore also identified by the same reference numeral 231) coupled together by a chain 239. It will be appreciated that the two toothed wheels 231 in FIG. 57 include the pins 234 carrying the projections 235 and depressions 236 as in FIG. 56, whereas the chain 239 carries the pivotal pins 237 which are self-adaptive to the configurations of the projections and depressions, as described with respect to FIG. 56. It will also be appreciated that the chain 239 is always maintained taut since a reduction in the effective diameter of one wheel 231 is accompanied by an increase in the effective diameter of the other wheel 231, as described above with respect to FIG. 14.

Figure 58:
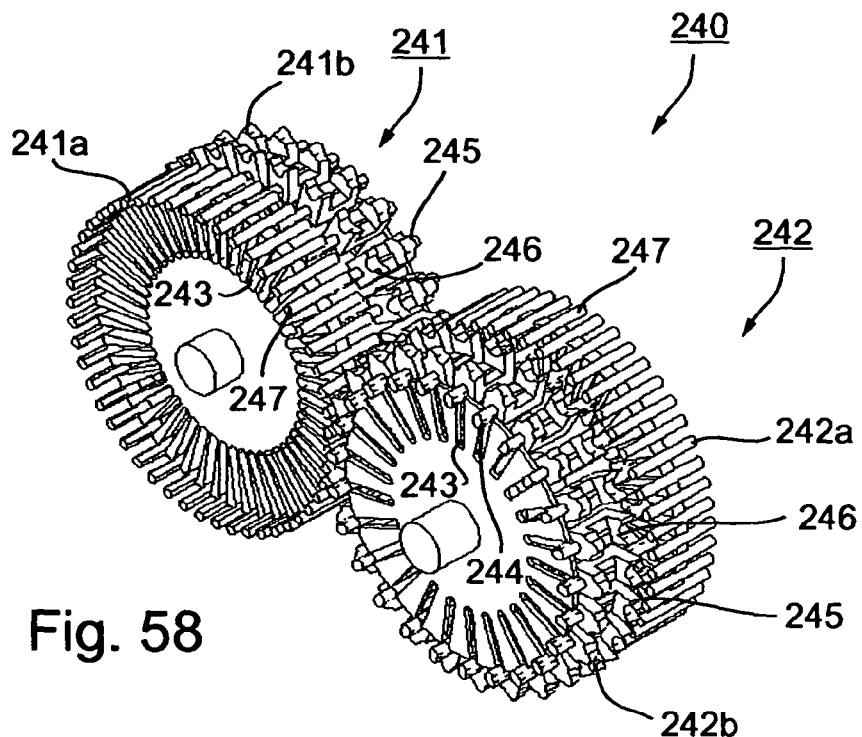
FIG. 58 illustrates a CVT system including two rotary members of like construction, each pivoted with the self-adaptive coupling elements and the fixed-configuration coupling elements, the two rotary members being coupled together to provide a continuously-variable transmission.

FIG. 58 illustrates a CVT system 240 also including two toothed wheels 241, 242, but in this case the coupling elements of both wheels are displaceable radially to thereby change the effective diameter of the respective wheel. In addition, the two toothed wheels 241, 242 are of like construction, but differently oriented with respect to each other. This enables a CVT system to be constructed with two (or more) toothed wheels of like construction, thereby substantially reducing initial tooling, maintenance, and inventory costs.

As shown in FIG. 58, toothed wheel 241 is constructed of a first section 241a carrying the coupling elements of fixed configuration, and another section 241b carrying the coupling elements of a self-adaptive configuration. The other toothed wheel 242 is similarly constructed of a section 242a carrying the fixed-configuration coupling elements, and section 242b carrying the self-adaptive configuration coupling elements. As further shown in FIG. 58, section 241a of wheel 241 is aligned with section 242b of wheel 242, and section 241b of wheel 241 is aligned with section 242a of wheel 242.

Since section 242a of wheel 242 is constructed exactly the same as section 241a of wheel 241, and since section 241b of wheel 241 is constructed exactly the same as section 242b of wheel 242, the description below will be restricted to that of section 241a of wheel 241 and section 242b of wheel 241 engaged by section 241a.

Both sections 241a and 241b of wheel 241 are formed with an annular array of radially-extending slots 243. As seen in wheel section 242b, that section (as well as section 241b of wheel 241) receives a plurality of pins 244 each receiving an element defining a projection 245 and an element defining a depression 246. As seen in wheel section 241a, that section (as well as section 242a of wheel 242) receives a plurality of pivotal pins 247 defining the self-adaptive coupling elements which automatically adapt to the configuration of the projections 245 and depressions 246 when engaged thereby.

It will thus be seen that, when the two toothed wheels 241, 242 are disposed as illustrated in FIG. 58, with section 241a of wheel 241 meshing with section 242b of wheel 242, and section 241b of wheel 241 meshing with section 242a of wheel 242: (1) the radial positions of both coupling elements 244 and 247 will be changed to change the effective diameter of the respective toothed wheel; (2) a change in the effective diameter of one wheel will be accompanied by a corresponding change in the effective diameter of the other wheel; and (3) pivotal pin coupling elements 247 in section 241a of wheel 241 and in section 242a of wheel 242 will self-adapt their configurations to the configurations of the projections 245 and depressions 246 of sections 241b of wheel 241 and section 242b of wheel 242 in all radial positions of the projections and depressions, and thereby effect a non-slip coupling in all transmission ratios of the CVT system.

Figure 59A:
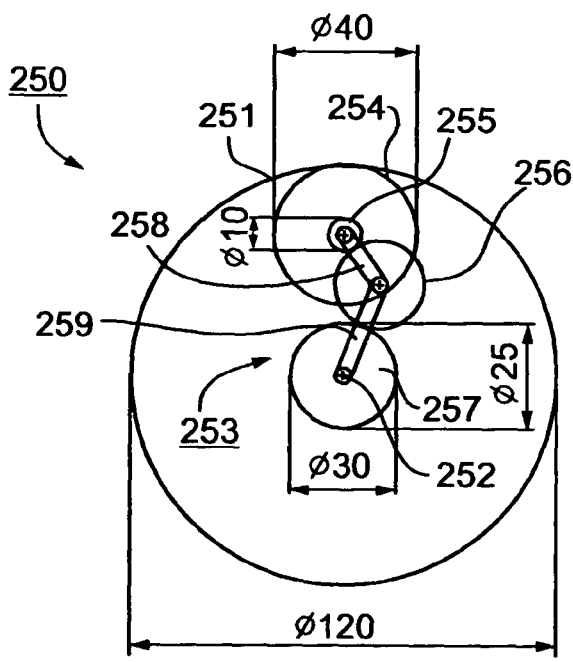
FIGS. 59a and 59b schematically illustrate two stages of another CVT system constructed in accordance with the present invention to provide an infinitely-variable transmission (IVT) capability.
Figure 59B:
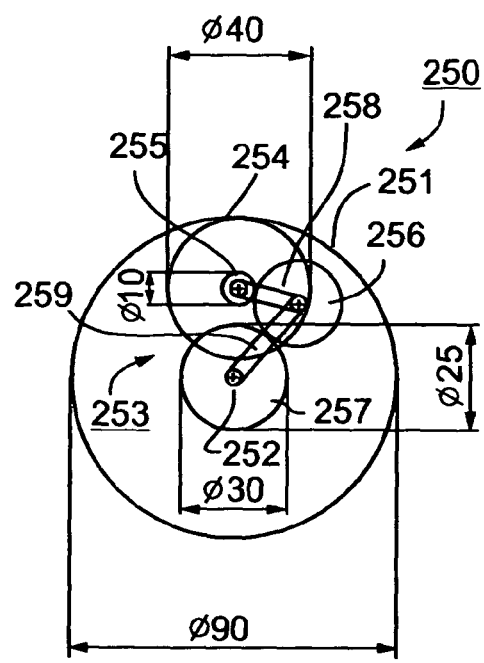

FIGS. 59a and 59b schematically illustrate how a CVT system as illustrated in FIGS. 47-49 may be constructed as an infinitely variable transmission (IVT) system, including the capability of zero velocity in its output shaft. Such a system may be called a planetary infinitely variable transmission (PIVT) system. FIGS. 59a and 59b schematically illustrate two conditions of such a PIVT system.

The PIVT system schematically illustrated in FIGS. 59a and 59b, and therein generally designated 250, includes a variable-diameter toothed wheel 251 having an annular array of pins (not shown) corresponding to pins 194 in FIGS. 47-49, which are radially displaceable towards and away from the center axis 252 to enable changing the effective diameter of the toothed wheel.

The transmission 250 also includes a planetary assembly, generally designated 253, which rotates around the teeth of the toothed wheel 251, namely the pins 194 of disc 191 shown in FIGS. 47-49. Planetary assembly 253 includes a first gear 254 meshing with the pins 194, a second gear 255 fixed to gear 254 to rotate therewith, a third gear 256 meshing with gear 255, and a fourth gear 257 meshing with gear 256. The planetary assembly 253 further includes a first arm 258 rotatably mounting gears 254 and 255 at one end and gear 256 at the opposite end, and a second arm 259 pivotally mounted to the latter end of arm 258 and rotatably mounting gear 257 at its opposite end. The rotary axis of gear 257 is coaxial with the center axis 252 of the toothed wheel 251.

Assume that toothed wheel 251 is fixed, and the planetary assembly 253 rotates about the center axis 252 of the toothed wheel 251. If the input shaft is coupled to the planetary assembly 253, and the output shaft is coupled to the central axis 252 of the toothed wheel 251, it will be seen that the transmission ratio between the input and output shafts can be changed by changing the effective diameter of the toothed wheel 251. As described above with respect to FIGS. 47-49, or others, the effective diameter of the toothed wheel 251 can be changed by displacing the pins 197 within the radial slots 193 of the disc 191, defining the toothed wheel 251 in FIGS. 59a and 59b.

FIG. 59a illustrates one condition of the transmission, namely wherein the pins 194 (FIG. 47) are in their outermost position such that the effective diameter of the toothed wheel 251 is relatively large; whereas FIG. 59b schematically illustrates the condition wherein the pins 194 are in an inner position within their respective slots so that the effective diameter of the toothed wheel 251 is smaller.

Assume that the toothed wheel 251 is fixed against rotation, whereas all the other gears are free to rotate. Also assume that the toothed wheel 251 has a diameter of 120 mm in the FIG. 59a condition and 90 mm in the FIG. 59b condition, and that gear 254 has 40 teeth, gear 255 has 10 teeth, gear 256 has 30 teeth, and gear 257 has 30 teeth. Actually, the size of gear 256 is of no consequence, since its role is only to transfer the rotation from gear 255 to gear 257 in the opposite direction.

It can be shown that in the condition illustrated in FIG. 59a, where the diameter ratio between gears 254 and 255 equals the diameter ratio between the toothed wheel 251 and gear 257, that the output gear 257 will not rotate; therefore, the output shaft 252 coupled to gear 257 will have zero velocity.

FIG. 59b shows the condition wherein the diameter of the toothed wheel 251 has been reduced, e.g., from 120 mm to 90 mm. It can be shown that this will change the transmission ratio from 1:0 of FIG. 59a to 1:0.275 in FIG. 59b.

Thus when the drive shaft is connected to the toothed wheel 251, and the output shaft is connected to the internal gear 257, a transmission ratio of 1:1 is obtained in the condition of FIG. 59a, and a transmission ratio of 1:0.75 is obtained in the condition of FIG. 59b.

As shown below, the transmission ratio range can be further multiplied or divided by including a planetary gearing system which enables the transmission ratio to be changed, e.g., from 1:1-1:0.75 to 1:1-1:0.25.

FIG. 60 is an end view, and FIG. 61 is an exploded perspective view illustrating an implementation of the IVT system schematically illustrated in FIGS. 59a, 59b. To facilitate understanding, those elements in FIGS. 60 and 61 which generally correspond to the elements schematically illustrated in FIGS. 59a and 59b are identified by the same reference numerals.

Thus, variable-diameter toothed wheel 251 in the system 250 of FIGS. 59a, 59b, is constructed in a manner somewhat similar to that described above with respect to FIGS. 34-37, but modified to include only three slotted discs 251a, 251b, 251c, receiving a plurality of pins 251d within the slots. Two of the discs 251a, 251c are formed with straight radial slots, whereas the intermediate disc 251b is formed with curved slots, so that the pins 251d can be displaced radially inwardly or outwardly by effecting rotation between two outer discs 251a, 251c with respect to the middle disc 251b.

Planetary assembly 253 includes the four gears 254, 255, 256 and 257, as described with respect to FIGS. 59a, 59b, except that gear 254 which engages the pins 251d is constituted of two toothed wheels 254a, 254b (FIG. 61), e.g., similar to toothed wheel 20a illustrated in FIG. 10. Toothed wheels 254a, 254b contain the fixed projections and depressions engaging the pins 251d and causing the pins to self-adapt their configurations to those of the projections on toothed wheels 254a, 254b in all radial positions of the pins to thereby effect a non-slip coupling with the pins in all effective diameters of toothed wheel 251, as described earlier particularly with respect to FIG. 10.

As described above, rotation of gear 255 by gears 254a, 254b, rotates gear 256 which, in turn, rotates the central gear 257. For purposes of symmetry, the planetary gear assembly 253 preferably includes two sets of gears on the opposite sides of the toothed wheel 251 and coupled to the central gear 257, as shown in FIG. 60.

FIG. 62 more particularly illustrates each of the pins 251d in the toothed wheel 251. As seen in FIG. 62, a mid-point of each pin 251d is formed with a semi-circular bulge 251e on one face aligned with a semi-circular recess 251f on the opposite face. Recess 251f is received within the curved slots of the intermediate ring 251d, to allow each pin 251d to pivot, as well as to be radially displaced, within the respective slot in order to change the effective diameter of toothed wheel 251.

FIG. 61 illustrates the provision of an additional planetary gear assembly, generally designated 260, which may be used to enable division or multiplication of the transmission ratios. Planetary gear assembly 260 includes an external ring 261, three planetary gears 262, a sun gear 263 and a planet ring 264 rotatably mounting the three planetary gears 262. With respect to the following three parts, external ring 261, sun gear 263 and planet ring 264, one part is secured to one shaft, and another part is secured to the other shaft. It will be seen that, in such an arrangement, the output will be divided, or multiplied, by a predetermined number according to the relative dimensions of the gears in the planetary gear assembly 260.

For example, assume that the transmission system 250 without the planetary gear assembly 260 produces a transmission ratio ranging from 1:1 up to 1:0.75. The planetary gear assembly 260 may be connected so as to divide the transmission ratio by a factor of 3, thereby increasing the transmission ratio range from 1:1 to 1:0.25. To carry this out, for example, the external ring 261 could have 60 teeth, the sun gear 263 could have 30 teeth, and the planet gears 262 could each have 15 teeth. This will produce a ratio of 1:3 between the speed of rotation of the sun gear 263 and the speed of rotation of the planet ring 264, while the external ring 261 is static.

Thus, if the external ring 261 of the planetary transmission 260 is connected to the original input shaft (e.g., the shaft of rotation of the toothed wheel 251), and the sun gear 263 of the planetary transmission 260 is connected to the original output shaft (e.g., the shaft of the gear 257), the output produced on the output shaft will be divided by the planetary transmission.

When the transmission is in a 1:1 state, the input shaft and the output shaft move together with the same speed. When the transmission ratio is reduced, the output shaft starts moving at a slower rate than the input shaft, and its speed is gradually reduced until it reaches the maximum speed which amounts to 75% of the speed of the input shaft. Therefore, the planetary transmission 260 will not have any effect when the ratio is 1:1, because then the original input shaft connected to the external ring 261, and the original output shaft connected to the sun gear 263, move together at the same speed. Accordingly, the planet gears 262 will also move at the same speed, and the planet ring 264 will also move at the same speed, such that the transmission ratio will remain 1:1.

However, when the ratio starts to decrease from 1:1 in the direction of 1:0.75, the planet gears 262 of the planetary transmission 260 will move between the sun gear 263 and the external ring 261 at a rate amounting to one-third of the speed of the original output shaft connected to the sun gear 263, and thus reach a reduction of 0.25 while the original transmission has reduced its speed to 0.75, thereby producing a transmission ratio ranging from 1:1 to 1:0.25 as desired.

It will be appreciated that the planetary transmission 260 could also be connected as to carry out multiplication instead of division. For example, if the connections are inverted, so that the new output shaft is connected to the gear 263 of the planetary transmission 260, and the original output shaft is connected to the planet ring 264 of the planetary transmission, the result will be multiplication by a factor of 3, instead of division by the factor of 3.

The IVT system 250 illustrated in FIGS. 60 and 61 is particularly useful as a continuously variable transmission in a bicycle. The transmission ratios in bicycles between the front gear and the rear gear generally range from about 1:1 at low gear up to about 4:1 at high gear. The PIVT system 250 illustrated in FIGS. 60 and 61 can be used to provide an infinite number of gears as a substitute for the common 21-gear system in bicycles. This can be done, for example, as follows:

The front gear and the chain may remain as in a standard bicycle. The chain will turn a rear gear at a constant ratio of 4:1, and this gear will be affixed to the PIVT system of 60, 61 by means of a unilateral ratchet bearing drive, so that the transmission itself will move together with the rear wheel of the bicycle, and the unilateral ratchet bearing will only turn when the rider presses down on the pedals.

The rear system of a seven gear transmission may be replaced by the PIVT system including the design as previously described, to produce a transmission ratio ranging between 1:1 to 1:0.25. In such a replacement of the PIVT system, when the transmission ratio is 1:1 the original ratio of the gear wheels of 1:4 will be preserved; whereas when the transmission passes to a state of 1:0.25, the original ratio will be divided by 4 to obtain a ratio of 1:1. The result will be a range of transmission ratios ranging from 1:1 up to 4:1, as desired.

Figure 63:
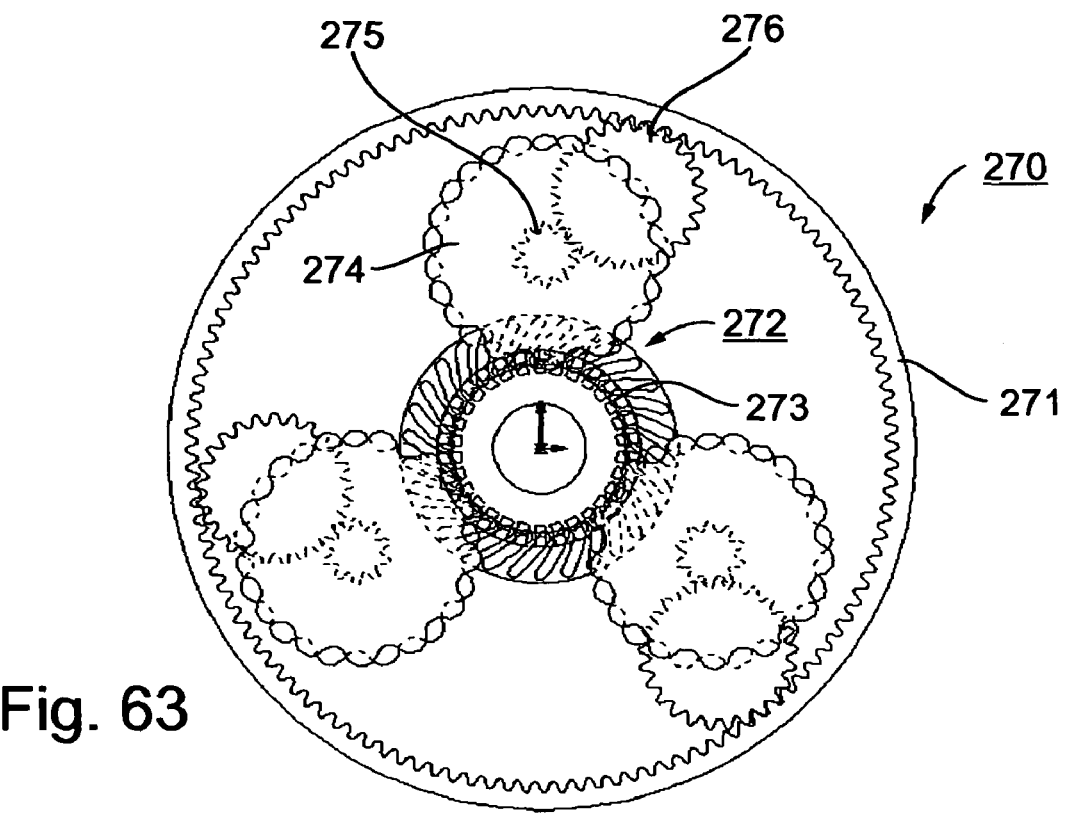
FIG. 63 illustrates another CVT system constructed in accordance with the present invention similar to that of FIGS. 60-62 but modified such that the radially-displaceable annular array of pins defines an interior gear rather than an exterior gear.
Figure 64:
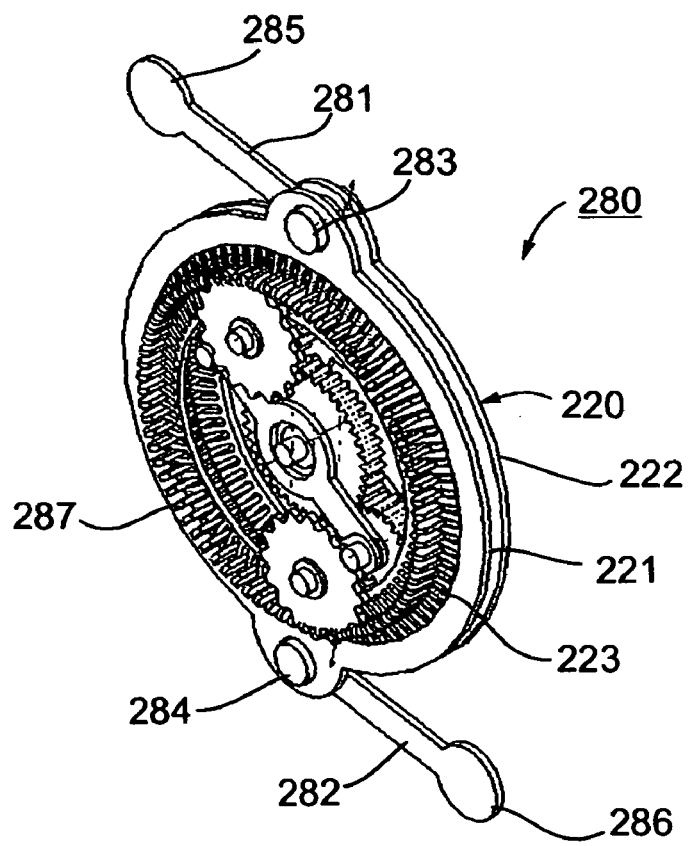
FIG. 64 illustrates a CVT system similar to that of FIG. 63, but including a control mechanism for manually or automatically controlling the conversion ratio.

Another advantage in the system of FIGS. 60 and 61, as well as in the below-described system of FIGS. 63 and 64 is that the drive shafts and the driven shafts can be coaxial. In addition, since the pins 251*d* are held between two discs, they can withstand large loads.

FIG. 63 illustrates a PIVT system, generally designated 270, similar to that described above but using a variable-diameter toothed wheel as an internal ring of variable diameter, instead of as an external ring of variable diameter. The advantage in such an approach is that it enables a reduction in the number of pivotal pins in the variable-diameter toothed wheel, and a corresponding reduction in the number of other parts. The principles previously described with respect to FIGS. 59*a* and 59*b*, and FIGS. 60-62, remain the same, except that the transmission ratio is determined according to the ratio between the external fixed-diameter ring 271, and the effective diameter of the internal variable-diameter toothed wheel 272.

In this case, the toothed wheel 272, including its annular array of radially displaceable pins 273, is coupled to a pair of fixed-diameter wheels 273, constructed as described above, to cause the pins 273 to assume a self-adaptive configuration to the projections and depressions of the toothed wheels 274 in all effective diameters of the toothed wheel 272. Toothed wheels 274 are coupled to smaller gears 275, which are meshed with planet gears 276, which planetate around the outer ring 271. For purposes of symmetry, the illustrated system includes three such planetary gear assemblies.

The variable-diameter toothed wheel 272, which serves as the internal gear in the planetary assembly, may be constructed according to any of the constructions described above. FIG. 63 illustrates for purposes of example, the construction of FIGS. 34-37, wherein the effective diameter of the toothed wheel is varied by rotating its curved-slot discs (111, 112, FIG. 34) with respect to its straight-slot discs (113, 114, FIG. 34) which radially displace the annular array of coupling pins 273 (116, FIG. 34). The variable-diameter toothed wheel 272 is coupled, via the coupling pins 273, to a fixed-diameter toothed wheel 274 in a manner, such as described above, to cause the coupling pins to self-adapt themselves to the configuration of the projections and depressions on wheel 273 in all radial positions of the coupling pins, and thereby to provide a non-slip coupling with the coupling pins in all effective diameters of the toothed wheel 272.

In this structure, a transmission 1:1 is attained when the ratio between the diameters of the external ring 271 and the internal toothed wheel 272 is identical to the ratio between wheel 274 and wheel 275. If the external ring 271 is rotated, the internal toothed wheel 272 will rotate with it at a ratio of 1:1. Any change in the diameter of the internal toothed wheel 272, by the annular displacement of its annular array of pins 273, it will change this transmission ratio.

As in the case of the system illustrated in FIG. 61, another planetary gear assembly may be provided (corresponding to assembly 260, FIG. 61) to further multiply or divide the transmission ratio in the system of FIG. 63.

FIG. 64 illustrates a PIVT system 280 including a variable-diameter toothed wheel according to the construction illustrated in FIG. 52, and therefore identified by the same reference numeral 220. It includes two conical discs 221, 222, mounting an annular array of pin assemblies 223 which are radially movable to change the effective diameter of the wheel by moving the two conical discs 221, 222 towards or away from each other.

In the system illustrated in FIG. 64, the two conical discs 221, 222 are moved towards and away from each other by one or two pivotal levers, shown at 281, 282. Thus, each lever may be coupled to a threaded pin 283, 284 having two reversed threads, such that when the lever is pivoted in one direction, the two discs 221, 222 are moved toward each other; and when pivoted in the opposite direction, the discs are moved further apart. The two levers 281, 282 can be manually operated, or can be automatically operated, e.g., in response to velocity as sensed by weights 285, 286, carried at the ends of the levers 281, 282.

The system illustrated in FIG. 64 further includes a gear assembly, generally designated 287, of the type described above with respect to FIGS. 60 and 61, coupled to the annular array of pin assemblies 223 so as to effect a non-slip coupling therewith in all diameters of the toothed wheel 220 in the same manner as described above.

As briefly described earlier, such an IVT system is particularly useful in bicycles. Thus, as the bicycle speed increases, the centrifugal force applied to the weights 285, 286 will pivot the lever arms 281, 282 against the action of springs (not shown) to automatically increase the transmission ratio of the system.

The invention has been described above with respect to many preferred embodiments, but it will be appreciated that these are set forth merely for purposes of example, and that many other variations, may be made. For example, many of the transmissions described above for use with two rotary members, could also be used wherein one of the transmission members is a linearly-moveable member, such as a rack, as described for example in FIG. 12. Also, many of the transmission systems described for driving a toothed wheel, could also be used for driving a chain or belt, or vice versa. In addition, the various arrangements for radially displacing the coupling elements in order to change the effective diameter of the toothed wheels could be used in other CVT systems or in other applications.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. The transmission comprising a rotating gear combined with a belt or chain, said gear having a plurality of adjustable gear teeth, the distance of said adjustable gear teeth from an axis of said gear being adjustable, the corresponding belt or chain having fixed teeth alternating with depressions of a fixed configuration, the adjustable gear teeth each being rotatable about a gear tooth axis to match the fixed gear teeth of the belt or chain such that when a surface of the adjustable gear tooth rests on the fixed gear teeth each of the adjustable gear teeth rests on a different portion of respective fixed gear teeth from an adjoining tooth in the direction of motion of the belt or chain.

2. The transmission according to claim 1, wherein the pitch of the fixed gear teeth and the pitch of the adjustable gear teeth is different for at least some of the displacements of the adjustable gear teeth from the axis of said gear.

3. The continuously-varible according to claim 1 wherein the direction of the gear tooth axis is perpendicular to direction of the axis of the gear.

4. A transmission according to claim 1 wherein the distance of the gear tooth axis from the axis of the gear is independent of the position of the surfaces of the adjustable gear teeth on the belt or chain.

5. A transmission according to claim 1 wherein the transmission is a continuously variable transmission whose transmission ratio is adjusted by varying the distance of the gear tooth axis from the axis of the gear.

6. A continuously-variable transmission, comprising:
first and second transmission members each having a group of coupling elements successively engageable to couple the transmission members for movement together;
at least one of said transmission members being a rotary member rotatable about a rotary axis;
at least one of said groups of coupling elements being radially displaceable towards and away from the rotary axis to change the conversion ratio of said transmission;
the coupling elements of one of said groups on one of said transmission members being of a fixed configuration defining an array of projections each of a fixed configuration alternating with depressions each of a fixed configuration; said array of projections and depressions being on a surface of said one transmission member between opposite side faces of said one transmission member, and having the same pitch for every cross-section of said surface perpendicular to the rotary axis;
the coupling elements of the other of said groups on the other of said transmission members being of a self-adaptive configuration, each having portions individually movable in opposite directions or each being rotatable to adapt itself to the configuration of said fixed configuration coupling elements in all displacement positions of the radially displaceable coupling elements and to effect a non-slip coupling therewith in all said radial displacement positions,
wherein said rotary member is a variable-diameter toothed wheel carrying said self-adaptive coupling elements, said self adaptive elements forming the at least one group of coupling elements being radially-displaceable; and said other transmission member is a toothed rack carrying said fixed-configuration coupling elements or a toothed wheel carrying said fixed-configuration coupling elements or a flexible chain carrying said fixed-configuration coupling elements or a flexible belt carrying said fixed-configuration coupling elements.

7. The continuously-varible transmission according to claim 6, wherein the projections and depressions of said fixed-configuration coupling elements at one side face of said one transmission member are in a staggered relationship with respect to the projections and depressions at the opposite side face of said one transmission member, such that each projection in one side face is aligned with a depression in the opposite side face, along a line parallel to the rotary axis.

8. The continuously-varible transmission according to claim 7, wherein each of said fixed-configuration coupling elements includes a gradual transition from a projection at one side face to a depression at the opposite side.

9. The continuously-varible transmission according to claim 7, wherein each of said self-adaptive coupling elements is pivotally mounted to said one transmission member such that when the coupling element is pivoted, one end defines a projection engageable with a depression of the fixed-configuration coupling elements, and the opposite end defines a depression engaged by a projection of the fixed-configuration coupling elements.

10. The continuously-variable transmission according to claim 7, wherein each of said self-adaptive coupling elements includes a disc having a contact edge and rotatable within a holder carried by said one transmission member such that when said disc is rotated, one end of said contact edge defines a projection engageable with a depression of the fixed-configuration coupling elements, and the opposite end defines a depression engaged by a projection of the fixed-configuration coupling elements.

11. The continuously-varible transmission according to claim 7, wherein each of said fixed-configuration coupling elements includes a stepped transition from a projection at one side face to a depression at the opposite side face.

12. The continuously-varible transmission according to claim 7, wherein each of said self-adaptive coupling elements includes a shifting plate having teeth on its opposite ends and a space between said teeth, said shifting plate being shiftable within a holder carried by the respective transmission member such that when said plate is shifted in one direction, it makes a tooth at one end effective to define a projection engageable with a depression in the fixed-configuration coupling elements, and the space between said teeth effective to define a depression engageable by a projection of the fixed-configuration coupling elements.

13. The continuously-varible transmission according to claim 7, wherein each of said self-adaptive coupling elements includes a pair of teeth on its opposite ends carried by said one transmission member and displaced together in opposite directions such that when the tooth at one end is displaced in one direction, it defines a projection engageable with a depression of the fixed-configuration coupling elements, and the tooth at the opposite end is displaced in the opposite direction to define a depression engageable by a projection of the fixed-configuration coupling elements.

14. The continuously-varible transmission according to claim 13, wherein said teeth are mechanically actuated together by a rocking bar.

15. The continuously-varible transmission according to claim 6, wherein the projections and depressions of said fixed-configuration coupling elements at one side face of said one transmission member are in an aligned relation with respect to the projections and depressions at the opposite side face of said one transmission member; and each of said self-adaptive coupling elements includes a pivotal assembly on said other transmission member pivotal about an axis perpendicular to the direction of movement of the one transmission member; each of said pivotal assemblies having a pair of spaced arms adapted to engage spaced points on the projections and depressions of said one transmission member, to thereby permit said self-adaptive coupling elements to automatically adapt themselves to the configuration of said fixed-configuration coupling elements such as to effect a non-slip coupling therewith in all effective diameters of said rotary member.

16. The continuously-varible transmission according to claim 6, wherein the projections and depressions of said fixed-configuration coupling elements at one side face of said one transmission member are in an aligned relation with respect to the projections and depressions at the opposite side face of said one transmission member; and each of said self-adaptive coupling elements includes a pivotal assembly on said other transmission member pivotal about an axis perpendicular to the direction of movement of the one transmission member; each of said pivotal assemblies having a pair of spaced teeth adapted to engage spaced points on the projections and depressions of said one transmission member, to thereby permit said self-adaptive coupling elements to automatically adapt themselves to the configuration of said fixed-configuration coupling elements such as to effect a non-slip coupling therewith in all effective diameters of said rotary member.

17. The continuously-varible transmission according to claim 6, wherein said rotary member is a variable-diameter toothed wheel carrying said self-adaptive coupling elements in a radially-displaceable manner thereon; and said other transmission member is a fixed-diameter toothed wheel carrying said fixed-configuration coupling elements.

18. The continuously-varible transmission according to claim 6, wherein said rotary member is a variable-diameter toothed wheel carrying said self-adaptive coupling elements in a radially-displaceable manner thereon; and said other transmission member is a toothed rack carrying said fixed-configuration coupling elements.

19. The continuously-varible transmission according to claim 6, wherein said rotary member is a variable-diameter toothed wheel carrying said self-adaptive coupling elements in a radially-displaceable manner thereon; and said other transmission member is a flexible chain carrying said fixed-configuration coupling elements.

20. The continuously-varible transmission to claim 6 wherein said rotary member is a variable-diameter toothed wheel carrying said self-adaptive coupling elements in a radially-displaceable manner thereon; and said other transmission member is a flexible belt carrying said fixed-configuration coupling elements.

21. The continuously-varible transmission according to claim 6, wherein said rotary member includes a pair of conical discs each formed with an annular array of radial slots; said radially-displaceable coupling elements being disposed in an annular array between said discs and having their opposite ends slidably received in said slots, such that moving the discs towards or away from each other radially displaces said latter coupling elements to change the effective diameter of the rotary member.

22. The continuously-varible transmission according to claim 6, wherein said rotary member includes:
    a first member in the form of a disc having an annular array of radial slots radiating from the rotary axis of the rotary member; and a second member carrying an annular array of triangular plates having inclined edges received in said radial slots and movable therein;
    said radially-displaceable coupling elements being disposed in an annular array between said radial slots and triangular plates such that moving said first and second members towards or away from each other radially displaces said annular array of coupling elements to change the effective diameter of the rotary member.

23. The continuously-variable transmission according to claim 22, wherein said second member carrying said triangular plates is a second disc movable towards and away from said disc having the radial slots.

24. The continuously-varible transmission according to claim 22, wherein said second member carrying said triangular plates includes a bearing member slideably received on the rotary axis of the rotary member.

25. The continuously-varible transmission according to claim 22, wherein each of said radially-displaceable coupling elements has one end slidably received in a radial slot of said disc, and an opposite end slidably receiving the inclined edge of one of said triangular plates.

26. The continuously-varible transmission according to claim 6, wherein each of said radially-displaceable coupling elements, is spring urged towards the rotary axis of the rotary member.

27. The continuously-varible transmission according to claim 6, wherein said rotary member includes at least a first disc formed with an annular array of radial straight slots, and a second disc formed with an annular array of radial curved slots;
    said radially-displaceable coupling elements being disposed in said slots such that rotating one disc with respect to the other radially displaces said coupling elements to change the effective diameter of the rotary member.

28. The continuously-varible transmission according to claim 27, wherein said rotary member includes a pair of said first and second discs on each of the opposite ends of said coupling elements.

29. The continuously-varible transmission according to claim 27, wherein each of said annular array of radially-displaceable coupling elements is of said self-adaptive configuration and includes a pin received in said slots, and a contact element pivotally mounted to said pin.

30. The continuously-varible transmission according to claim 6, wherein said other transmission member is a flexible closed loop coupling said rotary member to another rotary member of like construction such that an increase in the diameter of one rotary member is accompanied by a decrease in diameter of the other rotary member to maintain tautness in said flexible closed loop.

31. The continuously-varible transmission according to claim 30, wherein the two rotary members are controlled by a control mechanism which produces a concurrent increase in diameter of said one rotary member and decrease in diameter of said other rotary member to maintain the tautness in said flexible closed loop coupling.

32. The continuously-varible transmission according to claim 31, wherein said control mechanism includes a pivotal arm coupled at one side to one rotary member to increase its effective diameter and at the opposite side to the other rotary member to decrease its effective diameter.

33. The continuously-varible transmission according to claim 31, wherein said control mechanism includes a threaded member coupled to each of said rotary members; said threaded members being coupled together and to their respective rotary member to effect concurrent changes in effective diameter of the two rotary members by the same amounts but in opposite direction.

34. The continuously-varible transmission according to claim 31, wherein one rotary member is coupled to a first gear, and the other rotary member is coupled to a second gear meshing with said first gear; said transmission further including a differential mechanism between said gears effective to enable the range of transmission ratios between said rotary members to be controlled to produce a zero velocity output.

35. The continuously-varible transmission according to claim 6, wherein said rotary member includes an inner pair of spaced discs joined together by a first ring, and an outer pair of spaced discs joined together by a second ring coaxial with said first ring;
    one pair of discs being formed with a plurality of radially-extending straight slots, and the other pair of discs being formed with a plurality of radially-extending curved slots;
    the opposite ends of each of said coupling elements of said rotary member being received in both a straight slot and in a curved slot of the respective discs such that rotation of one of said discs in each pair with respect to the other disc in the pair causes said coupling elements to move radially with respect to said discs, according to the direction of rotation, thereby changing the effective diameter of the rotary member.

36. The continuously-varible transmission according to claim 35, wherein one disc of each pair is coupled to the other disc of the respective pair by a differential gear assembly which is controllable to effect an angular displacement of the two discs, and thereby to change the effective diameter of said rotary member while the transmission is operating.

37. The continuously-varible transmission according to claim 6, wherein the transmission further includes a condition sensor for sensing a predetermined condition, and an automatic control system for automatically displacing said radially-displaceable coupling elements to change the radial distance of said rotary member from the rotary axis, and thereby the transmission ratio of said continuously-variable transmission, in response to said sensed condition.

38. The continuously-varible transmission according to claim 37, wherein said condition sensor senses velocity of the transmission and automatically controls said transmission ratio in response thereto.

39. The continuously-varible transmission according to claim 37, wherein said condition sensor senses load on the transmission, and automatically controls said transmission ratio in response thereto.

40. The continuously-varible transmission according to claim 37, wherein the transmission is included in a vehicle having an engine for driving the vehicle, said condition sensor sensing the load on said engine and automatically controlling said transmission ratio in response thereto.

41. The continuously-varible transmission according to claim 37, wherein said automatic control system includes a response selector for selecting one of at least two predetermined responses of the automatic control of the transmission ratio of the continuously-variable transmission to the predetermined sensed condition.

42. The continuously-varible transmission according to claim 6 wherein the projections and depressions of said fixed-configuration coupling elements at one side face of said one transmission member are in a staggered relationship with respect to the projections and depressions at the opposite face of said one transmission member, such that each projection in one side face is aligned with a depression in the opposite side face along a direction parallel to the rotary axis, wherein at least part of the space between the two faces is cut out to below the level of the depressions.

43. The continuously-varible transmission according to claim 42 wherein the fixed elements are carried on a chain.

44. The continuously-varible transmission according to claim 42 wherein the fixed elements are carried on a rack.

45. The continuously-varible transmission according to claim 6 wherein the pitch of the fixed elements and the pitch of self adaptive elements is different for at least some of the displacements of the displaceable elements.

46. A transmission system comprising a toothed belt or gear chain having a plurality of teeth of fixed configuration, each tooth having alternating peaks and troughs over the length of the toothed belt or gear chain,
    wherein a peak at one side of the toothed belt or gear chain is at a same longitudinal position along the toothed belt or gear chain as a trough on another side of the toothed belt or gear chain; and
    wherein the offset peaks and troughs of the toothed belt or gear chain on opposite sides of the toothed belt or gear chain are separated by a stepped transition and wherein the opposite sides of the gear are separated by a fixed distance;

and including a gear linked to said toothed belt or gear chain so that the gear and toothed belt or gear chain move together, said gear having a plurality of adjustable gear teeth, the distance of said adjustable gear teeth from an axis of the gear being adjustable, the adjustable gear teeth on said gear each being rotatable about a gear tooth axis to match the gear teeth of the toothed belt or gear chain such that when a surface of the adjustable gear tooth rests on the fixed gear teeth each of the adjustable gear teeth rests on a different portion of respective fixed gear teeth from an adjoining tooth in the direction of motion of the toothed belt or gear chain.

47. A transmission system according to claim 46 wherein said adjustable gear teeth rest on said fixed teeth along at least one continuous portion of a line.

48. A transmission system according to claim 46 wherein the gear tooth axis is perpendicular to the axis of the gear.

49. A transmission system according to claim 46, wherein the distance of the gear tooth axis from the axes of the gear is independent of the position of the surfaces of the adjustable gear teeth on the toothed belt or gear chain on which the teeth of the gear rest.

50. A transmission system according to claim 46, wherein the transmission is a continuously variable transmission whose transmission ratio is adjusted by varying the distance of the adjustable gear tooth from the axis of the gear and wherein the transmission transmits torque for all distances of the adjustable gear teeth from the axis of the gear.

51. A transmission system according to claim 46, wherein the distance between adjacent peaks of the adjustable gear teeth of the gear changes with changes in the distance of the adjustable gear teeth of the gear from the rotation axis.

52. A transmission system according to claim 51 wherein the distance between adjacent teeth of the gear is uniform.

53. A transmission system comprising a toothed belt or gear chain having a plurality of teeth of fixed configuration, each tooth having alternating peaks and troughs over the length of the toothed belt or gear chain, wherein a peak at one side of the toothed belt or gear chain is at a same longitudinal position along the toothed belt or gear chain as a trough on another side of the toothed belt or gear chain; and wherein the offset peaks and troughs of the toothed belt or gear chain on opposite sides of the toothed belt or gear chain are separated by a stepped transition and wherein the opposite sides of the toothed belt or gear chain are separated by a fixed distance;

and including a first gear linked to said toothed belt or gear chain so that the first gear and toothed belt or gear chain move together and a second gear linked to said toothed belt or gear chain so that the second gear and toothed belt or gear chain move together to form a gear-toothed belt-gear drive or a gear-gear chain-gear drive, said second gear having a plurality of adjustable gear teeth, the distance of said adjustable gear teeth from an axis of the second gear being adjustable, the adjustable gear teeth on said second gear each being rotatable about a gear tooth axis to match the gear teeth of the toothed belt or gear chain such that when a surface of the adjustable gear tooth rests on the fixed gear teeth each of the adjustable gear teeth rests on a different portion of respective fixed gear teeth from an adjoining tooth in the direction of motion of the toothed belt or gear chain.

54. A transmission system according to claim 53 wherein the gear tooth axis is perpendicular to the axis of the second gear.

55. A transmission system according to claim 53, wherein the distance of the gear tooth axes from the axis of the second gear is independent of the position of the surfaces of the adjustable gear teeth on the toothed belt or gear chain on which the teeth of the second gear rest.

56. A transmission system according to claim 53, wherein the transmission is a continuously variable transmission whose transmission ratio is adjusted by varying the distance of one or more of the adjustable gear tooth of the second gear from the axis of the gear second gear and wherein the transmission transmits torque for all distances of the adjustable gear teeth from the axis of the second gear.

57. A transmission system according to claim 53, wherein the distance between adjacent peaks of the gear teeth of the second gear changes with changes in the distance of the teeth of the second gear from the axis of the second gear.

58. A transmission system according to claim 57 wherein the distance between adjacent teeth of the first gear is uniform.

* * * * *